US011924554B2

(12) United States Patent
Yamada et al.

(10) Patent No.: US 11,924,554 B2
(45) Date of Patent: Mar. 5, 2024

(54) IMAGING SYSTEM WHICH DETERMINES AN EXPOSURE CONDITION BASED ON A DETECTED DISTANCE

(71) Applicants: Manabu Yamada, Tokyo (JP); Yuji Yamanaka, Tokyo (JP); Taro Kikuchi, Tokyo (JP); Keito Sawada, Kanagawa (JP); Shusaku Takasu, Kanagawa (JP)

(72) Inventors: Manabu Yamada, Tokyo (JP); Yuji Yamanaka, Tokyo (JP); Taro Kikuchi, Tokyo (JP); Keito Sawada, Kanagawa (JP); Shusaku Takasu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 253 days.

(21) Appl. No.: 17/603,601

(22) PCT Filed: May 14, 2020

(86) PCT No.: PCT/IB2020/054551
§ 371 (c)(1),
(2) Date: Oct. 14, 2021

(87) PCT Pub. No.: WO2020/240323
PCT Pub. Date: Dec. 3, 2020

(65) Prior Publication Data
US 2022/0201206 A1    Jun. 23, 2022

(30) Foreign Application Priority Data

May 31, 2019  (JP) .................. 2019-103119
Jan. 29, 2020  (JP) .................. 2020-012926

(51) Int. Cl.
*H04N 23/698*       (2023.01)
*H04N 23/56*        (2023.01)
(Continued)

(52) U.S. Cl.
CPC .......... *H04N 23/698* (2023.01); *H04N 23/56* (2023.01); *H04N 23/71* (2023.01); *H04N 23/90* (2023.01)

(58) Field of Classification Search
CPC ...... H04N 23/698; H04N 23/56; H04N 23/71; H04N 23/90; H04N 23/72
See application file for complete search history.

(56) References Cited

U.S. PATENT DOCUMENTS

2005/0259177 A1   11/2005  Senoo
2008/0225136 A1   9/2008   Yamada
(Continued)

FOREIGN PATENT DOCUMENTS

EP    2 312 497 A1   4/2011
EP    3 442 213 A1   2/2019
(Continued)

OTHER PUBLICATIONS

Chinese Office Action dated Feb. 8, 2023 in corresponding Chinese Patent Application No. 9 pages.

*Primary Examiner* — Padma Haliyur
(74) *Attorney, Agent, or Firm* — XSENSUS LLP

(57) ABSTRACT

An imaging system (100) includes an imaging unit (140) configured to capture an image of a target object while the imaging unit (140) being mounted on a movable apparatus (500); and an exposure condition determination unit (161) configured to determine any one of a fixed exposure condition and an automatic exposure (AE) condition, as an exposure condition, based on a distance detected between the movable apparatus (500) and the target object.

12 Claims, 29 Drawing Sheets

(51) Int. Cl.
*H04N 23/71* (2023.01)
*H04N 23/90* (2023.01)

(56) References Cited

U.S. PATENT DOCUMENTS

| | | | |
|---|---|---|---|
| 2009/0073282 A1 | 3/2009 | Yamada et al. | |
| 2010/0165177 A1* | 7/2010 | Liaw | H04N 23/676 |
| | | | 348/E5.045 |
| 2011/0001841 A1 | 1/2011 | Shiraishi et al. | |
| 2011/0007182 A1 | 1/2011 | Yamada | |
| 2011/0074957 A1* | 3/2011 | Kiyohara | G06V 10/267 |
| | | | 348/148 |
| 2012/0162424 A1* | 6/2012 | Murao | H04N 23/71 |
| | | | 348/148 |
| 2012/0177252 A1 | 7/2012 | Korekado et al. | |
| 2012/0300051 A1 | 11/2012 | Daigo et al. | |
| 2013/0038785 A1 | 2/2013 | Song | |
| 2014/0063287 A1 | 3/2014 | Yamada | |
| 2017/0045616 A1 | 2/2017 | Masuda et al. | |
| 2019/0086769 A1* | 3/2019 | Nikhara | G03B 7/08 |
| 2020/0012171 A1* | 1/2020 | Yoshino | G03B 7/003 |

FOREIGN PATENT DOCUMENTS

| | | |
|---|---|---|
| JP | 2010-239479 | 10/2010 |
| JP | 2011-095222 | 5/2011 |
| JP | 2015-031726 A | 2/2015 |
| JP | 2020-065239 | 4/2020 |

\* cited by examiner

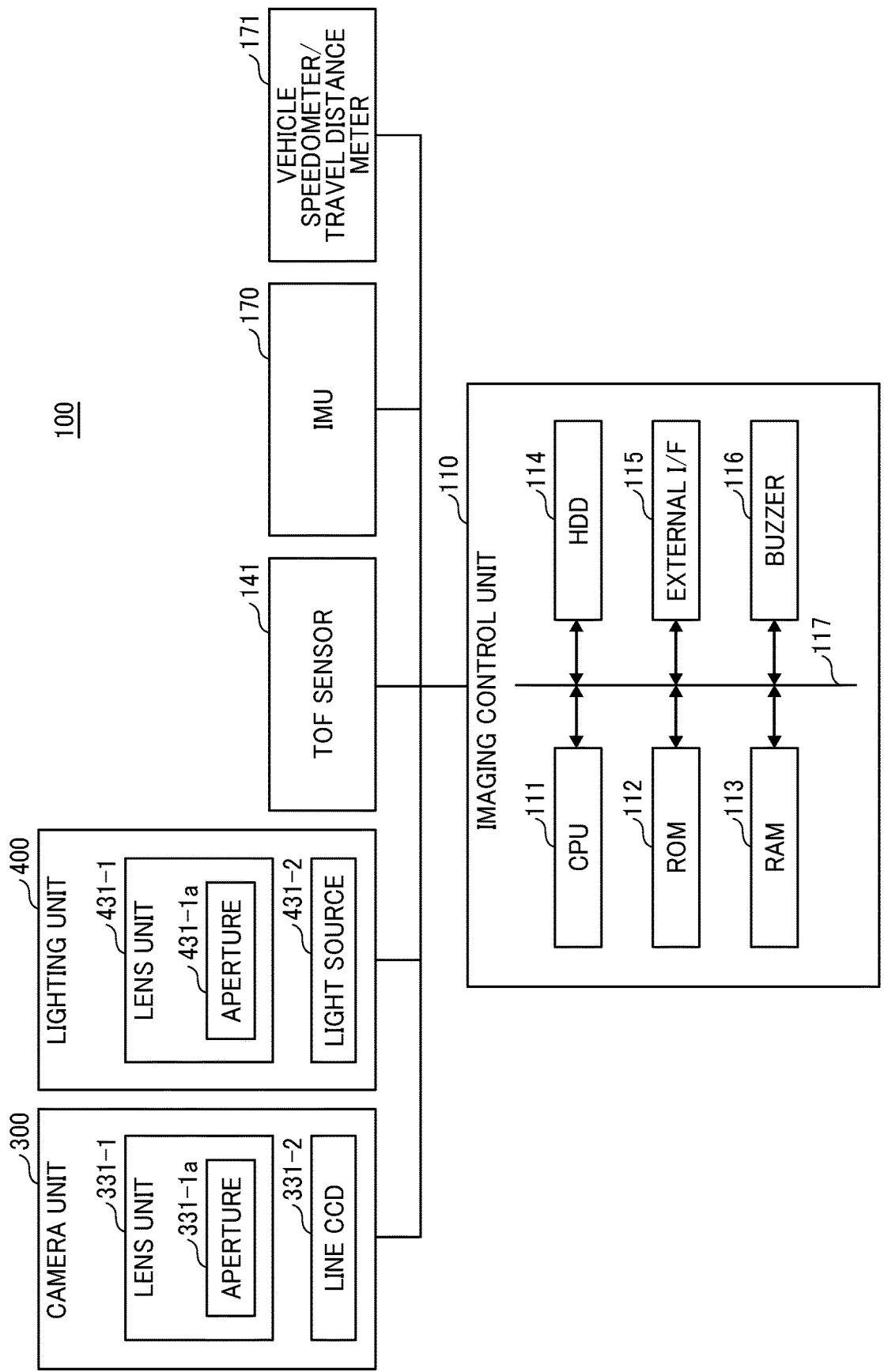

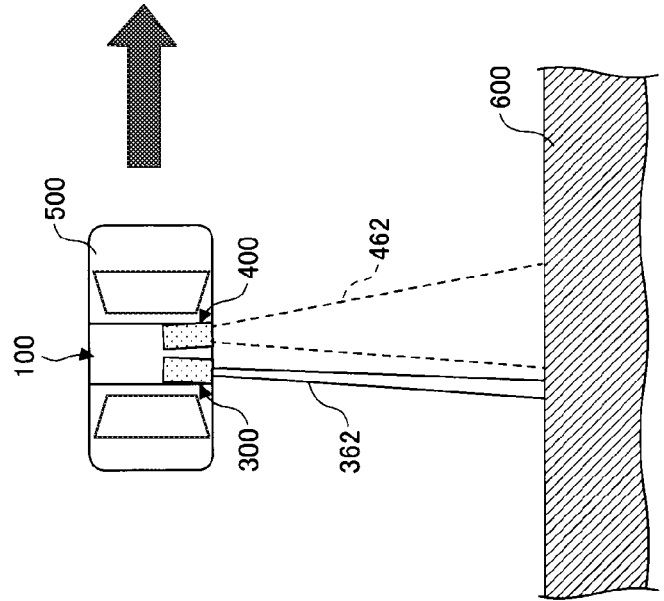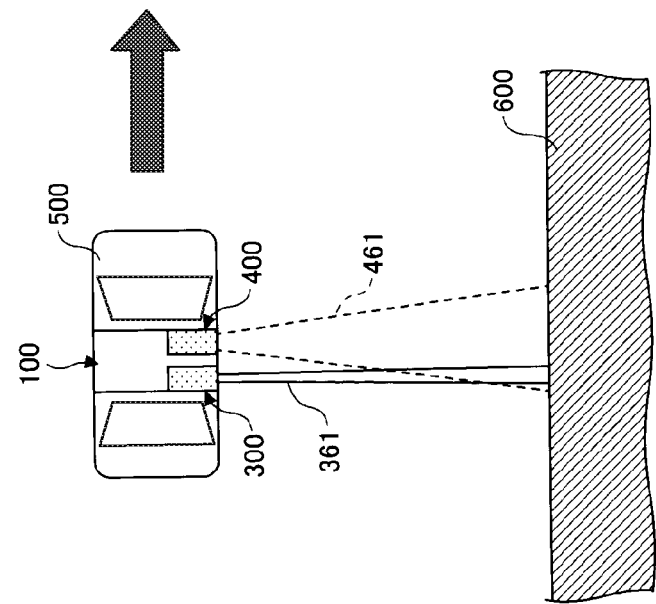

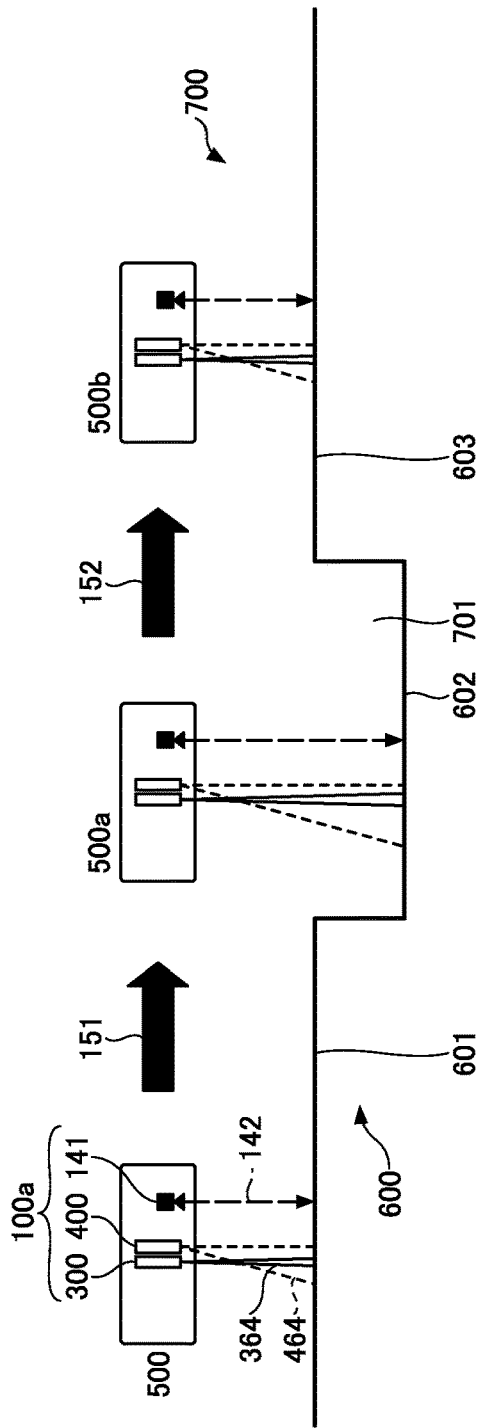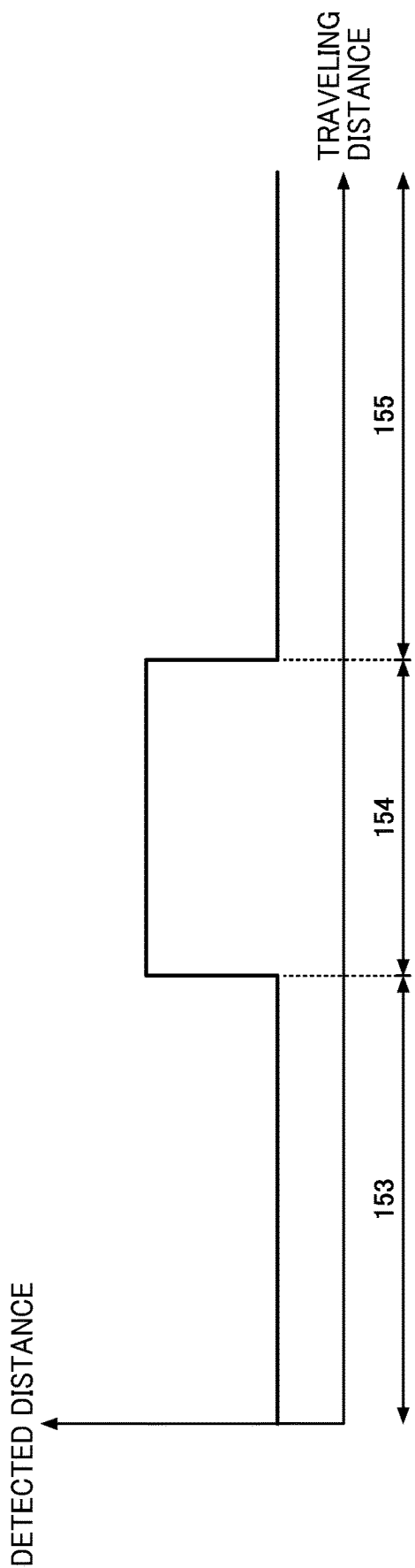

IMAGING SYSTEM WHICH DETERMINES AN EXPOSURE CONDITION BASED ON A DETECTED DISTANCE

CROSS-REFERENCE TO RELATED APPLICATIONS

The present application is based on PCT filing PCT/IB2020/054551, filed May 14, 2020, which claims priority to Japanese Patent Application 2019-103119, filed May 31, 2019, and Japanese Patent Application 2020-012926, filed Jan. 29, 2020, the entire contents of which are incorporated herein by reference.

TECHNICAL FIELD

This disclosure relates to an imaging system, an imaging method, and a storage medium or carrier means.

BACKGROUND

Maintenance and management work of target objects, such as tunnel, can be performed using an inspection system that runs a movable apparatus (e.g., vehicle) mounted with an imaging system along the tunnel to capture images of a wall face of the tunnel using the imaging system.

Japanese Laid-Open Patent Application No. 2010-239479 discloses a technique that controls an exposure level of an imaging system mounted on a movable apparatus, in which the imaging system determines whether or not an optical condition changing section where brightness amount changes by a given amount or more exists within a distance in front of the movable apparatus. If the optical condition changing section where the brightness amount changes by the given amount or more exists, the imaging system controls the exposure level in accordance with the brightness amount change that occurs during a traveling of the movable apparatus.

CITATION LIST

Patent Literature

[PTL1]
JP-2010-239479-A

SUMMARY

Technical Problem

However, the technology of Patent Literature PTL1 may not be effective for capturing images under some situations.

This disclosure discloses an embodiment that is devised in view of the above described issue to enable to perform the image capturing operation suitably.

Solution to Problem

In one aspect of the present invention, an imaging system includes an imaging unit configured to capture an image of a target object while the imaging unit being mounted on a movable apparatus; and an exposure condition determination unit configured to determine any one of a fixed exposure condition and an automatic exposure (AE) condition, as an exposure condition, based on a distance between the movable apparatus and the target object.

Advantageous Effects of Invention

As to the embodiment of this disclosure, the image capturing operation can be suitably performed to capture images effectively.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 4 is an example of hardware block diagram of an imaging system according to an embodiment of this disclosure;

FIG. 7A illustrates an influence of a relative position/posture of a camera unit and a lighting unit, in which one case where there is no fluctuation in the relative position/posture of the camera unit and the lighting unit is illustrated.

FIG. 7B illustrates an influence of a relative position/posture of a camera unit and a lighting unit, in which another case where there is fluctuation in the relative position/posture of the camera unit and the lighting unit is illustrated.

FIG. 16A illustrates a positional relationship between an imaging system and a wall face of tunnel according to the first embodiment.

FIG. 16B illustrates a relationship between a distance detected between an imaging system and a wall face of tunnel, and a traveling distance of a vehicle according to the first embodiment.

DESCRIPTION OF EMBODIMENTS

Figure 1:
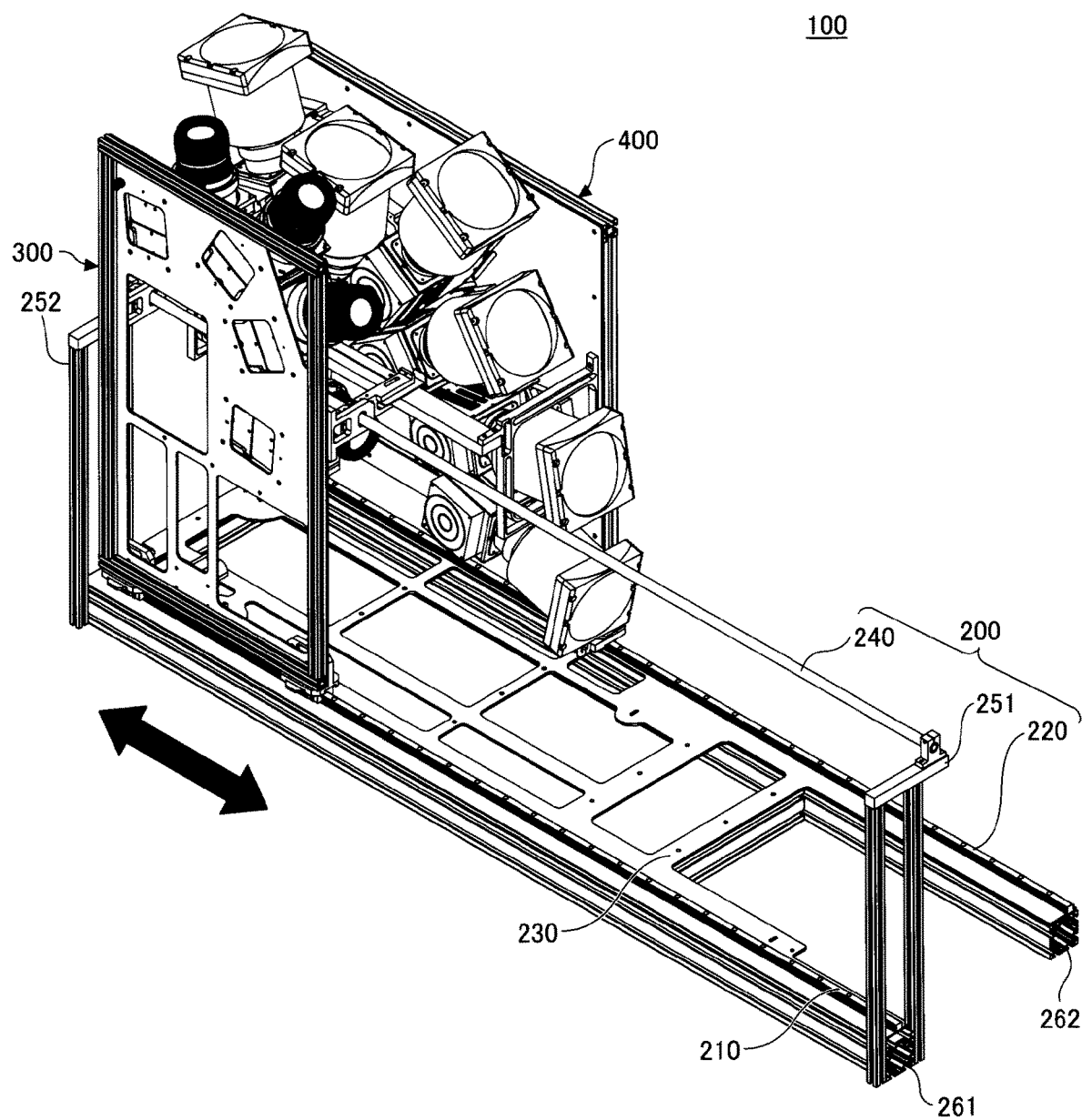
FIG. 1 is a perspective view illustrating an example of configuration of an imaging system according to an embodiment of this disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of a configuration for carrying out the present invention with reference to the drawings.

Hereinafter, a description is given of one or more embodiments with reference to the drawings. In each drawing, the same components are denoted by the same reference numerals, and the duplicate description may be omitted.

In this disclosure, an imaging system according to an embodiment is an apparatus for capturing images of target object, such as structure (e.g., tunnel), to utilize the captured images for performing maintenance and management work of the target object. In the embodiment, the imaging system is described as an example of image capture system, which is mounted on a vehicle, and captures images of internal wall face of a tunnel (hereinafter, tunnel wall face) while moving the vehicle in the tunnel. In this disclosure, the vehicle is an example of "movable apparatus," a travel direction is an example of "moving direction or movement direction" of the movable apparatus, and the tunnel wall face is an example of "target object" or "object."

(Configuration of Imaging Apparatus)

FIG. 1 is a perspective view of an example configuration of an imaging system 100 according to an embodiment. The imaging system 100 includes, for example, a slide unit 200, a camera unit 300, and a lighting unit 400.

The camera unit 300 captures images of wall face of a tunnel. The lighting unit 400 emits projection light onto the wall face of the tunnel for capturing images of the wall face using the camera unit 300.

The slide unit 200 is used for sliding the camera unit 300 and the lighting unit 400 along a direction indicated by an arrow illustrated in FIG. 1. Positions of the camera unit 300 and the lighting unit 400 can be changed along the arrow direction of FIG. 1 using the slide unit 200.

The slide unit 200 includes, for example, rails 210 and 220, a base 230, a guide shaft 240, a guide shaft holding members 251 and 252, and frames 261 and 262.

The camera unit 300 slides on the rail 210 fixed to the frame 261 to change the position along the arrow direction of FIG. 1. Similarly, the lighting unit 400 slides on the rail 220 fixed to the frame 262 to change the position along the arrow direction illustrated in FIG. 1.

The rails 210 and 220 are respectively fixed to the frames 261 and 262 so that the rail axes of the rails 210 and 220 are substantially parallel to each other. The base 230 is fixed to the frames 261 and 262 to connect the frames 261 and 262, and becomes a base of the imaging system 100.

The guide shaft 240 is a member used to stably slide the camera unit 300 and the lighting unit 400 with higher precision. The guide shaft 240 is made of, for example, a metal round bar. The longitudinal direction of the guide shaft 240 (metal round bar) is set along the slide direction of the camera unit 300 and the lighting unit 400.

The guide shaft 240 is held by the guide shaft holding members 251 and 252, in which the guide shaft 240 is inserted into through-holes respectively formed on the guide shaft holding members 251 and 252 to hold the guide shaft 240 using the guide shaft holding members 251 and 252. The configuration and operation of the guide shaft 240 and members in the vicinity of the guide shaft 240 will be described in detail later.

FIG. 1 illustrates one configuration, in which the slide unit 200 is used to slide both the camera unit 300 and the lighting unit 400, but is not limited thereto. For example, one slide unit for sliding the camera unit 300 and another slide unit for sliding the lighting unit 400 may be configured as different units.

The imaging system 100 is attached or mounted on, for example, a roof of vehicle, by setting the slide direction of the camera unit 300 and the lighting unit 400 to intersect the movement direction or traveling direction of vehicle. In other words, the arrow direction of FIG. 1 intersects with the movement direction of vehicle mounted with the imaging system 100. By mounting the imaging system 100 on the vehicle with this arrangement, the positions of the camera unit 300 and the lighting unit 400 can be changed on a plane that intersects the movement direction of vehicle.

The portion of vehicle to which the imaging system 100 is mounted is not limited to the roof. For example, the imaging system 100 can be mounted on a front, a rear bonnet, or a truck bed if the vehicle is a truck. Further, when mounting the imaging system 100 on the vehicle roof, a hook or the like can be used as similar to a vehicle ski carrier.

(Configuration of Camera Unit)

Figure 2:
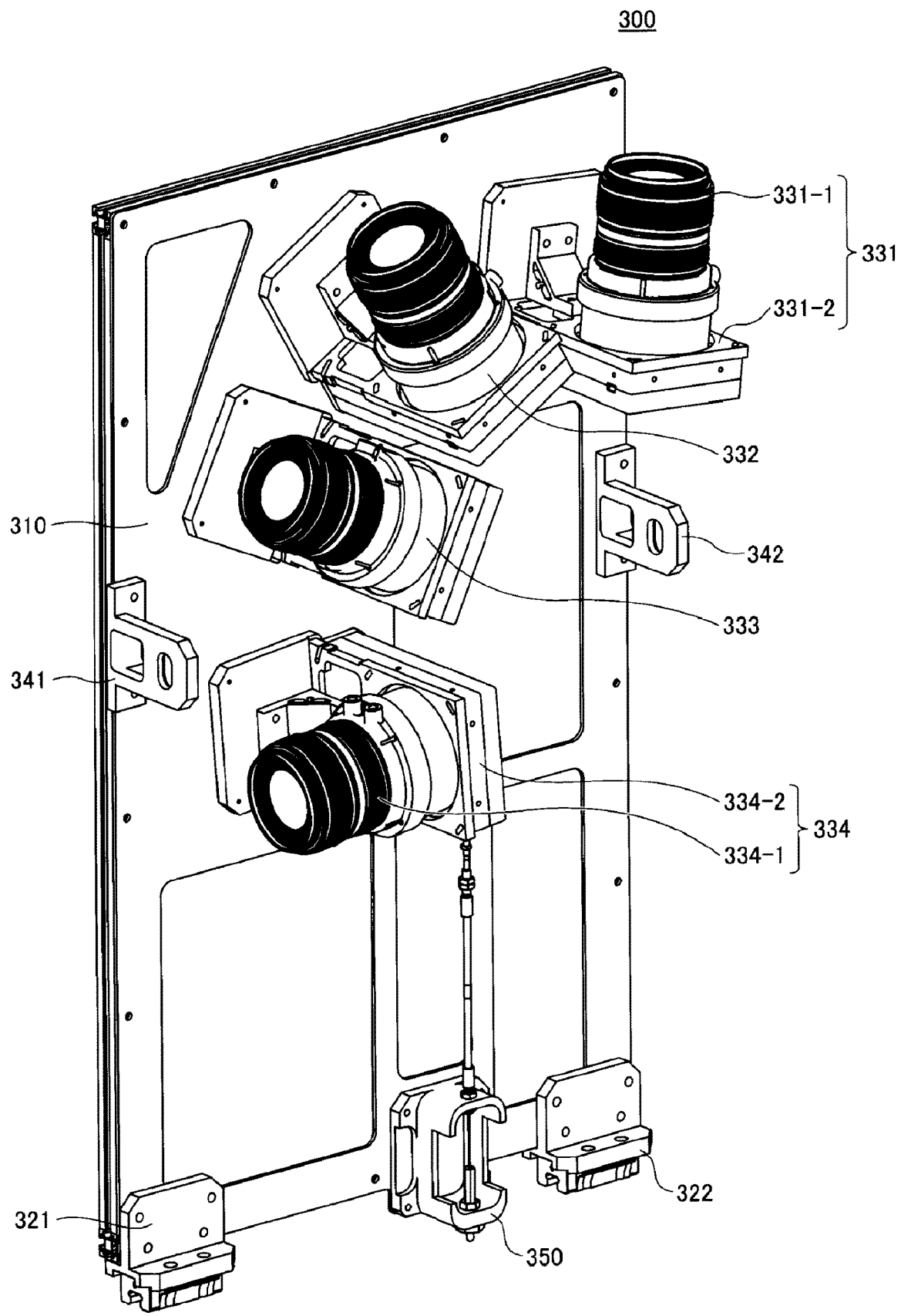
FIG. 2 is a perspective view illustrating an example of configuration of a camera unit according to an embodiment of this disclosure.

FIG. 2 is a perspective view of an example configuration of the camera unit 300 according to the embodiment.

The camera unit 300 includes, for example, a base plate 310, rail connection members 321 and 322, cameras 331 to 334, shaft connection members 341 and 342, and an index plunger 350.

The rail connection members 321 and 322 are used for connecting the base plate 310 and the rail 210. The rail connection members 321 and 322 have a U-shaped shape portion in a cross-section direction perpendicular to the rail axis. If the rail 210 is a double headed rail, the rail connection member 321 and 322 are connected to the rail 210 by covering one head of the double headed rail with the U-shaped portion.

The rail connection members 321 and 322 have the same shape, and are connected to the rail 210 at two positions in the axial direction of the rail 210. By fixing the base plate 310 to the rail connection members 321 and 322, the camera unit 300 is slidable along the direction of the rail axis (the arrow direction in FIG. 1).

The cameras 331 to 334 are fixed to a plane of the base plate 310. The camera 331 has a lens unit 331-1 and a line charge coupled device (CCD) 331-2. The lens unit 331-1 forms an image of object existing in the optical axis direction of the lens unit 331-1 on an imaging face of the line CCD 331-2. The line CCD 331-2 captures the image of object formed by the lens unit 331-1.

Further, an aperture 331-1a (see FIG. 4) is provided inside the lens unit 331-1. The aperture 331-1a is an iris diaphragm having a diaphragm blade, and have an opening that can change the diameter variably. The opening diameter can be changed by connecting a drive unit such as a motor to the diaphragm blade and by driving the motor based on the control signal. With this configuration, the amount of light passing through the lens unit 331-1 can be changed, and the brightness of image of object formed by the lens unit 331-1 can be changed.

The line CCD 331-2 is a CCD, in which pixels are arranged in one dimensional (linear) direction. In the embodiment, the camera 331 is fixed to the base plate 310 so that the arrangement direction of the pixels of the line CCD 331-2 intersects the movement direction of the vehicle. Since the cameras 332 to 334 have the same configuration as the configuration of the camera 331, the description thereof will be omitted.

The tunnel has a semicircular-shaped plane when a virtual cross-sectional plane of the tunnel is cut along the top-to-bottom direction, in which the semicircular-shaped plane intersects the movement direction of vehicle. As illustrated in FIG. 2, the cameras 331 to 334 are disposed radially so that the optical axes of the lenses of the cameras 331 to 334 intersect with the wall face of the tunnel. In other words, the cameras 331 to 334 are radially disposed on the plane of the base plate 310 so as to face the wall face of the tunnel respectively.

By combining or stitching line images captured respectively by the cameras 331 to 334 along the arrangement direction of the cameras 331 to 334, a line image of the wall face of tunnel can be captured in accordance with the internal shape of tunnel. Then, by capturing the above described line images from the vehicle moving inside the tunnel with a pre-set time interval and by combining or stitching the captured line images along a direction orthogonal to the arrangement direction of the cameras 331 to 334, an area image (two dimensional image) of tunnel can be obtained. The pre-set time interval is an acquisition time interval of line image by the line CCD.

In this example case, the number of cameras is four, but is not limited thereto. The number of cameras may be increased or decreased depending on the conditions such as the size of tunnel. Further, the image magnification, field of view and F-number and the like of the lens unit 331-1 may be determined according to the image capture conditions.

Further, the camera 331 is provided with the line CCD as described above, but is not limited thereto. For example, the camera 331 can be provided with an area CCD in which the pixels are arranged two dimensionally. Further, complementary metal-oxide-semiconductor (CMOS) can be used instead of CCD.

The shaft connection members 341 and 342 are used for connecting with the guide shaft 240. The index plunger 350 is used for fixing the camera unit 300 at a desired position in the slide direction. The configuration and operation of the shaft connection members 341 and 342 and the index plunger 350 will be described in detail later.

(Configuration of Lighting Unit)

Figure 3:
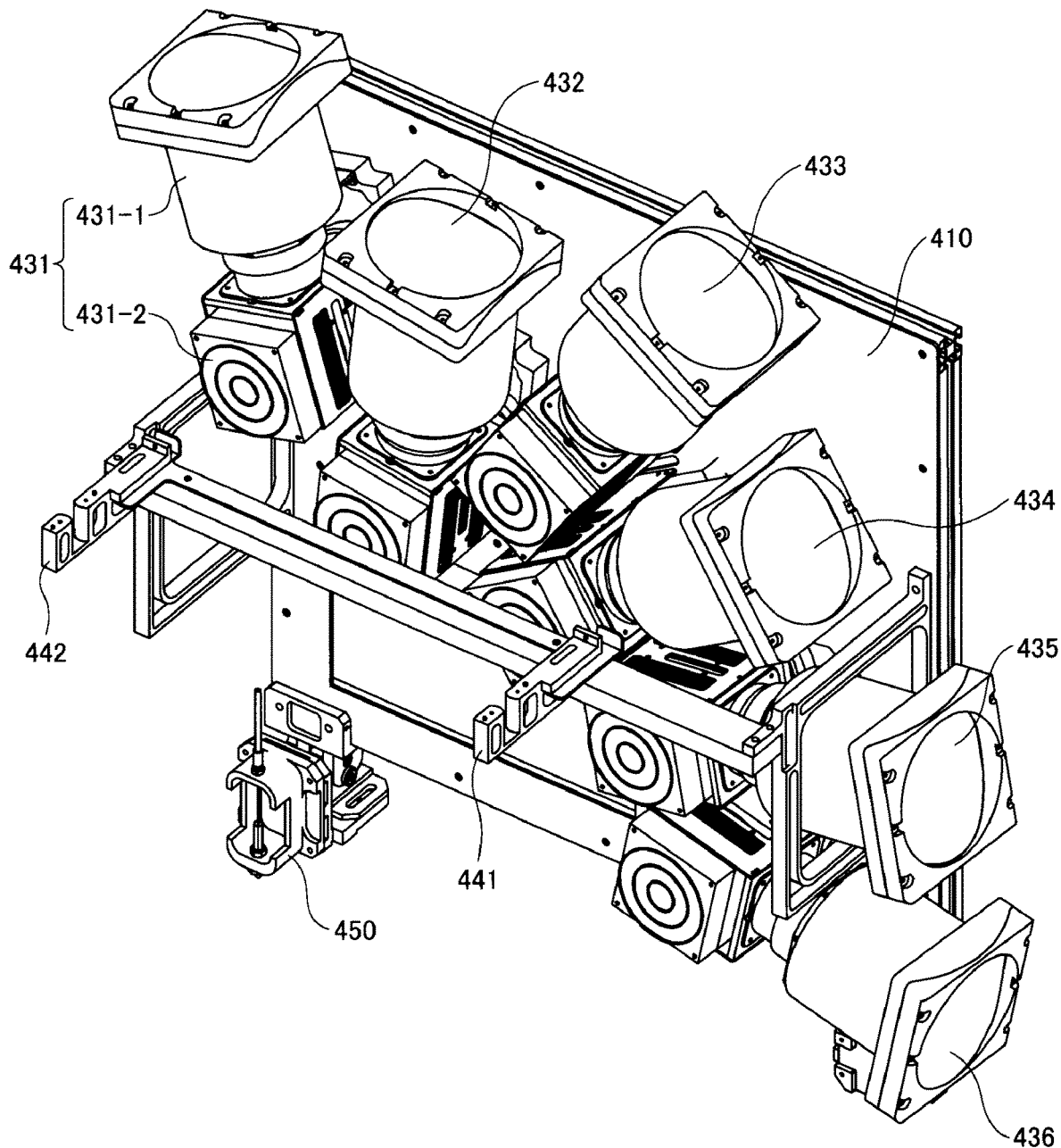
FIG. 3 is a perspective view illustrating an example of configuration of a lighting unit according to an embodiment of this disclosure.

FIG. 3 is a perspective view of an example configuration of the lighting unit 400 according to the embodiment.

The lighting unit 400 includes, for example, a base plate 410, a rail connection member, light source units 431 to 436, shaft connection members 441 and 442, and an index plunger 450. The relationship between the rail connection member and the rail 220 is similar to the relationship between the rail connection members 321 and 322 and the rail 210 described above.

The light source units 431 to 436 are fixed to a plane of the base plate 410. The light source unit 431 includes a lens unit 431-1 and a light source 431-2.

The light source 431-2 emits projection light onto an object existing in the optical axis direction of the lens unit 431-1 through the lens unit 431-1. Further, an aperture 431-1a is provided inside the lens unit 431-1 (see FIG. 4).

The aperture 431-1a have an opening that can change the diameter variably. By changing the diameter of opening, the light quantity (brightness) of the projection light projected through the lens unit 431-1 can be changed. The light source 431-2 can be a metal halide light, light emitting diode (LED), or the like. Since the light source units 432 to 436 have the same configuration as the light source unit 431, the description thereof will be omitted.

As described above, the tunnel has a semicircular-shaped plane when a virtual cross-sectional plane of the tunnel is cut along the top-to-bottom direction, in which the semicircular-shaped plane intersects the movement direction of vehicle. As illustrated in FIG. 3, the light source units 431 to 436 are disposed radially so that the optical axes of the lenses of the light source units 431 to 436 intersect with the wall face of the tunnel. In other words, the light source units 431 to 436 are disposed radially on the plane of the base plate 410 so as to face the wall face of the tunnel. Therefore, the lighting unit 400 can project the line-shaped light onto the wall face of the tunnel along a direction (the direction in which the pixels of the line CCD are arranged) intersecting the movement direction of vehicle.

In this example case, the number of light source units is six, but is not limited thereto. The number of light source units can be increased or decreased. Further, the number of light source units is not necessarily equal to the number of cameras. The number of light source units can be determined according to conditions such as brightness. Further, the lens angle of view and F-number can be also determined according to the image capture conditions.

Further, as illustrated in FIG. 3, the respective positions of the light source units 431 to 436 are shifted slightly along the direction of the optical axis of the lens to prevent the physical interference between the light source units 431 to 436.

The shaft connection members 441 and 442 are used for connecting with the guide shaft 240. The index plunger 450 is used for fixing the lighting unit 400 at a desired position in the slide direction. The configuration and operation of the shaft connection members 441 and 442 and the index plunger 450 will be described in detail later.

(Hardware Configuration of Imaging System)

FIG. 4 is an example of hardware block diagram of the imaging system 100. The imaging system 100 includes, for example, the camera unit 300, the lighting unit 400, an imaging control unit 110, a time-of-flight (TOF) sensor 141, an inertial measurement unit (IMU) 170, and a vehicle speedometer/travel distance meter 171.

The TOF sensor 141 measures a distance from a wall face of a tunnel 600 to the TOF sensor 141 to detect a distance from the wall face of the tunnel 600 to the imaging system 100.

More specifically, the distance to the wall face of the tunnel 600 is measured based on the time difference between a start time of projecting the light from the lighting unit 400 to the wall face of the tunnel 600 and a time of receiving the light by the TOF sensor 141. If the TOF sensor 141 employs an area sensor as the light receiving element, two dimensional contour image having a different display color depending on the distance can be obtained.

The IMU 170 measures the angle, angular velocity, and acceleration with respect to the three axes used for controlling the motion or movement of the vehicle 500, and the vehicle speedometer/travel distance meter 171 measures the speed and travel distance (movement distance) of the vehicle 500.

The data measured by the IMU 170 and the vehicle speedometer/travel distance meter 171 are stored in the HDD 114 via the imaging control unit 110, and are used to perform the geometric correction of the size and inclination of image of the wall face when performing the image processing.

The camera unit 300 includes, for example, lens units 331-1, 332-1, 333-1 and 334-1, and the line CCDs 331-2, 332-2, 333-2 and 334-2. Further, the lens unit 331-1 is provided with an aperture 331-1a, the lens unit 332-1 is provided with an aperture 332-1a, the lens unit 333-1 is provided with an aperture 333-1a, and the lens unit 334-1 is provided with an aperture 334-1a. In FIG. 4, for simplifying the description of drawing, the lens unit 331-1, aperture 331-1a and line CCD 331-2 alone are illustrated, and other lens unit, aperture and line CCD are omitted.

The lighting unit 400 includes, for example, lens units 431-1, 432-1, 433-1, 434-1, 435-1 and 436-1, and light sources 431-2, 432-2, 433-2, 434-2, 435-2, and 436-2. Further, the lens unit 431-1 is provided with an aperture 431-1a, the lens unit 432-1 is provided with an aperture 432-1a, the lens unit 433-1 is provided with an aperture 433-1a, the lens unit 434-1 is provided with an aperture 434-1a, the lens unit 435-1 is provided with an aperture 435-1a, and the lens unit 436-1 is provided with an aperture 436-1a. In FIG. 4, for simplifying the description of drawing, the lens unit 431-1, aperture 431-1a and light source 431-2 alone are illustrated, and other the lens, aperture and light sources are omitted.

As illustrated in FIG. 4, the imaging control unit 110 includes, for example, a central processing unit (CPU) 111, a read only memory (ROM) 112, a random access memory (RAM) 113, a hard disk drive (HDD) 114, an external interface (UF) 115, and a buzzer 116, which are electrically connected to each other by a system bus 117. The imaging control unit 110 is an example of a computer.

The ROM 112 stores various programs, data and setting information, and the RAM 113 temporarily stores programs and data. The CPU 111 reads the various programs, data and setting information from the ROM 112 onto the RAM 113, and executes the various programs, data and setting information to implement controlling of the imaging system 100 entirely and processing of image data. The processing of image data includes, for example, processing of combining or stitching the line images captured respectively by the cameras 331 to 334, and processing of combining or stitching the line images captured by the cameras 331 to 334 from the vehicle moving inside the tunnel with a pre-set time interval along the movement direction of vehicle. Further, the CPU 111 can implement various functions to be described later in detail with reference to FIGS. 15 to 18.

Some or all of the controlling, processing of image data, and various functions implemented by the CPU 111 can be implemented by field-programmable gate array (FPGA), and application specific integrated circuit (ASIC).

The HDD 114 stores image data input from the camera unit 300, and sensor data input from the TOF sensor 141, the IMU 170 and the vehicle speedometer/travel distance meter 171.

The external I/F 115 implements a function of user interface for operating the imaging system 100, and a function of interface for the imaging system 100 to communicate data and signals with external devices, such as personal computer (PC).

The buzzer 116 generates a beep sound to notify a warning to a user.

Further, the imaging control unit 110 can be connected to an external device, such as personal computer (PC) via the external I/F 115 so that the imaging control unit 110 and the external device can be configured to transmit and receive data, such as image data with each other.

(Image Capturing Method, Operation, Effect)

Hereinafter, a description is given of operation and effect of the imaging system 100 according to the embodiment.

In the imaging system 100, the camera unit 300 and the lighting unit 400 can be slide using the slide unit 200, and then fixed at two positions determined based on a length of a given road structure in the direction intersecting the movement direction of vehicle.

The length of given road structure is a width of sidewalk in the direction intersecting the movement direction of vehicle.

The sidewalk is a road for pedestrians to pass, which is constructed with the vehicle road, and is a part of the road that is structurally partitioned to allow pedestrians to pass. The width of sidewalk varies depending on the pedestrian traffic, such as about 1.5 m to 3 m.

If the width of sidewalk is 1.5 m, the spacing or interval between two positions can be set as 1.5 m based on the width of sidewalk. Alternatively, if the width of sidewalk is 3 m and exceeds the width of vehicle, the spacing or interval between two positions determined based on the width of sidewalk can be set to the maximum width of vehicle.

If there is an audit path or a road-side strip in addition to the sidewalk, the spacing or interval between two positions determined based on the width of sidewalk can be determined as a length of difference between the width of the sidewalk and the width of audit path or between the width of the sidewalk and the width of roadside strip.

When images are acquired at the two positions, the camera unit 300 and the lighting unit 400 are fixed at one of the two positions determined based on the width of sidewalk in the direction intersecting the movement direction of vehicle to acquire an area image of tunnel in a target region. Then, the camera unit 300 and the lighting unit 400 are fixed at the other position of the two positions to acquire an area image of tunnel in a target region.

Figure 5B:
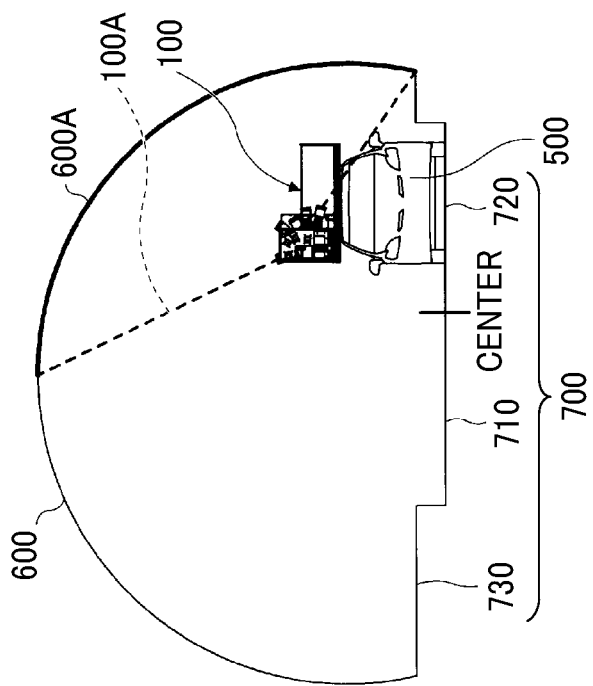
FIG. 5B illustrates an example of an image capture operation performed by an imaging system when a distance from the imaging system to a wall of a tunnel is short, in which a vehicle moves inside the tunnel.
Figure 5A:
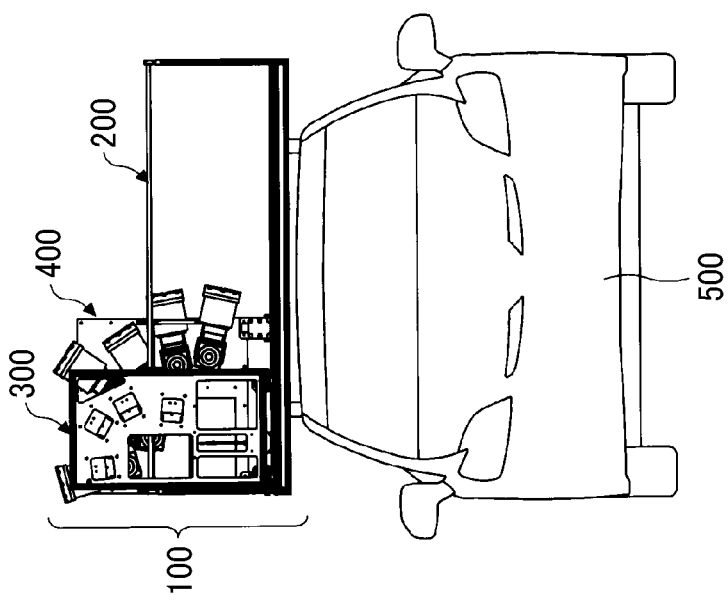
FIG. 5A illustrates an example of an image capture operation performed by an imaging system when a distance from the imaging system to a wall of a tunnel is short, in which a vehicle is viewed from a movement direction.

Hereinafter, a description is given of a method of capturing images of the wall face of the tunnel 600 from the two positions with reference to FIGS. 5 and 6. FIG. 5 illustrates an example of an image capture operation performed by the imaging system 100 when a distance from the imaging system 100 to the wall face of the tunnel 600 is short. FIG. 5A is a diagram illustrating the vehicle 500 viewed from the movement direction. FIG. 5B illustrates a state in which the vehicle 500 moves or travels inside the tunnel 600.

As illustrated in FIG. 5A, the imaging system 100 is fixed on a roof of the vehicle 500. The camera unit 300 and the lighting unit 400 are moved toward the right end of the slide unit 200 when viewed along the movement direction, and are fixed to the slide unit 200 by the index plungers 350 and 450 (see FIGS. 2 and 3), respectively.

As illustrated in FIG. 5B, a traffic lane 710 is on the left side of a road 700, and a traffic lane 720 is on the right side of the road 700. In the traffic lane 720, the vehicle 500 moves in one direction.

In this example case, a sidewalk 730 is provided on a side of the traffic lane 710 (the opposite lane of the vehicle 500).

Since there is no sidewalk on a side of the traffic lane 720, the vehicle 500 moves at positions closer to the wall face of the tunnel 600 compared to when the vehicle 500 moves on the traffic lane 710 having the sidewalk 730.

The camera unit 300 and the lighting unit 400 are disposed at the position away from the wall face of the tunnel 600 that the left side of the vehicle 500 faces, in which the camera unit 300 and the lighting unit 400 are set at the right end of the slide unit 200 along the movement direction of the vehicle 500. In this example case, the positions of the camera unit 300 and the lighting unit 400 are hereinafter referred to as position A.

The dashed line 100A in FIG. 5B represents an image capture area of the imaging system 100. In other words, the imaging system 100 captures images of a first area 600A (indicated by a thick line) corresponding to the image capture area indicated by the dashed line 100A among the entire wall face of the tunnel 600. As indicated by the thick line, the imaging system 100 captures images from the upper wall face to the lower wall face of the tunnel 600 (i.e., a boundary between the tunnel wall end and the ground).

By performing the image capturing operation using the imaging system 100 while moving the vehicle 500, the images of the wall face at the right half of the tunnel 600 (see FIG. 5B) are captured from the entrance to the exit of the tunnel 600.

Figure 6B:
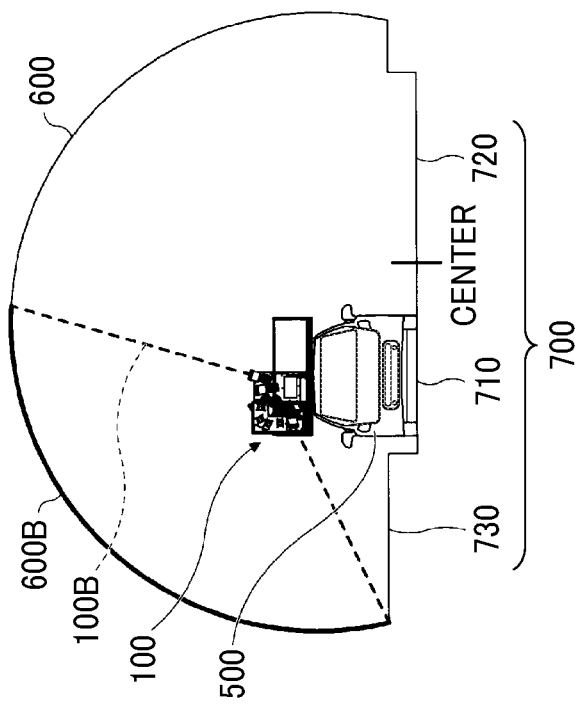
FIG. 6B illustrates an example of an image capture operation performed by an imaging system when a distance from the imaging system to a wall of a tunnel is long, in which a vehicle moves inside the tunnel.
Figure 6A:
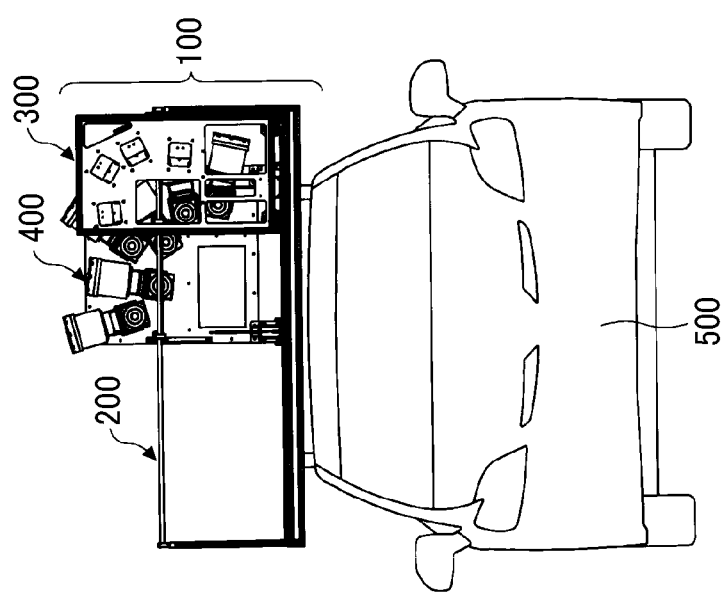
FIG. 6A illustrates an example of an image capture operation performed by an imaging system when a distance from the imaging system to a wall of a tunnel is long, in which a vehicle is viewed from a movement direction.

FIG. 6 illustrates an example of an image capture operation performed by the imaging system 100 when a distance from the imaging system 100 to the wall face of the tunnel 600 is long. FIG. 6A is a diagram illustrating the vehicle 500 viewed from the movement direction. FIG. 6B illustrates a state in which the vehicle 500 moves or travels inside the tunnel 600. The portions same as FIG. 5 are omitted, and differences alone are described for FIG. 6.

In an example case of FIGS. 6A and 6B, the camera unit 300 and the lighting unit 400 are moved toward the left end of the slide unit 200 when viewed along the movement direction, and are fixed to the slide unit 200 by the index plungers 350 and 450 (see FIGS. 2 and 3), respectively.

In an example case of FIG. 6B, the vehicle 500 moves on the traffic lane 710 along the movement direction of the vehicle 500, in which the vehicle 500 is viewed from the rear side.

In this example case of FIG. 6B, the sidewalk 730 is provided on a side of the traffic lane 710, which is the lane where the vehicle 500 moves on. That is, the vehicle 500 moves on the traffic lane opposite to the traffic lane illustrated in FIG. 5B along the reverse direction. In this example case of FIG. 6B, compared to the case where there is no sidewalk on the traffic lane side (FIG. 5B), the vehicle 500 moves at the positions away from the wall face of the tunnel 600 when viewed from the vehicle 500.

In this example case of FIG. 6B, the camera unit 300 and the lighting unit 400 are disposed at the positions close to the wall face of the tunnel 600 that the left side of the vehicle 500 faces, in which the camera unit 300 and the lighting unit 400 are set at the left end of the slide unit 200 along the movement direction of the vehicle 500. In this example case, the positions of the camera unit 300 and the lighting unit 400 are hereinafter referred to as position B.

The dashed line 100B in FIG. 6B represents an image capture area of the imaging system 100. In other words, the imaging system 100 captures images of a second area 600B (indicated by a thick line) corresponding to the image capture area indicated by the dashed line 100B among the entire wall face of the tunnel 600. As indicated by the thick line, the imaging system 100 captures the images from the upper wall face to the lower wall face of the tunnel 600 (i.e., a boundary between the tunnel wall end and the ground).

By performing the image capturing operation using the imaging system 100 while moving the vehicle 500, the images of the wall face at the right half of the tunnel 600 (see FIG. 6B) are captured from the entrance to the exit of the tunnel 600.

By combining or stitching the images of wall face captured in the state of FIG. 5 and the images of the wall face captured in the state illustrated in FIG. 6, an image of the entire wall face of the tunnel 600 from the entrance to the exit of the tunnel 600 can be acquired.

In the above described configuration, it is desirable that each camera of the camera unit 300 captures the image by overlapping an image capture area of each camera of the camera unit 300. In order to create a single development-view image by combining or stitching the images, it is desirable that the images on one side without the sidewalk (see FIG. 5) and the images on another side with the sidewalk (FIG. 6) are captured by overlapping the images at a ceiling portion. In other words, when the images of the wall face of the tunnel 600 are captured by moving the vehicle 500 along one direction and then the opposite direction, it is desirable to overlap the image capture area of one direction and the image capture area of the opposite direction in the direction intersecting the movement direction of the vehicle 500 when capturing the images so as to prevent the missing of images of the wall face of the tunnel 600.

In the embodiment, the positions of the camera unit 300 and the lighting unit 400 can be switched to the positions A and B in accordance with the presence and absence of the sidewalk and then fixed, with which the distance from the wall face, closer to the vehicle 500, to the imaging system 100 (i.e., the distance to object) can be set substantially at a constant value. As a result, the image capturing operation setting the common image capturing operation conditions for focusing, image magnification and brightness of lighting unit can be performed regardless of the presence or absence of sidewalk. Further, since the images of the right half wall and the images of the left half wall face of the tunnel 600 can be captured under the common image capturing operation conditions, the image processing of combining or stitching these images can be easily performed.

Accordingly, the images of the wall face of the tunnel 600 can be captured suitably without complex workloads, such as focus adjustment of camera and the measurement of cross-sectional shape of the structure.

Further, the following effects can be also attained. For example, if the camera focus adjustment is performed while the vehicle is moving, the adjustment mechanism may fail due to the vibration of moving vehicle, and irregular movement such as sudden braking, rapid acceleration, or the like.

Further, if the adjustment mechanism employs a cam mechanism having a cam groove and a cam follower, the cam follower may move on the cam groove gradually due to the vibration caused by the movement of the vehicle, and then the focus condition may change. Further, if dust in the tunnel enters inside the cam mechanism, malfunction may occur.

As to the embodiment, since the focus adjustment of camera is not performed while the vehicle is moving, the probability of these failures can be reduced. Further, the device or apparatus cost can be reduced because the slide mechanism is simple for the embodiment. Further, the computing cost can be reduced because the complex image processing, such as detecting the contrast of texture of object for adjusting the focusing, is not required.

Further, when moving inside the tunnel that is dark and has lesser feature values, it is difficult to detect the contrast of image. If the contrast detection is to be performed with sufficient accuracy, the imaging element having higher sensitivity and higher cost is required. According to the embodiment, these technical difficulties and the cost of imaging element can be reduced.

Further, when the camera unit uses the line imaging element, only one line image is obtained, causing difficulty to adjust the focusing using the captured image. According to the embodiment, since the focus adjustment does not use the captured image, the line imaging element can be used for the camera unit. With this configuration, the image capturing operation can be performed with higher lighting efficiency to be described later.

Further, the following effects can be also attained in addition to the above effects. For example, it is assumed that the camera unit 300 and the lighting unit 400 are placed at a position relatively displaced from the center of the tunnel 600 when performing the image capturing operation. The center of the tunnel 600 refers to the approximate center of the half circle in the semicircular cross-sectional shape of the tunnel 600.

In this case, the difference in the condition of the imaging magnification becomes greater with respect to the image of the wall face near the ceiling of the tunnel 600 (the image acquired by the camera 331 in FIG. 2) and the image of the wall face near the ground of the tunnel 600 (the image acquired by the camera 334 in FIG. 2). As a result, there is a problem that the resolution of the image fluctuates greatly between the ceiling of the tunnel 600 and the vicinity of ground.

This problem may be solved by performing one method described in JP-2011-095222-A, in which a vehicle moves along the center of a road by ignoring the traffic lane to capture images of the wall face of tunnel by setting the substantially same distance to the wall face of tunnel However, this method may be inconvenient because the image capturing operation is performed at night when the number of vehicles on the road is small, or performed by blocking the road traffic due to a concern of collision with an oncoming vehicle during the image capturing operation. Further, if a median strip is provided on a road in the tunnel, the image capturing operation using the vehicle moving along the center of road cannot be performed.

By contrast, as to the embodiment, the camera unit 300 and the lighting unit 400 can be set closer to the center of the tunnel 600 when the vehicle 500 is near and far from the wall face of the tunnel 600, so that a difference in the image capturing operation conditions in each area of the tunnel can be reduced. Therefore, without blocking the road traffic of vehicles on the traffic lane, the image capturing operation can be performed with less troubles, such as a difference in image resolution between the vicinity of ceiling of the tunnel 600 and the vicinity of ground of the tunnel 600, while moving the vehicle on the traffic lane.

In the embodiment, the slide unit 200 is used to change the positions along the arrow direction illustrated in FIG. 1, but is not limited thereto. For example, the slide unit 200 can be used to change the positions along any direction on a plane intersecting the movement direction of vehicle.

In the embodiment, the camera unit 300 and the lighting units 400 are fixed at different two positions along the arrow direction illustrated in FIG. 1 using the slide unit 200, but is not limited thereto. For example, the camera unit 300 and the lighting unit 400 can be fixed at different two positions, in a direction extending from the wall face of tunnel, on a plane intersecting the movement direction of vehicle.

Hereinafter, the "direction extending from the wall face of tunnel" is described. As described above, the tunnel has a semicircular-shaped plane when a virtual cross-sectional plane of the tunnel is cut along the top-to-bottom direction, in which the semicircular-shaped plane intersects the movement direction of vehicle. Therefore, as to the wall face of tunnel, the wall face near the ground faces the horizontal direction while the wall face in the vicinity of the ceiling faces the substantially vertical downward direction. The "direction extending from the wall face of tunnel" refers to a direction that is different depending on the positions on the wall face of tunnel. The "direction extending from the wall face of tunnel" in the vicinity of ground is substantially the horizontal direction. On the other hand, the "direction extending from the wall face of tunnel" in the vicinity of the ceiling" is substantially the vertical downward direction.

Hereinafter, a description is given of configuration and operation of the guide shaft 240.

The camera unit 300 and the lighting unit 400 are separate components and slide independently. Therefore, when the guide shaft 240 is not applied, there is a possibility that the pitching, yawing, rolling, and the like may occur randomly at the time of sliding of the camera unit 300 and the lighting unit 400, respectively.

Further, when the imaging system 100 is to be detached from the vehicle 500, the relative positions and/or postures of the camera unit 300 and the lighting unit 400 (hereinafter referred to as "relative position/posture") may vary. Further, the relative position/posture of the camera unit 300 and the lighting unit 400 may vary due to the vibration of the moving vehicle, and the relative position/posture of the camera unit 300 and the lighting unit 400 may vary due to deformation of members, such as the frames 261 and 262, and the base plates 310 and 410 caused by the temperature effect.

If such fluctuation occurs, the projection light may not hit the image capture area of the camera unit 300 sufficiently or suitably, and thereby the image cannot be captured due to insufficient brightness.

FIG. 7 illustrates an example case when the relative position/posture of the camera unit 300 and the lighting unit 400 fluctuates and thereby the projection light does not appropriately hit the image capture area of the camera unit 300. FIG. 7A illustrates one case where there is no fluctuation in the position/posture of the camera unit 300 and the lighting unit 400. FIG. 7B illustrates another case where the relative position/posture of the camera unit 300 and the lighting unit 400 fluctuates.

FIG. 7A illustrates a view of the vehicle 500 moving along a direction indicated by of an arrow viewed from above. The tunnel 600 has a wall face. An image capture area 361 represents the image capture area of the camera unit 300, and a portion of the wall face of the tunnel 600 overlapping with the image capture area 361 becomes the image capture area of the camera unit 300 on the wall face. A lighting area 461 represents a lighting area of the lighting unit 400, and a portion of the wall face of the tunnel 600 overlapping with the lighting area 461 becomes the lighting area of the lighting unit 400 on the wall face.

In an example case of FIG. 7A, since there is no fluctuation in the position/posture between the camera unit 300 and the lighting unit 400, the image capture area of the camera unit 300 overlaps with the lighting area of the lighting unit 400. In other words, the projection light appropriately lights or emits the light onto the image capture area.

On the other hand, in an example case of FIG. 7B, the position/posture between the camera unit 300 and the lighting unit 400 vary independently, in which the image capture area 362 and the lighting area 462 change from the state of FIG. 7A, and the image capture area and the lighting area on the wall face of the tunnel 600 do not overlap with each other. In other words, due to fluctuations of the position/posture between the camera unit 300 and the lighting unit 400, the projection light does not appropriately lights or emits the light onto the image capture area.

In particular, in the embodiment, the line CCD is used as the imaging element to narrow the image capture area (region) in the movement direction of the vehicle 500. In this case, the projection light is concentrated in a narrow range, so that the lighting efficiency becomes higher, which is preferable inside a dark tunnel that requires sufficient amount of projection light (hereinafter, illumination-light quantity). On the other hand, since the image capture area along the movement direction of the vehicle 500 is set narrower, when the relative position/posture of the camera unit 300 and the lighting unit 400 fluctuates, the projection light may not appropriately lights or emits the light onto the image capture area of the camera unit 300.

Figure 8:
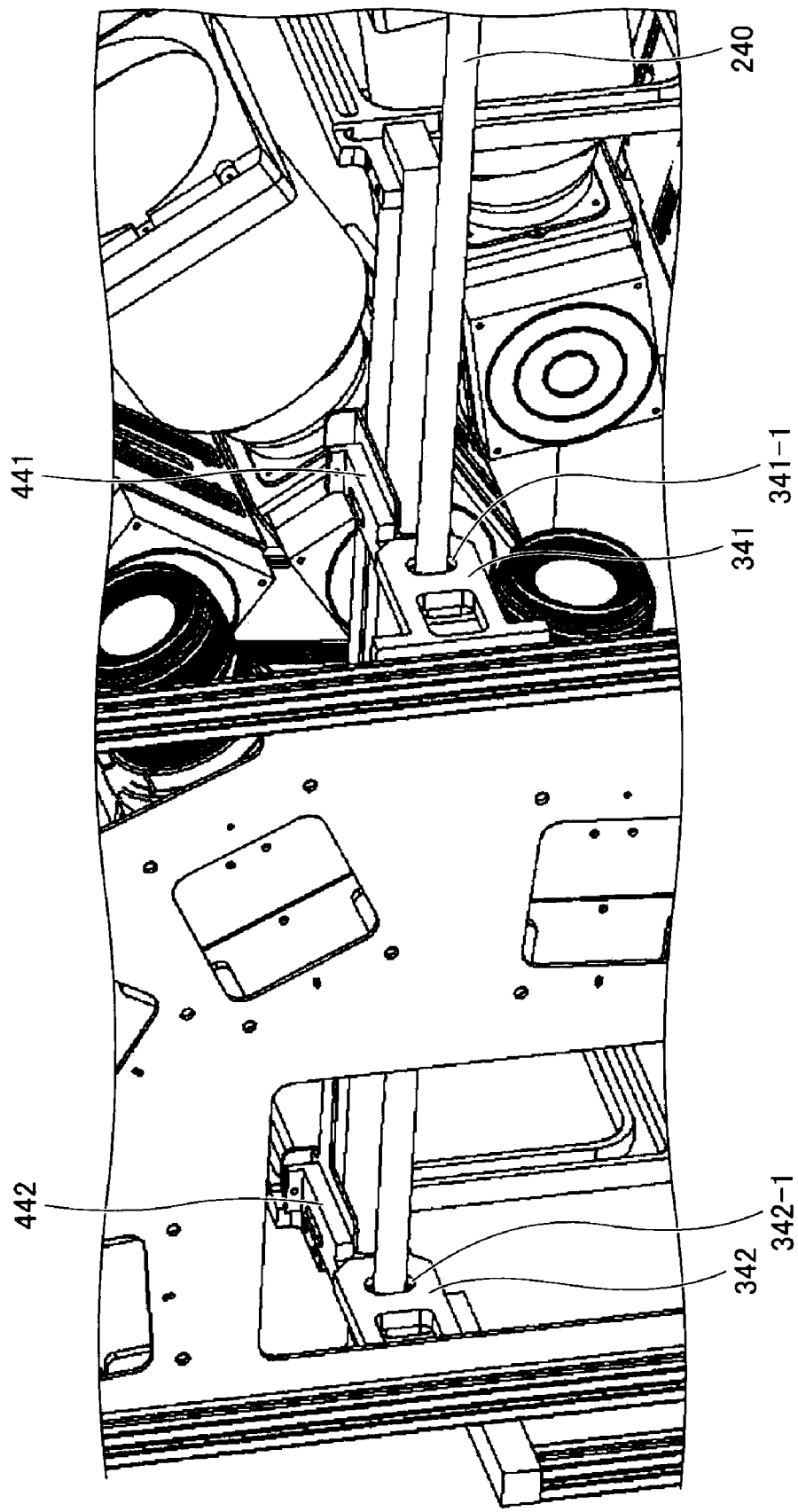
FIG. 8 illustrates an example configuration of a guide shaft and a guide shaft holding member.

Therefore, in order to prevent the inappropriate lighting of the image capture area by the projection light, the imaging system 100 includes the guide shaft 240. Hereinafter, a description is given of the guide shaft 240 with reference to FIG. 8. FIG. 8 illustrates an example configuration of the guide shaft 240 and the guide shaft holding members 251 and 252 according to the embodiment.

In FIG. 8, the guide shaft 240 is held by the guide shaft holding members 251 and 252 (see FIG. 1). The shaft connection members 341 and 342 are fixed to the base plate 310 of the camera unit 300.

Further, the shaft connection members 341 and 342 are respectively provided with through-holes 341-1 and 342-1. By inserting the guide shaft 240 through the through-holes 341-1 and 342-1, the guide shaft 240 and the camera unit 300 are connected to each other. Similarly, by inserting the guide shaft 240 through the through-holes provided to the shaft connection members 441 and 442, the guide shaft 240 and the lighting unit 400 are connected to each other.

The camera unit 300 and the lighting unit 400 can slide while being coupled to the guide shaft 240. In other words, the common member can be used as a guide for sliding.

Therefore, when any one of the position/posture of the camera unit 300 and the position/posture of the lighting unit 400 fluctuates, the other changes accordingly. That is, the camera unit 300 and the lighting unit 400 can be slide and stopped while maintaining the relative position/posture of the camera unit 300 and the lighting unit 400. With this configuration, the fluctuation of the relative position/posture of the camera unit 300 and the lighting unit 400 can be reduced, and the problem that the projection light does not adequately light or emit the light onto the image capture area can be prevented.

Figure 9:
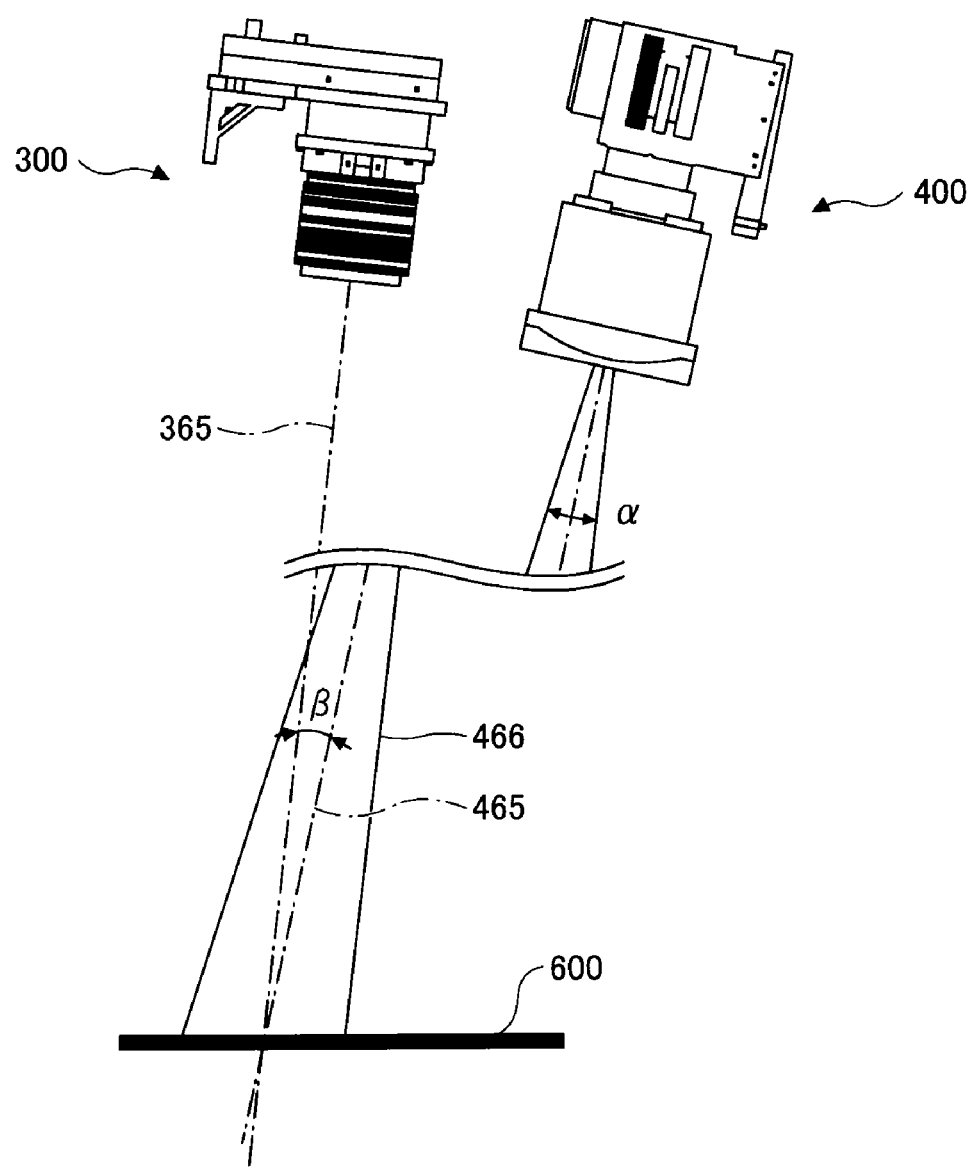
FIG. 9 illustrates an example of a relationship between an image capture area and a lighting area inclined with respect to a wall face of tunnel.

FIG. 9 illustrates an example of an image capture area of the camera unit 300 when the camera unit 300 is inclined with respect to the wall face of the tunnel 600, and an example of a lighting area of the lighting unit 400 when the lighting unit 400 is inclined with respect to the wall face of the tunnel 600.

In an example case of FIG. 9, the lighting unit 400 irradiates the wall face of the tunnel 600 with an projection light 466 that is a divergent light having an optical axis 465.

A light distribution angle (divergence angle) α of the projection light 466 is about 1.65 degrees. The camera unit 300 captures images of the wall face of the tunnel 600. The camera unit 300 has an optical axis 365.

When the relative position of the camera unit 300 and the lighting unit 400 fluctuates due to a meandering drive operation of the vehicle 500 (e.g., course change), as illustrated in FIG. 9, the camera unit 300 and the lighting unit 400 may inclined with respect to the wall face of tunnel 600, respectively. In this case, since the relative position/posture of the camera unit 300 and the lighting unit 400 is maintained, as illustrated in FIG. 9, a state in which the image capture area of the camera unit 300 overlaps with the lighting area of the lighting unit 400 can be maintained.

With this configuration, even when the positions of the camera unit 300 and the lighting unit 400 fluctuate by the meandering drive operation of the vehicle 500, the image capture area of the camera unit 300 can be appropriately illuminated by the lighting unit 400. In the embodiment, the line CCD is used, but the same effect can be attained even when the area CCD or the like is used.

Figure 10:
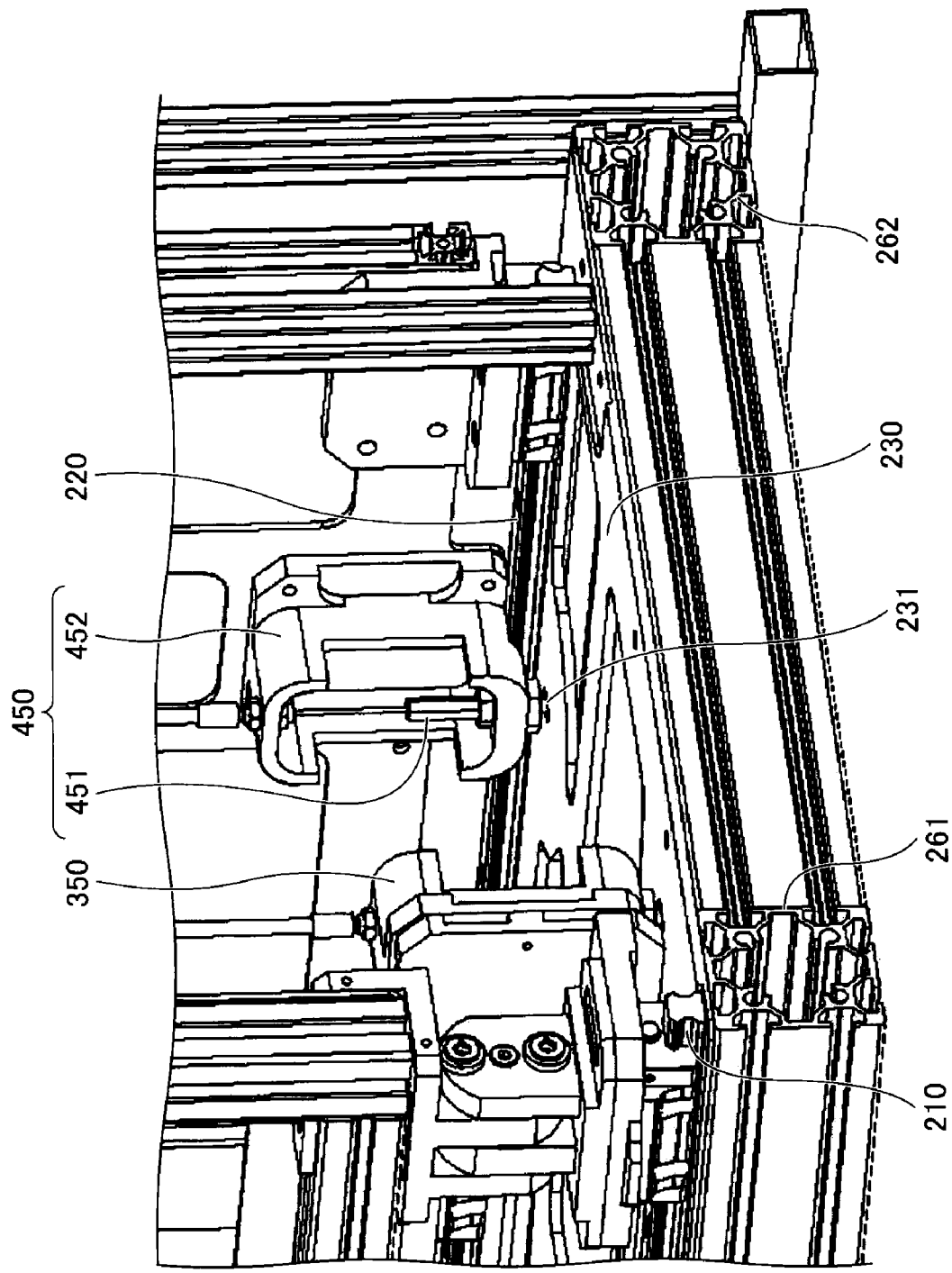
FIG. 10 illustrates an example of configuration of an index plunger.

Hereinafter, a description is given of configuration and the operation of the index plunger 350 and 450 with reference to FIG. 10. FIG. 10 illustrates an example of configuration of the index plungers 350 and 450.

In an example case of FIG. 10, the index plunger 350 is fixed to a plane of the base plate 310 of the camera unit 300, and the index plunger 450 is fixed to a plane of the base plate 410 of the lighting unit 400.

As described above, the camera unit 300 slides on the rail 210 while the lighting unit 400 slides on the rail 220. Since the index plunger 350 and 450 have similar configuration and operation, the index plunger 450 alone is described.

The index plunger 450 includes, for example, a plunger 451 and a plunger holding member 452. The plunger 451 has a pin having a round bar shape projecting toward a ground side, a spring having a biasing force applied to the pin toward the ground side, and a spring pressing member to press the pin and the spring. The plunger holding member 452 holds the plunger 451.

The base 230 of the slide unit 200 is provided with a fitting hole 231 for fitting the pin to a position where the lighting unit 400 is to be fixed, in the sliding direction of the lighting unit 400. Therefore, when the index plunger 450 moves by sliding the lighting unit 400 over the base 230, and the pin of the plunger 451 exists in any position where the fitting hole 231 does not exist, the pin of the plunger 451 contacts the base 230 but does not act to fix the lighting unit 400.

Then, when the index plunger 450 moves by sliding the lighting unit 400 over the base 230, and the pin of the plunger 451 comes to a position where the fitting hole 231 exists, the pin of the plunger 451 projects into the fitting hole 231 by the biasing force of the spring, and engages with the fitting hole 231. With this configuration, the lighting unit 400 cannot be slide, and thereby the lighting unit 400 is fixed. When the fixing state of the lighting unit 400 is to be released or canceled to enable the lighting unit 400 to slide again, a fixing release mechanism is operated manually to release or cancel the fixing state of the lighting unit 400.

In the embodiment, the base 230 has a fitting hole at a position corresponding to the position A and a fitting hole at a position corresponding to the position B in the slide direction, respectively. With this configuration, the lighting unit 400 can be fixed at different two positions on the plane intersecting the movement direction of vehicle. Similarly, the camera unit 300 can be fixed at different two positions on a plane intersecting the movement direction of vehicle using the index plunger 350.

In the embodiment, the index plunger 450 is fitted into the fitting hole 231 provided on the base 230 to fix the lighting unit 400, but is not limited thereto. For example, the pin can be fitted and fixed into a fitting hole provided on the frame 262 and the rail 220 to fix the lighting unit 400, or the lighting unit 400 can be fixed by contacting with the base 230 to set the position of the lighting unit 400 on the base 230 and then fixing the lighting unit 400 on the base 230 using bolts or the like as the clamping member.

Hereinafter, a description is given of an example of an effect of inclining the projection direction of projection light emitted from the lighting unit 400 with respect to the image capture direction of the camera unit 300 with reference to FIG. 11.

Figure 11:
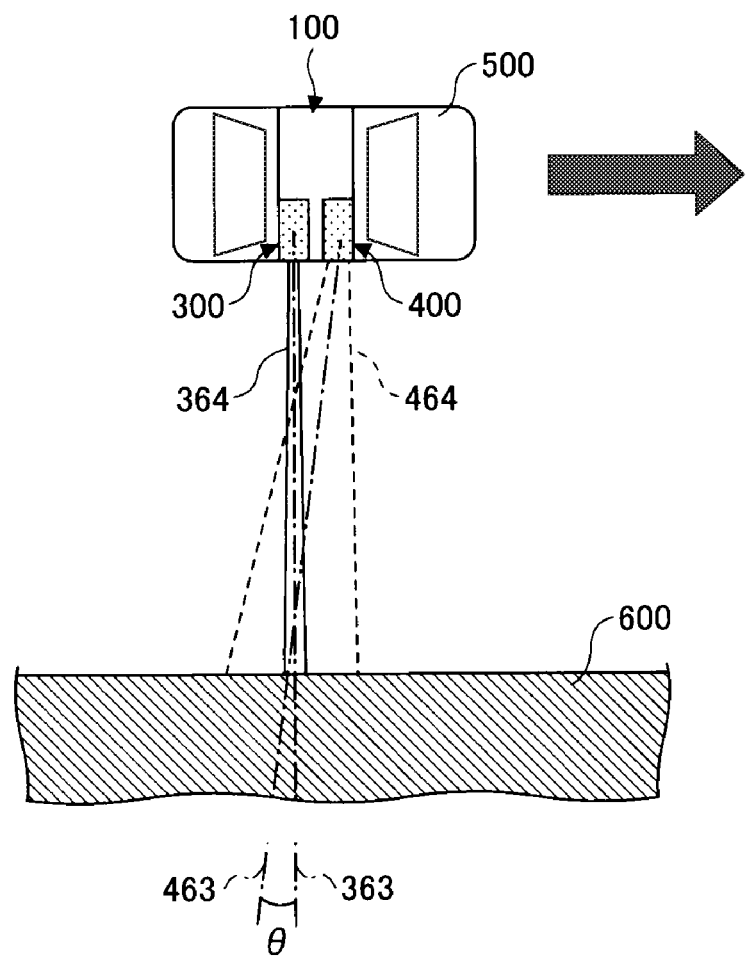
FIG. 11 illustrates an example of effect of inclining a projection direction of a lighting unit with respect to an image capture direction of a camera unit.

FIG. 11 illustrates the vehicle 500 moving in the direction indicated by an arrow when viewed from above, as similar to FIGS. 7A and 7B. The image capture direction 363 is an image capture direction of the camera unit 300, and is synonymous with the optical axis direction of the lens of the camera unit 300. An image capture area 364 represents an area to be captured by the camera unit 300. A portion where the wall face of the tunnel 600 and the image capture area 364 overlap with each other corresponds to an image capture area of the camera unit 300 on the wall face.

A projection direction 463 is an projection direction of the lighting unit 400 and is synonymous with the optical axis direction of the lens of the lighting unit 400. A lighting area 464 represents an area illuminated by the lighting unit 400. A portion where the wall face of the tunnel 600 and the lighting area 464 overlap with each other corresponds to the lighting area of the lighting unit 400 on the wall face.

As described above, when the relative position/posture of the camera unit 300 and the lighting unit 400 fluctuates due to the vibration during the movement of the vehicle 500, the projection direction of the lighting unit 400 does not adequately light or emit the light onto the image capture area of the camera unit 300, causing a problem that images cannot be captured due to insufficient brightness.

Therefore, in the embodiment, the projection direction of the lighting unit 400 is inclined with respect to the image capture direction of the camera unit 300 to illuminate the image capture area on the wall face of the tunnel 600. In an example case of FIG. 11, a state of illuminating the image capture area on the wall face of the tunnel 600 using the projection light having an inclination angle θ is illustrated.

As above described, by inclining the projection direction of the lighting unit 400 to set the image capture area at the vicinity of the center of the lighting area in the movement direction of the vehicle, a problem that the projection light does not adequately light or emit the light onto the image capture area can be prevented.

FIGS. 12A, 12B, 12C, and 12D are views illustrating examples of relationship between the inclination angle θ of the optical axis 365 of the camera unit 300 and the optical axis 465 of the lighting unit 400, the light distribution angle a of the projection light, a distance L from the camera unit 300 to the wall face of the tunnel 600, and a lighting area S.

Figure 12A:
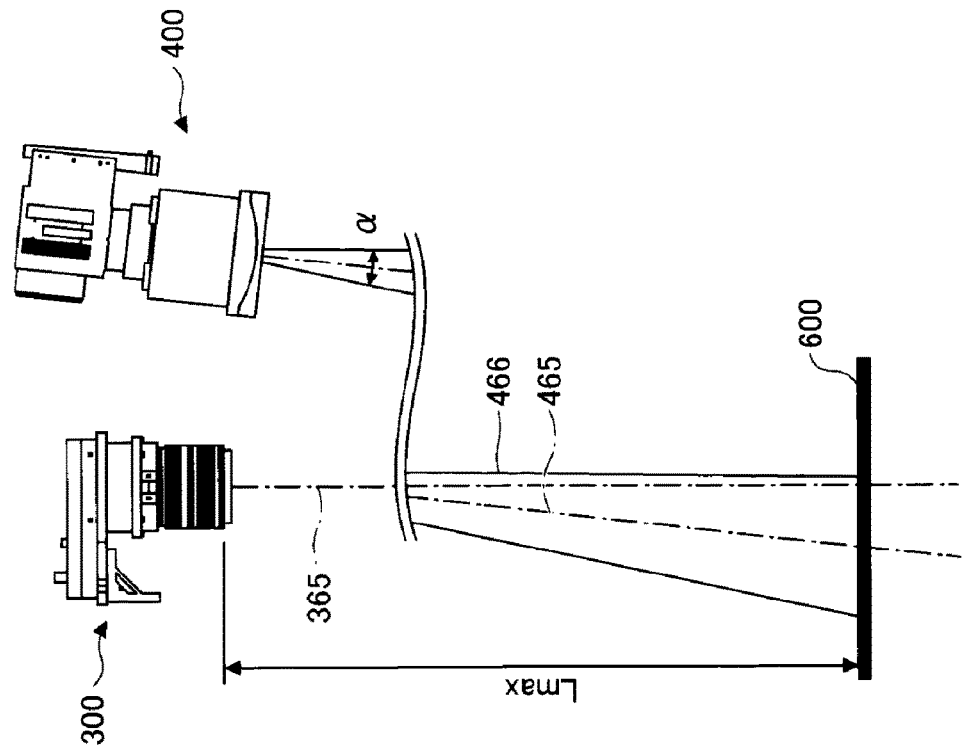
FIG. 12A is a view illustrating an example of relationship between an inclination angle of an optical axis of a camera unit and an optical axis of a lighting unit, a light distribution angle of projection light, and a lighting area, in which a relationship between the camera unit, the lighting unit and a wall face of tunnel is illustrated.

FIG. 12A illustrates one example relationship between the camera unit 300, the lighting unit 400 and the wall face of the tunnel 600. In FIG. 12A, the optical axis 365 of the camera unit 300 is perpendicular to the wall face of the tunnel 600, and the optical axis 465 of the projection light 466 emitted from the lighting unit 400 is inclined with respect to the optical axis 365 of the camera unit 300 with the inclination angle θ. This "perpendicular" does not mean exactly 90 degrees, but may be slightly offset from 90 degrees to some degree depending on the inclination of the wall face of the tunnel 600 and the meandering of the vehicle 500. This "perpendicular" is the same in the following description.

The projection light 466 emits the light onto the wall face of the tunnel 600 with the light distribution angle α. It is assumed that the distance L from the camera unit 300 to the wall face of the tunnel 600 fluctuates or varies from "Lmin" to "Lmax" by the meandering drive operation of the vehicle 500 or the like. The lighting area S is a lighting area of the projection light 466 on the wall face of the tunnel 600. The projection light is the light illuminating a circular region, and the lighting area S indicates a diameter of the circular region. However, the projection light is not limited to the light illuminating the circular region, but may be a light that illuminates a rectangular region and an elliptical region.

Figure 12B:
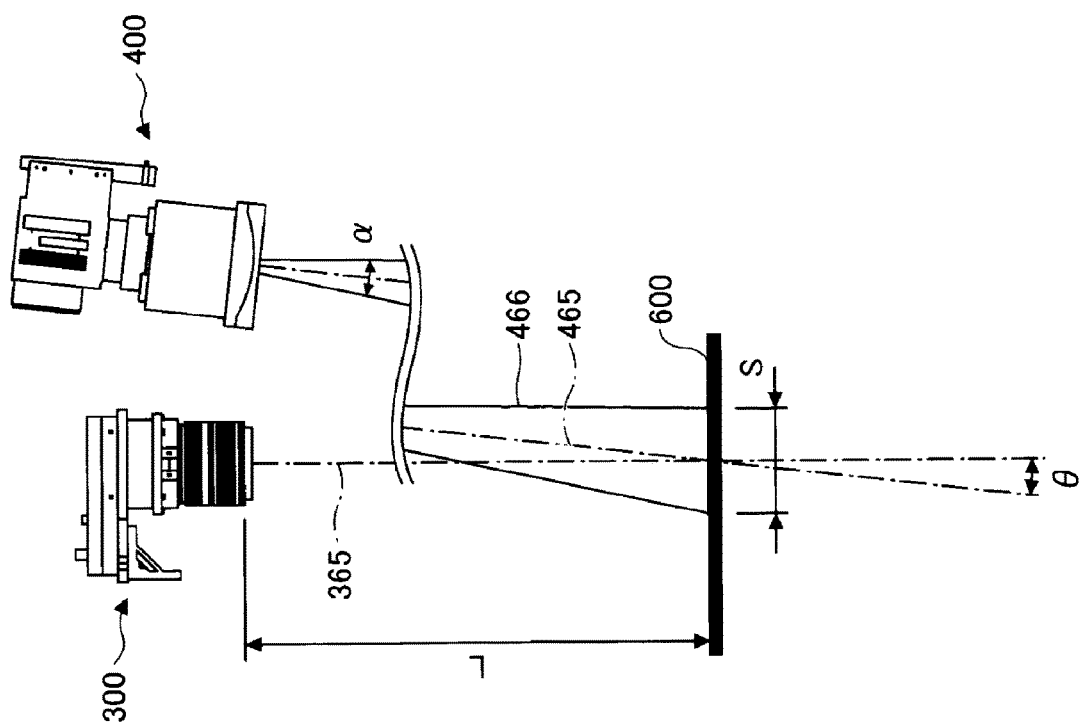
FIG. 12B is a view illustrating an example of relationship between an inclination angle of an optical axis of a camera unit and an optical axis of a lighting unit, a light distribution angle of projection light, and a lighting area, in which a relationship between the camera unit, the lighting unit and a wall face of tunnel when a vehicle is farthest away from the wall face of tunnel while an image capture area overlaps with a lighting area is illustrated.

FIG. 12B illustrates another example relationship between the camera unit 300, the lighting unit 400 and the wall face of the tunnel 600 when the vehicle 500 is farthest away from the wall face of the tunnel 600 while the image capture area of the camera unit 300 overlaps with the lighting area S of the lighting unit 400.

As one example, when the inclination angle θ is 2.5 degrees and the light distribution angle α is 1.65 degrees, the lighting area S becomes 330 mm. In this case, when the distance from the camera unit 300 to the wall face of the tunnel 600 is 5200 mm, the optical axis 365 of the camera unit 300 on the wall face of the tunnel 600 is positioned at the one end of the lighting area S (the most-right end in FIG. 12B). Accordingly, the distance 5200 mm from the camera unit 300 to the wall face of the tunnel 600 represents an example of the maximum distance "Lmax," which can maintain the state that the image capture area of the camera unit 300 overlaps with the lighting area S of the lighting unit 400.

Figure 12D:
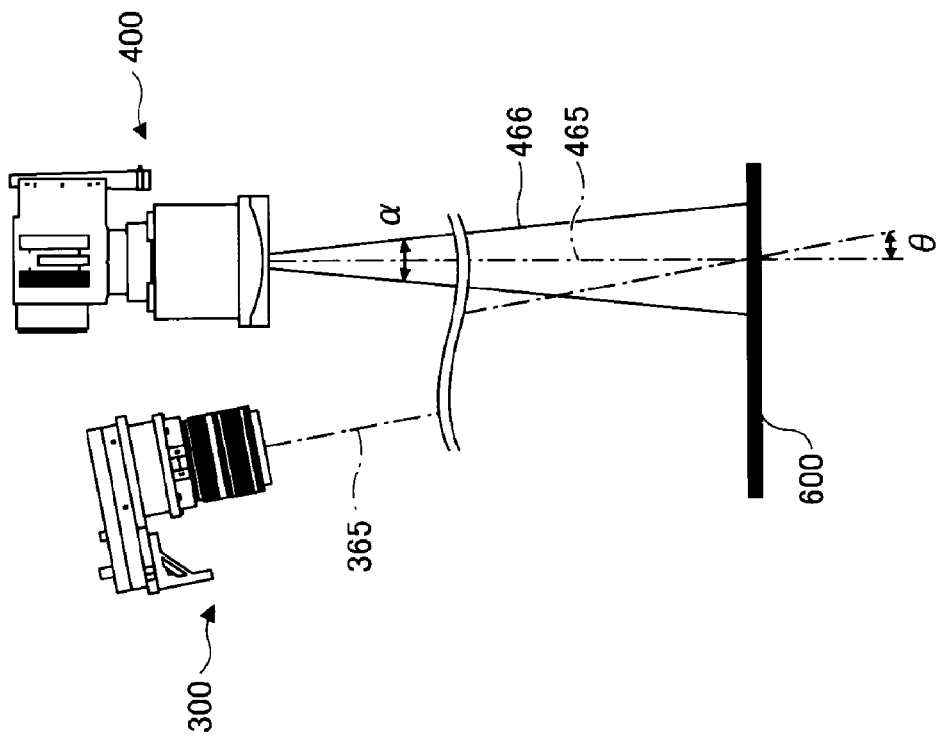
FIG. 12D is a view illustrating an example of relationship between an inclination angle of an optical axis of a camera unit and an optical axis of a lighting unit, a light distribution angle of projection light, and a lighting area, in which a relationship between the camera unit, the lighting unit and a wall face of tunnel when an optical axis of the camera unit is inclined with respect to an optical axis of the lighting unit with an inclination angle is illustrated.
Figure 12C:
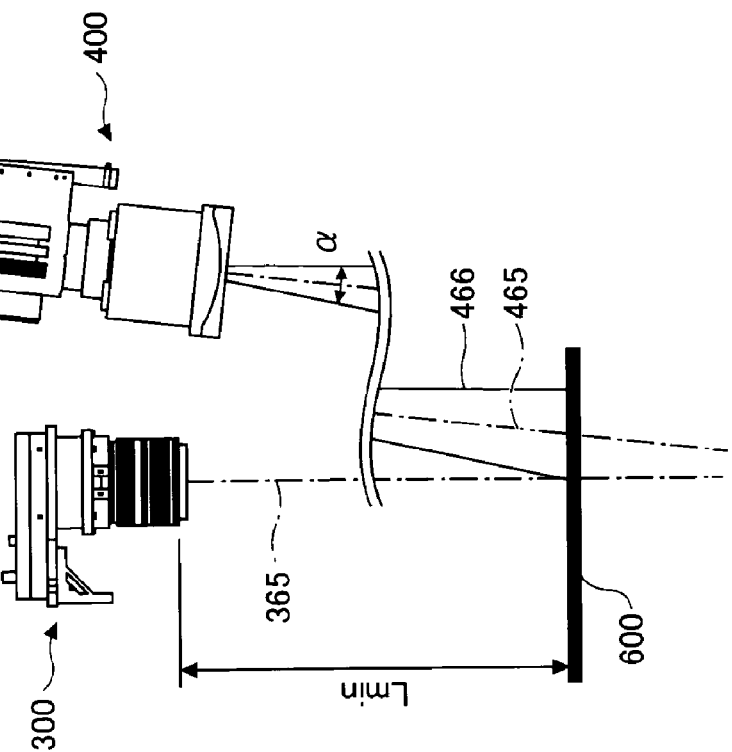
FIG. 12C is a view illustrating an example of relationship between an inclination angle of an optical axis of a camera unit and an optical axis of a lighting unit, a light distribution angle of projection light, and a lighting area, in which a relationship between the camera unit, the lighting unit and a wall face of tunnel when a vehicle is closest to the wall face of tunnel while an image capture area overlaps with a lighting area is illustrated.

FIG. 12C illustrates another example relationship between the camera unit 300, the lighting unit 400 and the wall face of the tunnel 600 when the vehicle 500 is closest to the wall face of the tunnel 600 while the image capture area of the camera unit 300 overlaps with the lighting area of the lighting unit 400.

As one example, when the inclination angle θ is 2.5 degrees and the light distribution angle α is 1.65 degrees, the lighting area S becomes 330 mm. In this case, when the distance from the camera unit 300 to the wall face of the tunnel 600 is 2600 mm, the optical axis 365 of the camera unit 300 on the wall face of the tunnel 600 is positioned at one end of the lighting area S (the most-left end in FIG. 12C). Therefore, the distance 2600 mm from the camera unit 300 to the wall face of the tunnel 600 is an example of a minimum distance "Lmin," which can maintain the state that the image capture area of the camera unit 300 overlaps with the lighting area of the lighting unit 400.

In the above, the lighting unit 400 projects the projection light onto the wall face of the tunnel 600 by illuminating the divergent light having the light distribution angle α, but is not limited thereto, and the parallel light can be used.

When emitting or projecting the divergent light, the image capture area on the wall face of the tunnel 600 can be changed in accordance with the distance from the lighting unit 400 to the wall face of the tunnel 600. The longer the distance L from the lighting unit 400 to the wall face of the tunnel 600, the wider area can be illuminated.

On the other hand, when the parallel light is emitted or projected from the lighting unit 400, a certain area on the wall face of the tunnel 600 can be illuminated regardless of the distance L from the lighting unit 400 to the wall face of the tunnel 600.

In the above, the direction of the optical axis 365 of the camera unit 300 is set perpendicular to the wall face of the tunnel 600 and the optical axis 465 of the lighting unit 400 is inclined with respect to the optical axis 365 of the camera unit 300, but not limited thereto.

For example, as illustrated in FIG. 12D, the direction of the optical axis 465 of the lighting unit 400 can be set perpendicular to the wall face of the tunnel 600 and the optical axis 365 of the camera unit 300 can be inclined with respect to the optical axis 465 of the lighting unit 400. FIG. 12D illustrates another example relationship between the camera unit 300, the lighting unit 400 and the wall face of the tunnel 600 when the optical axis 365 of the camera unit 300 is inclined with respect to the optical axis 465 of the lighting unit 400 with the inclination angle θ. In other words, the optical axis 465 of the lighting unit 400 and the optical axis 365 of the camera unit 300 can be inclined with each other by the inclination angle θ.

By inclining the optical axis 465 of the lighting unit 400 and the optical axis 365 of the camera unit 300 as above described, the projection light can be directed to the image capture area of the camera unit 300. Even if the horizontal image capture area (horizontal field of view for image capturing operation) on the wall face of the tunnel 600 is narrower, the image capture area of the camera unit 300 can be appropriately illuminated with the projection light emitted from the lighting unit 400.

Further, when the guide shaft 240 is used to combine one structure of maintaining the relationship between the relative position/posture of the camera unit 300 and the lighting unit 400 and another structure of illuminating the projection light by inclining the projection direction, the image capture area of the camera unit 300 can be appropriately illuminated with the light emitted from the lighting unit 400. In other words, when the line CCD is used as the imaging element and the image capturing operation is performed with a state of higher illumination efficiency, a problem that the projection light emitted by the lighting unit 400 does not adequately light or emit the light onto the image capture area of the camera unit 300 can be prevented.

Further, even if the distance to the wall face of tunnel fluctuates due to the meandering of the vehicle and the different tunnel size, a problem that the projection light emitted by the lighting unit 400 does not adequately light or emit onto the image capture area of the camera unit 300 can be prevented.

Figure 13:
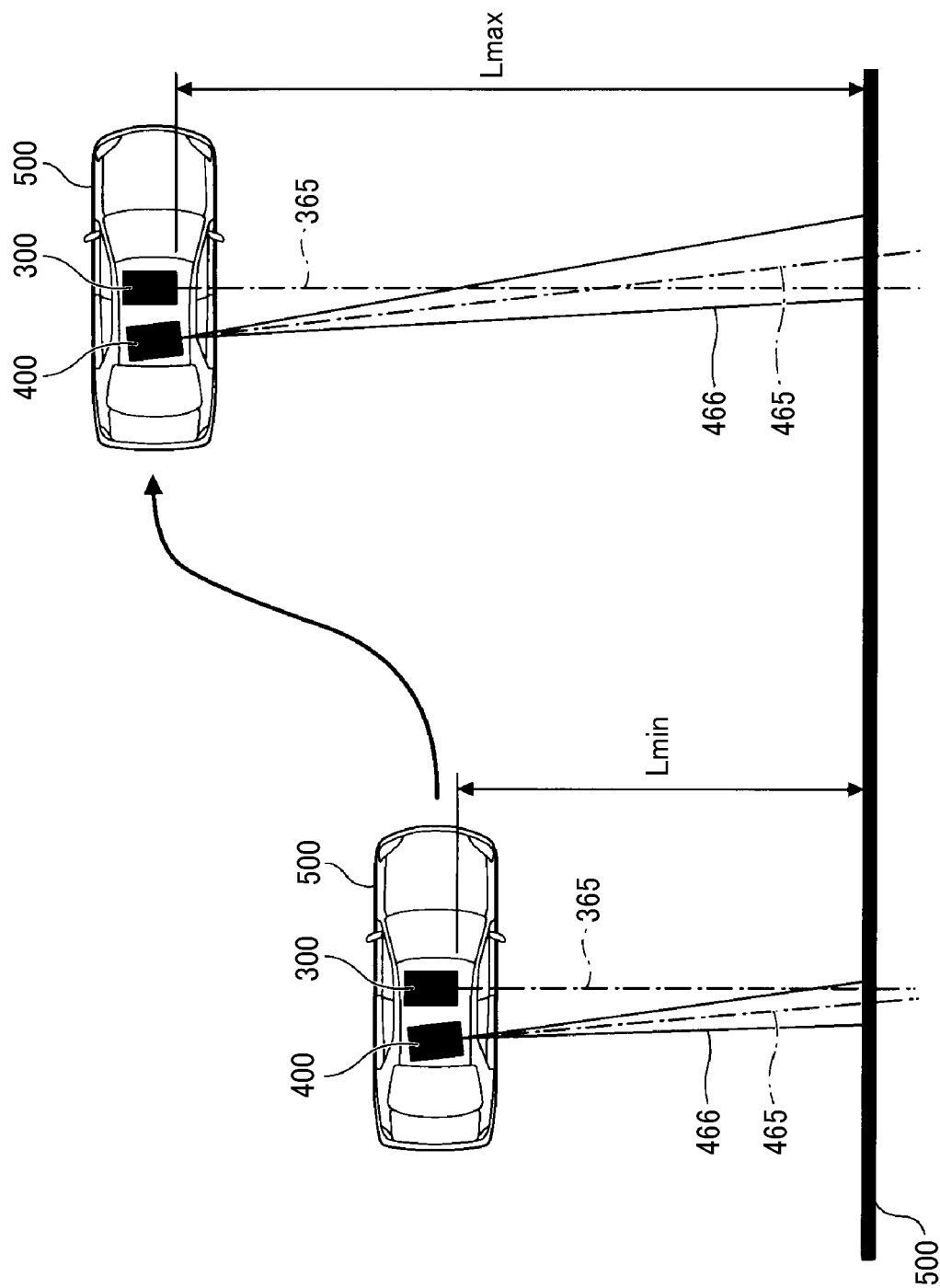
FIG. 13 is a diagram illustrating an example relationship between meandering of a vehicle, and an image capture area and a lighting area.

FIG. 13 is a diagram illustrating an example relationship between the meandering of the vehicle 500, and the image capture area of the camera unit 300 and the lighting area of the lighting unit 400. The vehicle 500 moves while meandering in a direction indicated by an arrow in FIG. 13.

As illustrated on the right side in FIG. 13, when the maximum distance "Lmax" from the camera unit 300 to the wall face of the tunnel 600 is 5200 mm, the optical axis 365 of the camera unit 300 on the wall face of the tunnel 600 is positioned at one end of the lighting area S (the most-left end in FIG. 13). That is, the optical axis 365 of the camera unit 300 on the wall face of the tunnel 600 is positioned at one limiting position that can maintain the state that the image capture area of the camera unit 300 overlaps with the lighting area of the lighting unit 400.

On the other hand, as illustrated on the left side in FIG. 13, when the minimum distance "Lmin" from the camera unit 300 to the wall face of the tunnel 600 is 2600 mm, the optical axis 365 of the camera unit 300 on the wall face of the tunnel 600 is positioned at one end of the lighting area S (the most-right end in FIG. 13). That is, the optical axis 365 of the camera unit 300 on the wall face of the tunnel 600 is positioned at another limiting position that can maintain the state that the image capture area of the camera unit 300 overlaps with the lighting area of the lighting unit 400.

Under the condition of the inclination angle θ of 2.5 degrees and the light distribution angle α of 1.65 degrees° (see FIG. 12A), the meandering of the vehicle 500 is allowed when the distance L from the camera unit 300 to the wall face of the tunnel 600 is within the range of 2600 mm to 5200 mm.

(Operation of Imaging Apparatus)

Figure 14:
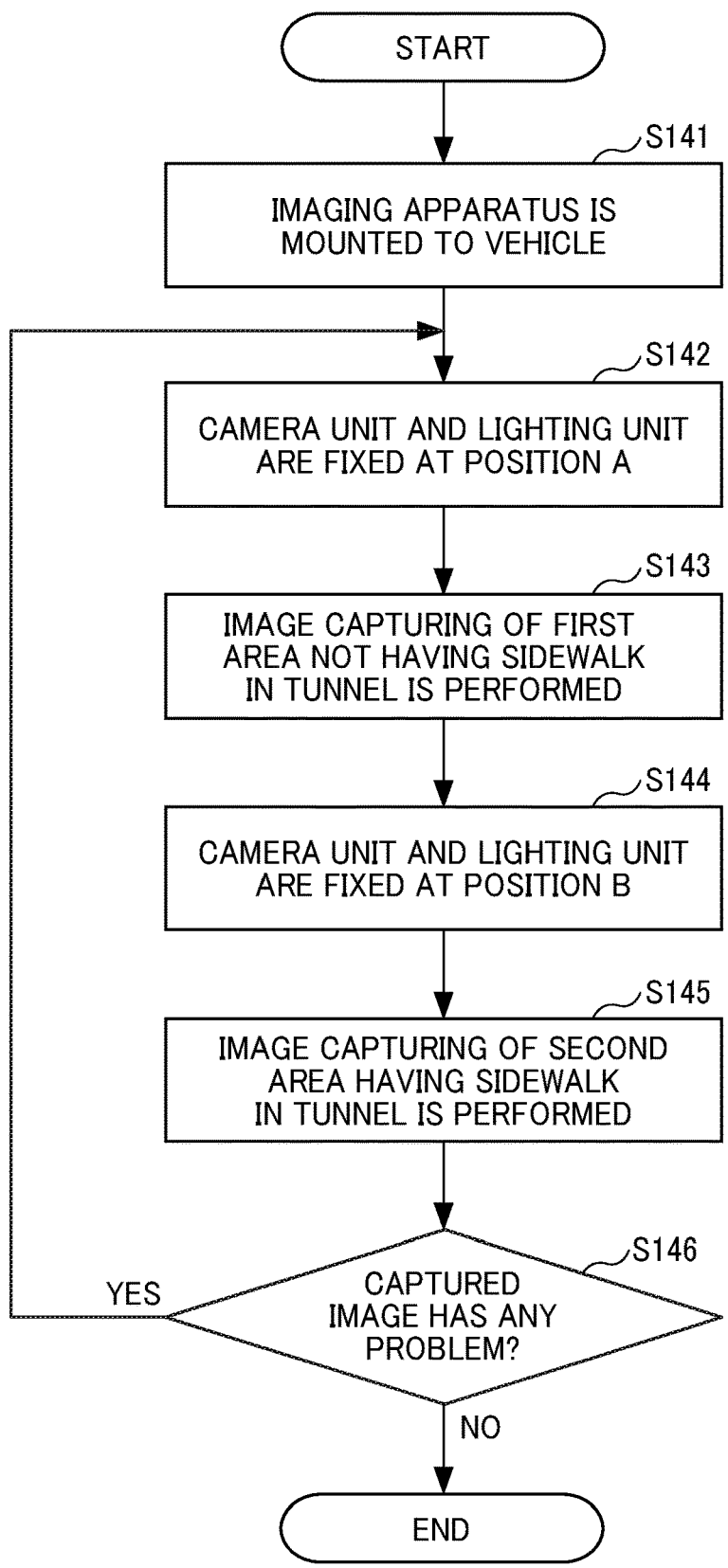
FIG. 14 is an example of a flowchart of operation of an imaging system according to an embodiment.

Hereinafter, a description is given of operation of the imaging system 100 with reference to FIG. 14. FIG. 14 is an example of a flowchart of operation of the imaging system 100.

At first, in step S141, the imaging system 100 is mounted on the vehicle 500.

Then, in step S142, the camera unit 300 and the lighting unit 400 are fixed to the position A using the slide unit 200. In step S142, the sliding of the camera unit 300 and the lighting unit 400 and the fixation of the camera unit 300 and the lighting unit 400 at the position A can be performed manually by a user.

Then, in step S143, an image capturing operation of the first area 600A not having the sidewalk 730 in the tunnel 600 is performed while moving the vehicle 500 from the entrance to the exit of the tunnel 600. In step S143, the image capturing operation is started when the vehicle 500 enters the entrance of the tunnel 600. The instruction to start the image capturing operation can be performed by the user.

When the vehicle 500 reaches the exit of the tunnel 600, the image capturing operation is stopped. The instruction to stop the image capturing operation can be performed by the user. At this stage, the image data of a half of the wall face of the tunnel 600 is stored in the HDD 114.

Then, in step S144, the camera unit 300 and the lighting unit 400 are fixed to the position B using the slide unit 200. In step S144, the sliding of the camera unit 300 and the lighting unit 400 and the fixation of the camera unit 300 and the lighting unit 400 at the position B can be performed manually by the user.

Then, in step S145, while moving the vehicle 500 from the exit to the entrance of the tunnel 600 in a direction opposite to the movement direction in step S143, an image capturing operation of the second area 600B having the sidewalk 730 in the tunnel 600 is performed. Similar to the above, the start and stop instruction of image capturing operation can be performed manually by the user. With this configuration, images of the remaining half of the entire wall face of the tunnel 600 is captured and stored in the HDD 114.

Then, in step S146, the user checks or confirms whether the captured image has any problem. If the captured image has no problem (step S146: NO), the image capturing operation is completed. On the other hand, if the captured image has any problem (step S146: YES), the sequence returns to step S142, and the image capturing operation is performed again.

As a result, the images of the wall face of the structure (e.g., tunnel) can be captured suitably without complex workloads, such as focus adjustment of the camera and the measurement of cross-sectional shape of the structure during the image capturing operation.

In the embodiment, the fixation of the camera unit 300 and the lighting unit 400 at the positions A and B is performed with respect to the slide unit 200, but the fixation of the camera unit 300 and the lighting unit 400 can be performed with respect to the vehicle 500. Hereinafter, a description is given of the fixation of the camera unit 300 and the lighting unit 400 to the vehicle 500.

The camera unit 300 and the lighting unit 400 are attached to a vehicle-fixing base plate. In a case of the position A, the vehicle-fixing base plate is fixed at the right end of the roof of vehicle along the movement direction by using a hook to fix the camera unit 300 and the lighting unit 400.

In a case of the position B, the vehicle-fixing base plate is fixed at the left end of the roof of vehicle along the movement direction by using a hook to fix the camera unit 300 and the lighting unit 400.

Further, the members similar to the guide shaft 240 and the guide shaft holding members 251 and 252 are provided on the vehicle-fixing base plate to connect the shaft connection members 341 and 342, and the shaft connection members 441 and 442 and the guide shaft 240 with each other. With this configuration, the influence of fluctuation of the relative relationship between the relative position/posture of the camera unit 300 and the lighting unit 400 can be reduced.

In this example case of fixing of the camera unit 300 and the lighting unit 400 to the vehicle 500, the imaging system 100 may not have the slide unit 200. Further, the camera unit 300 and the lighting unit 400 may not have the index plungers 350 and 450, respectively.

As described above, even when the camera unit 300 and the lighting unit 400 is fixed to the vehicle 500, the same effect of fixing the camera unit 300 and the lighting unit 400 at the position A and the position B of the slide unit 200 can be attained.

First Embodiment

Hereinafter, a description is given of an imaging system 100a according to a first embodiment of this disclosure.

When the image capture operation is performed inside a tunnel, the imaging system preferably controls an exposure condition for adjusting an exposure amount of light based on brightness level (hereinafter, captured-light quantity) in the tunnel. However, when images of a wall face of the tunnel is being captured, a distance between the imaging system and the wall face of the tunnel changes greatly at a portion of the tunnel corresponding to an emergency parking zone provided on a side of a road in the tunnel. If the distance between the imaging system and the wall face of the tunnel changes, the lighting distance or illumination distance changes, and then the captured-light quantity changes greatly. In this situation, due to a delay of a follow-up control or tracking control to the change of captured-light quantity, the exposure condition cannot be suitably controlled, and thereby white portion or black portion may occur on the captured image, with which the image capturing operation may not be performed suitably and effectively.

By contrast, as to the first embodiment, the exposure condition at the time of image capturing operation can be determined to be any one of a fixed exposure condition and an automatic exposure condition (AE condition) based on the distance detected between the imaging system 100a and the wall face of the tunnel. The fixed exposure condition may be also referred to as the locked exposure condition in this description. By controlling the exposure level based on the exposure condition determined at the time of image capturing operation, even if the distance detected between the imaging system 100a and the wall face of the tunnel changes and thereby the captured-light quantity changes, the imaging system 100a can capture images effectively under the suitable exposure condition.

The "white portion" refers to a phenomenon that a color gradation is lost in a bright portion of the captured image and becomes "completely white" (over exposure). The "black portion" refers to a phenomenon that a color gradation is lost in a dark portion of the captured image and becomes "completely black" (under exposure). Further, the emergency parking zone refers to a space used for an emergency stop zone set on the left side or the right side of road, such as expressway or bypass road, with a given interval. Further, the exposure condition refers to a condition that determines the exposure level (exposure amount) when performing the image capturing operation. Further, the fixed exposure condition indicates an exposure condition that is fixed or locked at a specific exposure level without considering the actually detected captured-light quantity while the automatic exposure (AE) condition is an exposure condition that changes the exposure condition depending on the actually detected captured-light quantity.

Hereinafter, the imaging system 100a is described in detail.

Functional Configuration of Imaging System of First Embodiment

Figure 15:
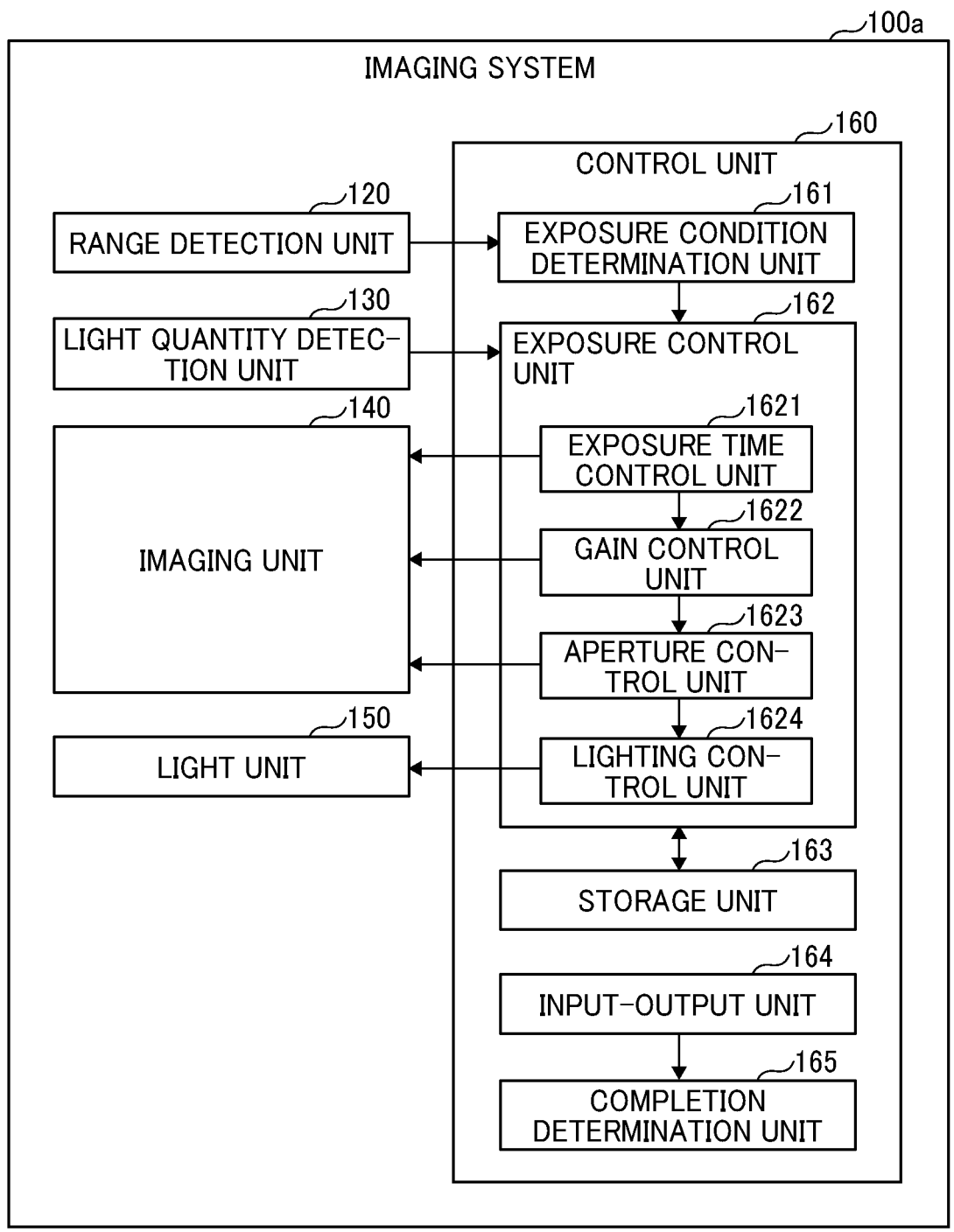
FIG. 15 is an example of functional block diagram of an imaging system according to a first embodiment.

Hereinafter, a description is given of a functional configuration of the imaging system 100a of the first embodiment with reference to FIG. 15. FIG. 15 is an example of functional block diagram of the imaging system 100a. As illustrated in FIG. 15, the imaging system 100a includes, for example, a range detection unit 120, a light quantity detection unit 130, an imaging unit 140, a light unit 150, and a control unit 160.

The range detection unit 120 detects a distance between the imaging system 100a and the wall face of the tunnel 600 in a direction intersecting the traveling direction of the vehicle 500, and outputs the detected distance data to an exposure condition determination unit 161 of the control unit 160. The range detection unit 120 is implemented by the TOF sensor 141.

The light quantity detection unit 130 detects the captured-light quantity when the image capturing operation is performed by the imaging system 100a, and outputs the detected captured-light quantity data to an exposure control unit 162 of the control unit 160. The captured-light quantity detected in the tunnel 600 includes, for example, one light reflected from the wall face of the tunnel 600 after the illumination light emitted from the lighting unit 400 hits the wall face of the tunnel 600, and another light reflected from the wall face of the tunnel 600 when environmental or natural light, such as solar light, hits the wall face of the tunnel 600. Further, in addition to the illumination or lighting by the lighting unit 400, if additional light is illuminated on the wall face of the tunnel 600 for controlling the exposure, the captured-light quantity of the wall face of the tunnel 600 also includes the light reflected from the wall face of the tunnel 600 that is hit by the additional light.

The light quantity detection unit 130 is implemented by the line CCD 331-2 provided for the camera unit 300. However, the light quantity detection unit 130 is not limited thereto. For example, the light quantity detection unit 130 can be implemented by at least one of the line CCDs 331-2, 332-2, 333-2, and 334-2. Further, in addition to the camera unit 300, an optical sensor used for detecting the amount of light, such as photo diode (PD) may be provided, and the function of the light quantity detection unit 130 may be implemented by the optical sensor.

The imaging unit 140, implemented by the camera unit 300, captures images of the wall face of the tunnel 600 and acquires the captured images.

The light unit 150, implemented by the lighting unit 400, emits the light onto the wall face of the tunnel 600 in order to secure the captured-light quantity during the image capturing operation by the imaging unit 140.

The control unit 160 mainly determines an exposure condition of the imaging unit 140 and controls the exposure processing of the imaging unit 140. Specifically, the control unit 160 includes, for example, an exposure condition determination unit 161, an exposure control unit 162, a storage unit 163, an input-output unit 164, and a completion determination unit 165.

The exposure condition determination unit 161 determines the exposure condition of the imaging unit 140 to any one of the fixed exposure condition and the automatic exposure (AE) condition based on the distance data detected by the range detection unit 120.

More specifically, the exposure condition determination unit 161 determines the exposure condition of the imaging unit 140 to be the automatic exposure (AE) condition when the detected distance is equal to or less than a first threshold value, and the exposure condition determination unit 161 determines the exposure condition of the imaging unit 140 to be the fixed exposure condition (locked exposure condition) when the detected distance is greater than the first threshold value. After determining the exposure condition to be any one of the fixed exposure condition and the automatic exposure (AE) condition, the exposure condition determination unit 161 outputs the determination result to the exposure control unit 162. In this disclosure, the first threshold value is a value that is determined based on a dynamic range of the line CCD used for the imaging unit 140. Further, the first threshold value is determined as a given value that does not cause "white portion" and "black portion" in the captured image if the detected distance is equal to or less than the first threshold value.

Hereinafter, a description is given of the exposure control unit 162. In the first embodiment, the exposure condition includes, for example, at least any one of exposure time (shutter speed) of the line CCD, amplification rate (gain) of output voltage for the light received by the line CCD, diameter of aperture provided for the camera unit 300, and illumination-light quantity of the lighting unit 400.

As illustrated in FIG. 15, the exposure control unit 162 includes, for example, an exposure time control unit 1621, a gain control unit 1622, an aperture control unit 1623, a lighting control unit 1624. The exposure control unit 162 communicates with the imaging unit 140 so that the imaging unit 140 captures images under the fixed exposure condition or under the automatic exposure (AE) condition.

When the image capturing operation is performed under the automatic exposure (AE) condition, the exposure control unit 162 calculates an exposure condition based on the captured-light quantity detected by the light quantity detection unit 130, and then an automatic exposure (AE) control is performed under the calculated exposure condition. Since an exposure control value of the automatic exposure (AE) condition can be calculated using known exposure program that can automatically determine the exposure control value, the detailed description of calculation of automatic exposure condition (AE) is omitted.

The exposure time control unit 1621 controls the exposure time of each one of the line CCDs 331-2, 332-2, 333-2 and 334-2 based on the captured-light quantity data detected by the light quantity detection unit 130.

Further, the gain control unit 1622 controls the amplification rate (gain) of each of the line CCDs 331-2, 332-2, 333-2 and 334-2 based on the captured-light quantity data described above.

Further, the aperture control unit 1623 controls the diameter of each of the apertures 331-1a, 332-1a, 333-1a, and 334-1a based on the captured-light quantity data described above.

Further, the lighting control unit 1624 controls the illumination-light quantity of each of the light sources 431-2, 432-2, 433-2, and 434-2 provided for the lighting unit 400 based on the captured-light quantity data described above.

Further, the exposure time of each of the line CCDs 331-2, 332-2, 333-2, and 334-2 may be set equally or differently. Further, the amplification rate (gain) of each of the line CCDs 331-2, 332-2, 333-2, and 334-2 may be set equally or differently. Further, the diameter of each of the apertures 331-1a, 332-1a, 333-1a and 334-1a may be set equally or differently. Further, the illumination-light quantity of each of the light sources 431-2, 432-2, 433-2 and 434-2 may be set equally or differently.

The storage unit 163, implemented by a storage device such as the RAM 113 of FIG. 4, stores the exposure condition data calculated by the exposure control unit 162.

The input-output unit 164, implemented by the external I/F 115, is used as an interface for inputting and outputting data and signals.

The completion determination unit 165 determines whether the image capturing operation of the wall face of the tunnel 600 performed by the imaging system 100a has completed. For example, the completion determination unit 165 compares a travel distance (movement distance) calculated by the vehicle speedometer/travel distance meter 171 and a length of the tunnel 600 stored in the storage device such as the HDD 114 (FIG. 4) to determine whether the image capturing operation has completed. If the travel distance (movement distance) calculated by the vehicle speedometer/travel distance meter 171 becomes the length of the tunnel 600, the completion determination unit 165 determines that the image capturing operation has completed. Alternatively, the completion determination unit 165 can be configured to receive a termination instruction from an operator (user) of the imaging system 100a via the input-output unit 164 to determine whether the image capturing operation has completed.

Operation of Imaging System of First Embodiment

Hereinafter, a description is given of operation of the imaging system 100a with reference to FIGS. 16 to 17.

FIGS. 16A and 16B are diagrams illustrating an example of operation of the imaging system 100a. FIG. 16A illustrates a positional relationship between the imaging system 100a and the wall face of the tunnel 600. FIG. 16B illustrates a relationship between the detected distance between the imaging system 100a and the wall face of the tunnel 600, and a traveling distance of the vehicle 500.

In FIG. 16A, the vehicle 500 mounted with the imaging system 100a including the camera unit 300, the lighting unit 400, and the TOF sensor 141 travels on a road 700 in a direction indicated by thick arrows 151 and 152 (from the left to right in FIG. 16A). The vehicle 500a illustrated at the center in FIG. 16A indicates a state after the vehicle 500 has traveled in the direction of the thick arrow 151, and the vehicle 500b illustrated at the right side in FIG. 16A indicates a state after the vehicle 500 has moved in the direction of the thick arrow 152 from the state of the vehicle 500a.

In this disclosure, the camera unit 300 is an example of the imaging unit 140, the lighting unit 400 is an example of the light unit 150, and the TOF sensor 141 is an example of the range detection unit 120.

In FIG. 16A, the image capture area 364 indicates the image capture area of the camera unit 300, and the lighting area 464, indicated by a dashed line, indicates the lighting area of the lighting unit 400. As illustrated in FIG. 16A, the lighting unit 400 emits the light onto the wall face of the tunnel 600 and the camera unit 300 captures images of the wall face of the tunnel 600 in a direction intersecting the traveling direction of the vehicle 500.

In FIG. 16A, a laser light 142, indicated by a long-dot chain line, indicates a laser beam emitted from the TOF sensor 141 onto the wall face of the tunnel 600 and then reflected form the wall face of the tunnel 600 to the TOF sensor 141. The TOF sensor 141 uses the laser light 142 to detect the distance between the imaging system 100a and the wall face of the tunnel 600 with a sufficient sampling rate.

In FIG. 16A, the wall face of the tunnel 600 is indicated below the vehicle 500, and the wall face of the tunnel 600 that faces the vehicle 500 existing at the left-side position in FIG. 16A is indicated as a wall face 601.

When the vehicle 500 travels in the direction indicated by the thick arrow 151, and the vehicle 500 becomes the vehicle 500a existing at the center position in FIG. 16A, the wall face of the tunnel 600 has a concaved portion on the wall face of the tunnel 600, such as an emergency parking zone 701 constructed on the side of the road 700, in which the distance between the imaging system 100a and a wall face 602 of the emergency parking zone 701 becomes longer compared to the distance between the imaging system 100a and the wall face 601. As the distance to the wall face 602 increases, the light emitted from the lighting unit 400 to the wall face 602 spreads, and thereby the amount of light reflected from the wall face 602 decreases. Therefore, when the vehicle 500 comes at the position of the vehicle 500a, the captured-light quantity decreases, and thereby an image of the wall face 602 captured by the camera unit 300 becomes darker than an image of the wall face 601 captured by the camera unit 300.

When the vehicle 500a further travels in the direction indicated by the thick arrow 152, and the vehicle 500a becomes the vehicle 500b existing at the right-side position in FIG. 16A, the tunnel 600 does not have the emergency parking zone 701, and thereby the distance between the imaging system 100a and a wall face 603 becomes equal to the distance between the imaging system 100a and the wall face 601. Further, the captured-light quantity during the image capturing operation of the wall face 603 becomes equal to the captured-light quantity during the image capturing operation of the wall face 601.

In FIG. 16B, the horizontal axis indicates the traveling distance of the vehicle 500. The traveling distance corresponds to the traveling distance of the vehicle 500 in FIG. 16A. Further, in FIG. 16B, the vertical axis indicates a distance from the imaging system 100a to the tunnel 600 detected by the TOF sensor 141 (hereinafter, detected distance). In FIG. 16B, the higher in the vertical axis, the longer the detected distance.

In FIG. 16B, a section 153 indicates a section where the distance to the wall face 601 is detected by the TOF sensor 141. Similarly, a section 154 indicates a section where the distance to the wall face 602 is detected by the TOF sensor 141, and a section 155 indicates a section where the distance to the wall face 603 is detected by the TOF sensor 141. In the section 154, the detected distance becomes longer due to the emergency parking zone 701 compared to the distance detected at the section 153 and the distance detected at the section 155. Further, the detected distance at the section 153 and the detected distance at the section 155 are equal.

The imaging system 100a starts the image capturing operation of the wall face 601 from the vehicle 500 existing at the left-side position in FIG. 16A. In the section 153, the exposure condition determination unit 161 determines the exposure condition of the camera unit 300 to be the automatic exposure (AE) condition. While being moved in the direction indicated by the thick arrow 151 when the vehicle 500 travels, the camera unit 300 captures images of the wall face 601 under the automatic exposure (AE) condition.

When the vehicle 500 enters the section 154, the distance detected by the TOF sensor 141 changes suddenly. Based on the sudden change of the detected distance, the exposure condition determination unit 161 detects that the vehicle 500 has entered the section 154 having the emergency parking zone 701 (see the vehicle 500a in FIG. 16A), and then the exposure condition determination unit 161 switches the exposure condition from the automatic exposure (AE) condition to the fixed exposure condition, and fixes or locks the exposure condition to a specific exposure condition that was used right before the vehicle 500 entering the section 154. Then, the camera unit 300 captures images of the wall face 602 under the fixed exposure condition. While the vehicle 500a is traveling in the section 154, the exposure control unit 162 sets an exposure level for the camera unit 300 under the fixed exposure condition, and also calculates the automatic exposure (AE) condition simultaneously, and then instructs the storage unit 163 to store the exposure condition data calculated for the automatic exposure (AE) condition.

Then, when the vehicle 500a has passed through the section 154 and then enters the section 155 (see the vehicle 500b in FIG. 16A), the distance detected by the TOF sensor 141 suddenly changes, and then the distance detected by the TOF sensor 141 becomes same as the distance detected by the TOF sensor 141 at the section 153. Based on the sudden change of the detected distance, the exposure condition determination unit 161 detects that the vehicle 500 has passed through the section 154 (see vehicle 500a and vehicle 500b in FIG. 16A), and then the exposure condition determination unit 161 switches the exposure condition from the fixed exposure condition to the automatic exposure (AE) condition. Then, the exposure control unit 162 stops storing of the exposure condition data to the storage unit 163. Then, the camera unit 300 captures images of the wall face 603 under the automatic exposure (AE) condition.

Then, when the vehicle 500 exits from the tunnel 600, the imaging system 100a terminates the image capturing operation. In the above described operation, when one image capturing operation (first-time image capturing operation) is performed, the fixed exposure condition used in the section 154 may not be suitable for the image capturing operation, and thereby the images of the wall face 602 may include "white portion" or "black portion." In this situation, the imaging system 100a performs another image capturing operation (second-time image capturing operation) to capture images of the wall face 602 under a suitable exposure condition.

When to perform the second-time image capturing operation, the exposure control unit 162 reads out the exposure condition data calculated and stored in the storage unit 163 during the first-time image capturing operation, and then the exposure control unit 162 sets a new exposure condition based on the read-out exposure condition data for capturing images under the new exposure condition for performing the second-time image capturing operation. As to the exposure condition data, since exposure condition data that was obtained right after the vehicle 500 has entered the section 154 and another exposure condition data that was obtained right before the vehicle 500 has passed through the section 154 may not be suitable for calculating the automatic exposure (AE) condition due to the delay of the follow-up control or tracking control to the change of captured-light quantity. Therefore, the exposure condition data can be preferably determined using an average value of the exposure condition data that were obtained while the vehicle 500 traveled in the section 154 of the tunnel 600 during the first-time image capturing operation.

Hereinafter, a description is given of an example of flowchart of operation of the imaging system 100a with reference to FIG. 17.

In step S171, the vehicle 500 starts to travel.

Then, in step S172, the exposure condition determination unit 161 determines the exposure condition to be the automatic exposure (AE) condition, and then the imaging unit 140 performs the image capturing operation of the wall face of the tunnel 600 under the automatic exposure (AE) condition.

Then, in step S173, the range detection unit 120 detects the distance between the imaging system 100a and the wall face of the tunnel 600 in the direction intersecting the traveling direction of the vehicle 500, and then outputs the detected distance data to the exposure condition determination unit 161.

The sequential order of processing of steps S172 and S173 can be changed as appropriate, and steps S172 and S173 can be performed in parallel.

Then, in step S174, the exposure condition determination unit 161 determines whether the detected distance is equal to or less than the first threshold value (detected distance≤1st threshold value).

If the exposure condition determination unit 161 determines in step S174 that the detected distance is equal to or less than the first threshold (step S174: YES), the exposure condition determination unit 161 determines the exposure condition to be the automatic exposure (AE) condition, and outputs the determination result to the exposure control unit 162.

Then, in step S175, the imaging unit 140 captures images of the wall face of the tunnel 600 under the automatic exposure (AE) condition.

By contrast, if the exposure condition determination unit 161 determines in step S174 that the detected distance is greater than the first threshold (step S174: NO), the exposure condition determination unit 161 determines the exposure condition to be the fixed exposure condition, and outputs the determination result to the exposure control unit 162. Then, the sequence proceeds to step S176.

Then, in step S176, the imaging unit 140 captures images of the wall face of the tunnel 600 under the fixed exposure condition.

Then, in step S177, the exposure control unit 162 calculates exposure condition data of the automatic exposure (AE) condition.

Then, in step S178, the exposure control unit 162 stores the calculated exposure condition data using the storage unit 163.

Then, in step S179, the completion determination unit 165 determines whether the image capturing operation of the wall face of the tunnel 600 performed by the imaging system 100a has completed.

If the completion determination unit 165 determines in step S179 that the image capturing operation has completed (step S179: YES), the imaging system 100a terminates the image capturing operation. By contrast, if the completion determination unit 165 determines in step S179 that the image capturing operation is not yet completed (step S179: NO), the imaging system 100a returns the sequence to step S173, and performs steps S173 and subsequent steps.

In this way, the imaging system 100a can capture the images of the wall face of the tunnel 600.

(Processing by Exposure Control Unit)

Hereinafter, a description is given of an example of a flowchart of processing performed by the exposure control unit 162 with reference to FIG. 18.

In step S181, the light quantity detection unit 130 detects captured-light quantity data "I," and outputs the detected captured-light quantity data "I" to the exposure control unit 162.

Then, in step S182, the exposure control unit 162 determines whether the captured-light quantity data "I" is greater than a target value "Ig."

If the exposure control unit 162 determines in step S182 that the captured-light quantity data "I" is greater than the target value "Ig" (step S182: YES), in step S183, the aperture control unit 1623 determines whether the diameter of the apertures 331-1a, 332-1a, 333-1a and 334-1a can be reduced to change the captured-light quantity data "I" to the target value "Ig."

If the aperture control unit 1623 determines in step S183 that the diameter of the aperture can be reduced (step S183: YES), in step S184, the aperture control unit 1623 reduces the diameter of each aperture to change the captured-light quantity data "I" to the target value "Ig." Then, the exposure control unit 162 terminates the processing.

By contrast, if the aperture control unit 1623 determines in step S183 that the diameter of the aperture cannot be reduced (step S183: NO), in step S185, the exposure time control unit 1621 determines whether the exposure time of the line CCDs 331-2, 332-2, 333-2 and 334-2 can be reduced to change the captured-light quantity data "I" to the target value "Ig."

If the exposure time control unit 1621 determines in step S185 that the exposure time of the line CCD can be reduced (step S185: YES), in step S186, the exposure time control unit 1621 reduces the exposure time of each line CCD to change the captured-light quantity data "I" to the target value "Ig," and then the exposure control unit 162 terminates the processing.

By contrast, if the exposure time control unit 1621 determines in step S185 that the exposure time of the line CCD cannot be reduced (step S185: NO), in step S187, the gain control unit 1622 determines whether the amplification rate (gain) of each line CCD can be reduced to change the captured-light quantity data "I" to the target value "Ig."

If the gain control unit 1622 determines in step S187 that the amplification rate (gain) of each line CCD can be reduced (step S187: YES), in step S188, the gain control unit 1622 reduces the amplification rate (gain) of each line CCD to change the captured-light quantity data "I" to the target value "Ig," and then the exposure control unit 162 terminates the processing.

By contrast, if the gain control unit 1622 determines in step S187 that the amplification rate (gain) of each line CCD cannot be reduced (step S187: NO), in step S189, the lighting control unit 1624 determines whether the illumination-light quantity of each of the light sources 431-2, 432-2, 433-2, 434-2, 435-2, and 436-2 can be reduced to change the captured-light quantity data "I" to the target value "Ig."

If the lighting control unit 1624 determines in step S189 that the illumination-light quantity of each light source can be reduced (step S189: YES), in step S190, the lighting control unit 1624 reduces the illumination-light quantity of each light source to change the captured-light quantity data "I" to the target value "Ig," and then the exposure control unit 162 terminates the processing.

By contrast, if the lighting control unit 1624 determines in step S189 that the illumination-light quantity of each light source cannot be reduced (step S189: NO), in step S191, the exposure control unit 162 instructs the buzzer 116 (FIG. 4) to generate a warning sound indicating that the captured-light quantity data "I" cannot be changed to the target value "Ig," and then the exposure control unit 162 returns the sequence to step S181, and continues the sequence from step S181. Further, instead of generating the warning sound, a warning message can be displayed on a user interface screen via the external I/F 115 to inform the warning message to a user.

By contrast, if the exposure control unit 162 determines in step S182 that the captured-light quantity data "I" is equal to or less than the target value "Ig" (step S182: NO), in step S192, the lighting control unit 1624 determines whether the illumination-light quantity of each light source can be increased to change the captured-light quantity data "I" to the target value "Ig."

If the lighting control unit 1624 determines in step S192 that the illumination-light quantity of each light source can be increased (step S192: YES), in step S193, the lighting control unit 1624 increases the illumination-light quantity of each light source to change the captured-light quantity data "I" to the target value "Ig," and then the exposure control unit 162 terminates the processing.

By contrast, if the lighting control unit 1624 determines in step S192 that the illumination-light quantity of each light source cannot be increased (step S192: NO), in step S194, the gain control unit 1622 determines whether the amplification rate (gain) of each line CCD can be increased to change the captured-light quantity data "I" to the target value "Ig."

If the gain control unit 1622 determines in step S194 that the amplification rate (gain) of each line CCD can be increased (step S194: YES), in step S195, the gain control unit 1622 increases the amplification rate (gain) of each line CCD to change the captured-light quantity data "I" to the target value "Ig," and then the exposure control unit 162 terminates the processing.

By contrast, if the gain control unit 1622 determines in step S194 that the amplification rate (gain) of each line CCD cannot be increased (step S194: NO), in step S196, the exposure time control unit 1621 determines whether the exposure time of each line CCD can be extended to change the captured-light quantity data "I" to the target value "Ig."

If the exposure time control unit 1621 determines in step S196 that the exposure time of each line CCD can be extended (step S196: YES), in step S197, the exposure time control unit 1621 extends the exposure time of each line CCD to change the captured-light quantity data "I" to the target value "Ig," and then the exposure control unit 162 terminates the processing.

By contrast, if the exposure time control unit 1621 determines in step S196 that the exposure time of each line CCD cannot be extended (step S196: NO), in step S198, the aperture control unit 1623 determines whether the diameter of each aperture can be enlarged to change the captured-light quantity data "I" to the target value "Ig."

If the aperture control unit 1623 determines in step S198 that the diameter of each aperture can be enlarged (step S198: YES), in step S199, the aperture control unit 1623 enlarges the diameter of each aperture to change the captured-light quantity data "I" to the target value "Ig," and then the exposure control unit 162 terminates the processing By contrast, if the aperture control unit 1623 determines in step S198 that the diameter of each aperture cannot be enlarged (step S198: NO), in step S191, the exposure control unit 162 instructs the buzzer 116 (FIG. 4) to generate a indicating that the captured-light quantity data "I" cannot be changed to the target value "Ig," and then the exposure control unit 162 returns the sequence to step S181, and continues the sequence from step S181. Further, instead of generating the warning sound, a warning message can be displayed on a user interface screen via the external I/F 115 to inform the warning message to a user.

Figure 18:
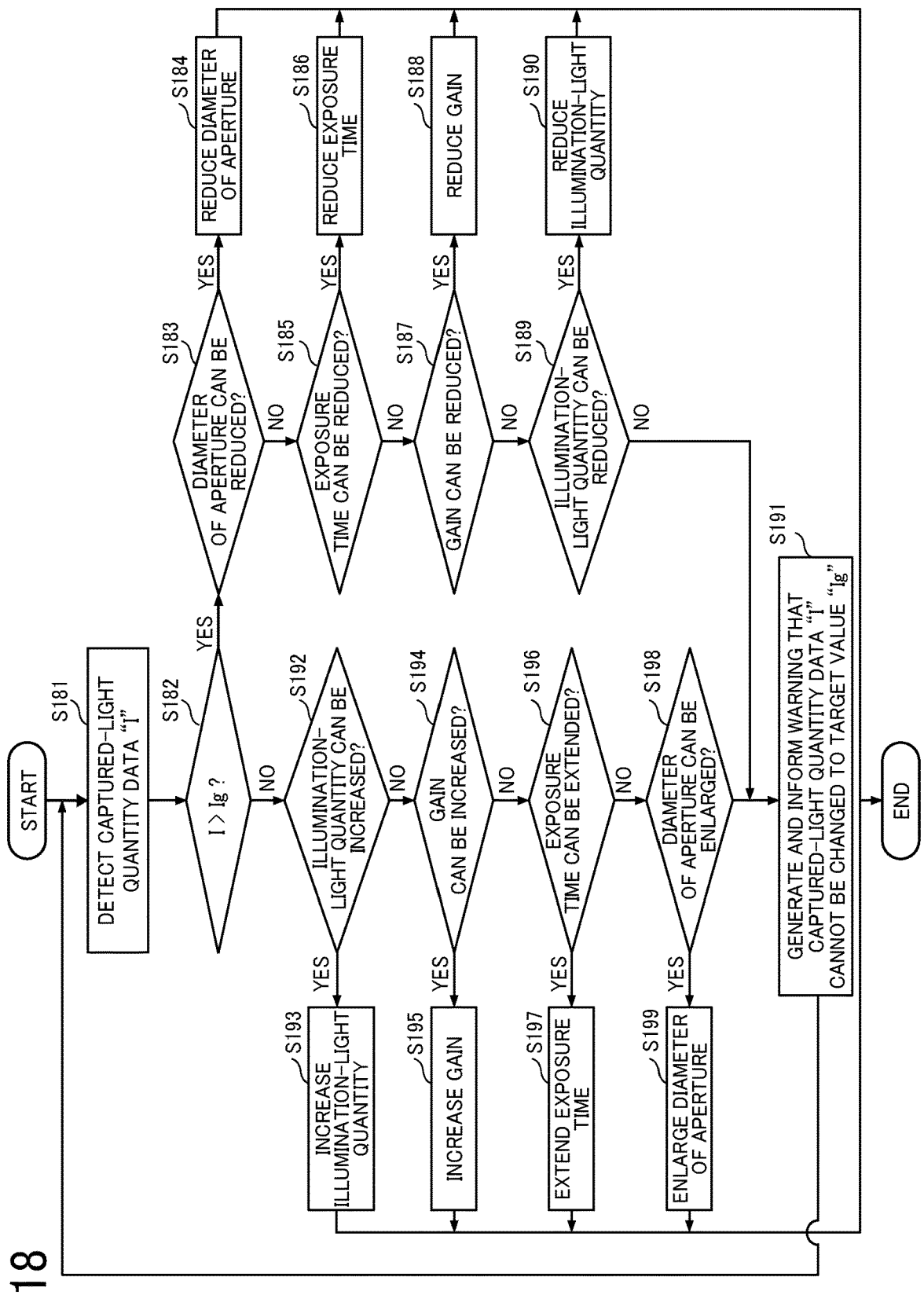
FIG. 18 an example of a flowchart of processing performed by an exposure control unit according to the first embodiment.

In this way, the exposure control unit 162 can perform the exposure control processing based on the captured-light quantity data "I." In FIG. 18, in steps S183 to S190, the aperture diameter reduction (steps S183, S184), the exposure time reduction (steps S185, S186), the amplification rate (gain) reduction (steps S187, S188), and the captured-light quantity reduction (step S189, 190) are performed in this order, but the sequential order can be appropriately changed. Similarly, in steps S192 to S199, the captured-light quantity increase (step S192, 193), the amplification rate (gain) increase (steps S194, S195), the exposure time extension (step S196, S197), and the aperture diameter enlargement (steps S198, S199) are performed in this order, but the sequential order can be appropriately changed.

As to the above described first embodiment, when the distance detected between the imaging system 100a and the wall face of the tunnel 600 is equal to or less than the first threshold value, the exposure condition during the image capturing operation is determined to be the automatic exposure (AE) condition, and when the detected distance is greater than the first threshold, the exposure condition during the image capturing operation is determined to be the fixed exposure condition.

With this configuration, when the distance between the imaging system 100a and the wall face of the tunnel 600 greatly changes due to the emergency parking zone provided on the side of the road, the images of the wall face of the tunnel 600 can be captured under the fixed exposure condition. Then, a situation that the exposure that cannot be suitably controlled due to the delay of the follow-up control or tracking control to the change of captured-light quantity can be prevented, and thereby "white portion" and "black portion" in the captured image can be prevented, with which the image capturing operation can be suitably and effectively performed.

Further, in the first embodiment, the exposure condition is determined by comparing an absolute value of the distance detected between the imaging system 100a and the wall face of the tunnel 600 with the first threshold value. Therefore, even if the concaved portion of the wall face in the section 154, such as the emergency parking zone, does not have a steep wall, the exposure condition determination unit 161 can accurately detect that the vehicle has entered the section 154, and detect that the vehicle has passed through the section 154.

Further, when the image capturing operation is performed under the fixed exposure condition at the section 154, the fixed exposure condition may not be set suitably for the one image capturing operation (first-time image capturing operation), and thereby the image capturing operation may not be suitably performed at the section 154. In the first embodiment, when the imaging unit 140 captures images of the wall face of the tunnel 600 under the fixed exposure condition during the first-time image capturing operation by traveling the vehicle 500 for the first time, the exposure control unit 162 outputs the exposure condition data calculated based on the captured-light quantity to the storage unit 163. Then, when performing the second-time image capturing operation by traveling the vehicle 500, images of the section 154 are captured under the exposure condition determined from the exposure condition data stored in the storage unit 163. With this configuration, as to the particular section where the image capturing operation cannot be performed suitably for the first-time image capturing operation due to unsuitable or inappropriate fixed exposure condition, images of the particular section can be captured suitably by performing the second-time image capturing operation.

If the exposure condition in the section 154 is known by the pre-experiment or the like, by capturing the images of the section 154 under the known exposure condition, the image capturing operation that can capture the images without "white portion" and "black portion" can be performed by one-time traveling of the vehicle 500.

MODIFICATION EXAMPLE

Hereinafter, a description is given of modification example of the first embodiment, such as an imaging system 100b according to the modification example.

Figure 19:
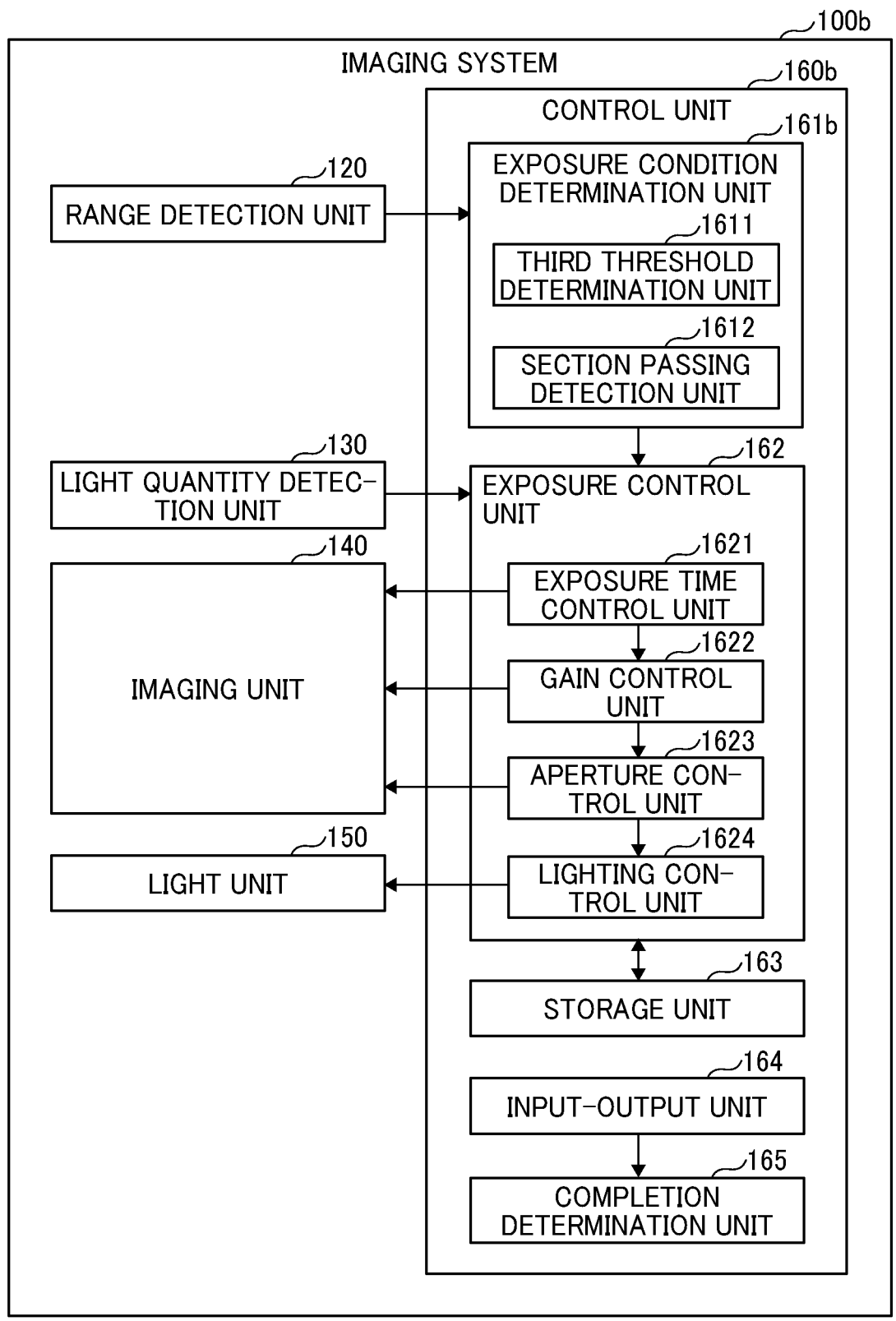
FIG. 19 is an example of functional block diagram of an imaging system of a modification example according to the first embodiment.

FIG. 19 is an example of functional block diagram of the imaging system 100b according to the modification example according to the first embodiment. As illustrated in FIG. 19, the imaging system 100b includes, for example, a control unit 160b including an exposure condition determination unit 161b.

In the imaging system 100a described above as the first embodiment, the exposure condition determination unit 161 determines the exposure condition to be the automatic exposure (AE) condition when the detected distance is equal to or less than the first threshold value, and the exposure condition determination unit 161 determines the exposure condition to be the fixed exposure condition when the detected distance is greater than the first threshold value by detecting that the vehicle 500 has entered the section provided with the emergency parking zone.

By contrast, in the modification example, the exposure condition determination unit 161b calculates a change amount of distance between the distance data detected at the current time and the distance data detected at the most-recent time just before the current time. Then, if the calculated change amount of distance is equal to or less than a second threshold value, the exposure condition is determined to be the automatic exposure (AE) condition, and if the calculated change amount of distance is greater than the second threshold value, the exposure condition determination unit 161b determines the exposure condition to be the fixed exposure condition by detecting that the vehicle 500 has entered the section provided with the emergency parking zone. Hereinafter, the modification example is described in detail.

As illustrated in FIG. 19, the exposure condition determination unit 161b includes, for example, a third threshold determination unit 1611, and a section passing detection unit 1612.

The third threshold determination unit 1611 determines a third threshold value that is used for detecting that the vehicle 500 has passed through the section provided with the emergency parking zone. Specifically, the third threshold determination unit 1611 determines the third threshold value by adding a given margin to the distance data that was detected right before detecting that the vehicle 500 has entered the section provided with the emergency parking zone.

Figure 20:
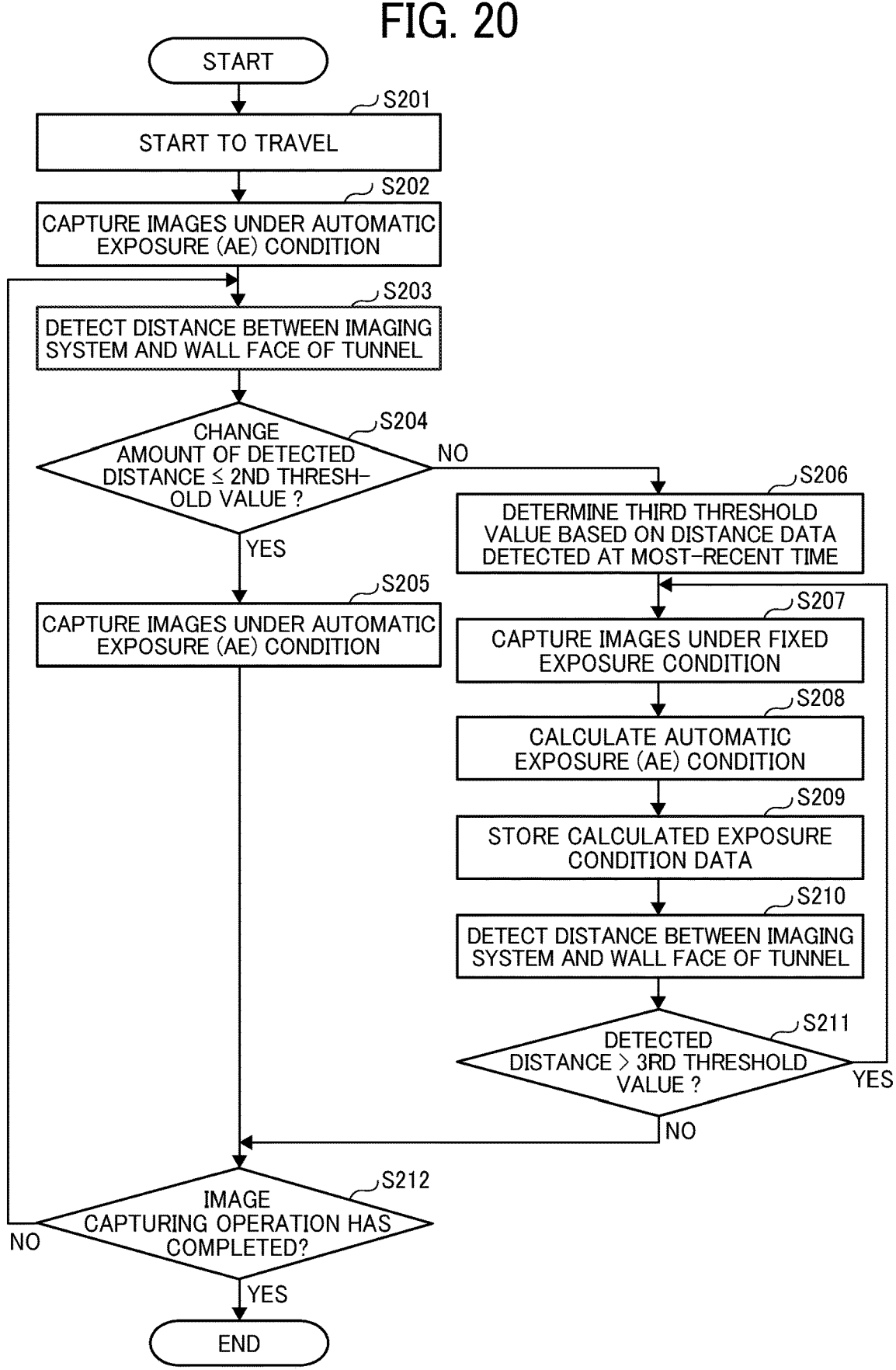
FIG. 20 is an example of flowchart of operation of an imaging system of the modification example according to the first embodiment.

The section passing detection unit 1612 compares the distance data detected by the range detection unit 120 and the third threshold value, and then detects that that the vehicle 500 has passed through the section provided with the emergency parking zone when the distance data detected by the range detection unit 120 becomes equal to or less than the third threshold value (see step S211 in FIG. 20).

Hereinafter, a description is given of an example of flowchart of operation of the imaging system 100b with reference to FIG. 20.

Figure 17:
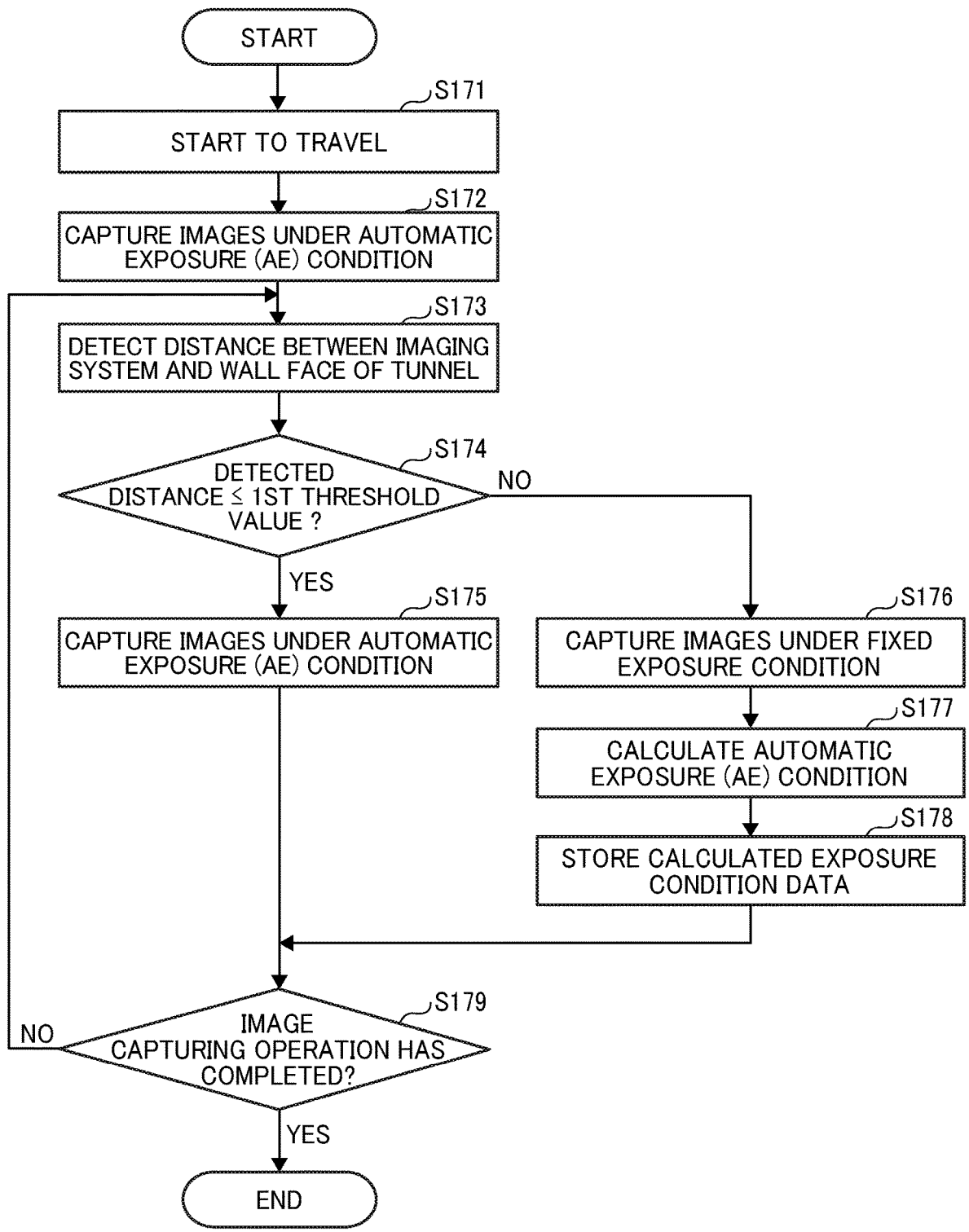
FIG. 17 is an example of flowchart of operation of an imaging system according to the first embodiment.

Since steps S201 to S203 are the same as steps S171 to S173 of FIG. 17, the descriptions of steps S201 to S203 are omitted.

Then, in step S204, the exposure condition determination unit 161b calculates a change amount of distance between the distance data detected at the current time and the distance data detected at the most-recent time just before the current time, and then determines whether the change amount of distance is equal to or less than the second threshold value (change amount of detected distance≤2nd threshold value).

If the exposure condition determination unit 161b determines in step S204 that the change amount of distance is equal to or less than the second threshold value (step S204: YES), the exposure condition determination unit 161b determines the exposure condition to be the automatic exposure (AE) condition, and outputs the determination result to the exposure control unit 162.

Then, in step S205, the imaging unit 140 captures images of the wall face of the tunnel 600 under the automatic exposure (AE) condition.

By contrast, if the exposure condition determination unit 161b determines in step S204 that the change amount of distance is greater than the second threshold value (step S204: NO), the exposure condition determination unit 161b determines the exposure condition to be the fixed exposure condition, and outputs the determination result to the exposure control unit 162. Then, the sequence proceeds to step S206.

Then, in step S206, the third threshold determination unit 1611 determines the third threshold value that is used for detecting that the vehicle 500 has passed through the section provided with the emergency parking zone.

Since steps S207 to S209 are the same as steps S176 to S178 of FIG. 17, the descriptions of steps S207 to S209 are omitted.

Then, in step S210, the range detection unit 120 detects the distance between the imaging system 100b and the wall face of the tunnel 600 in the direction intersecting the traveling direction of the vehicle 500, and then outputs the detected distance data to the exposure condition determination unit 161b.

Then, in step S211, the section passing detection unit 1612 compares the distance data detected by the range detection unit 120 and the third threshold value to determine whether the distance data becomes greater than the third threshold value (detected distance>3rd threshold value).

If the section passing detection unit 1612 determines in step S211 that the distance data detected by the range detection unit 120 is equal to or less than the third threshold value (step S211: NO), the sequence proceeds to step S212.

By contrast, if the section passing detection unit 1612 determines in step S211 that the distance data detected by the range detection unit 120 becomes greater than the third threshold value (step S211: YES), the sequence returns to step S207, and then step S207 and subsequent steps are performed again.

Since step S212 is the same as step S179 of FIG. 17, the descriptions of step S212 is omitted.

In this way, the imaging system 100b can capture images of the wall face of the tunnel 600.

As to the above described modification example of the first embodiment, the change amount of distance is calculated based on a difference between the distance data detected at the current time and the distance data detected at the most-recent time just before the current time, and then the exposure condition is determined to be any one of the fixed exposure condition and the automatic exposure (AE) condition based on the calculated change amount of distance. Since the exposure condition can be determined based on the change amount of distance, the exposure condition can be determined to any one of the fixed exposure condition and the automatic exposure (AE) condition even if the diameter of tunnel is not known.

Further, the absolute value of the distance to the wall face or the change amount of distance can be used to determine the exposure condition, or a combination of the absolute value of the distance to the wall face and the change amount of distance can be used. By using the absolute value of distance to the wall face and the change amount of distance as one set, the exposure condition can be determined more robustly in view of external disturbances, such as lighting lamps and emergency telephone boxes disposed in the tunnel.

The other effects are the same as those described for the first embodiment.

Second Embodiment

Hereinafter, a description is given of an imaging system 100c according to a second embodiment.

Functional Configuration of Imaging System of Second Embodiment

Figure 21:
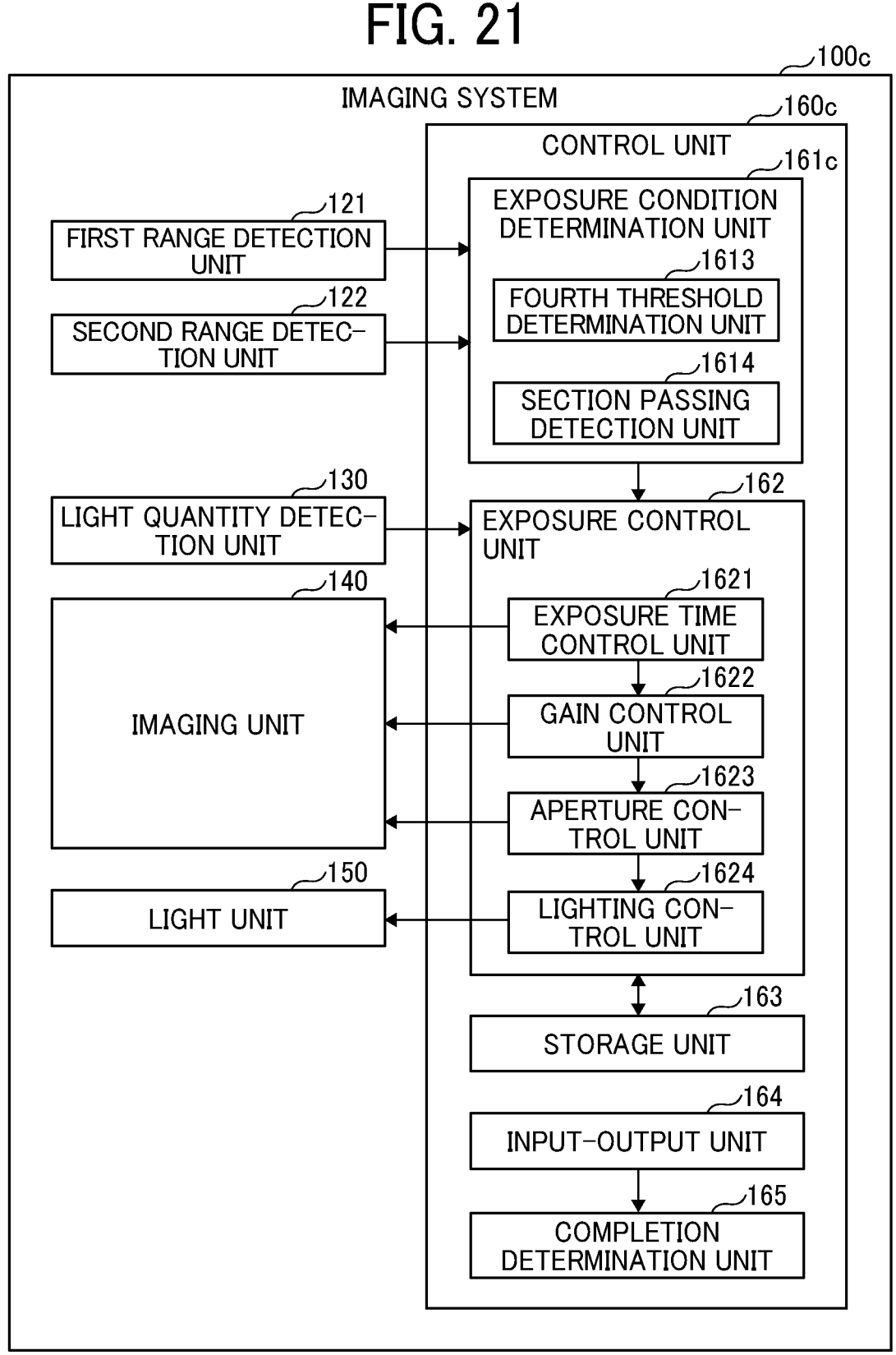
FIG. 21 is an example of functional block diagram of an imaging system according to a second embodiment.

FIG. 21 is an example of functional block diagram of the imaging system 100c according to the second embodiment. As illustrated in FIG. 21, the imaging system 100c includes, for example, a first range detection unit 121, a second range detection unit 122, and a control unit 160c. The control unit 160c includes, for example, an exposure condition determination unit 161c.

The first range detection unit 121, implemented by a TOF sensor provided on the front side of the vehicle 500 in the traveling direction of the vehicle 500, detects a distance between the imaging system 100c and the wall face of the tunnel 600 in the direction intersecting the travel direction of the vehicle 500. Then, the first range detection unit 121 outputs the detected distance data to the exposure condition determination unit 161c of the control unit 160c.

The second range detection unit 122, implemented by a TOF sensor provided on the rear of the vehicle 500 in the traveling direction of the vehicle 500, detects a distance between the imaging system 100c and the wall face of the tunnel 600 in the direction intersecting the travel direction of the vehicle 500. Then, the second range detection unit 122 outputs the detected distance data to the exposure condition determination unit 161c of the control unit 160c.

The exposure condition determination unit 161b determines the exposure condition of the imaging unit 140 to be any one of the fixed exposure condition and the automatic exposure (AE) condition based on the distance data detected by the first range detection unit 121 and the distance data detected the second range detection unit 122. Further, the exposure condition determination unit 161c includes, for example, a fourth threshold determination unit 1613, and a section passing detection unit 1614.

The fourth threshold determination unit 1613 determines the fourth threshold value that is used for detecting that the vehicle 500 has passed through the section provided with the emergency parking zone. Specifically, the fourth threshold determination unit 1613 determines the fourth threshold value by adding a given margin to the distance data detected by the second range detection unit 122 when detecting that the vehicle 500 has entered the section provided with the emergency parking zone.

Figure 23:
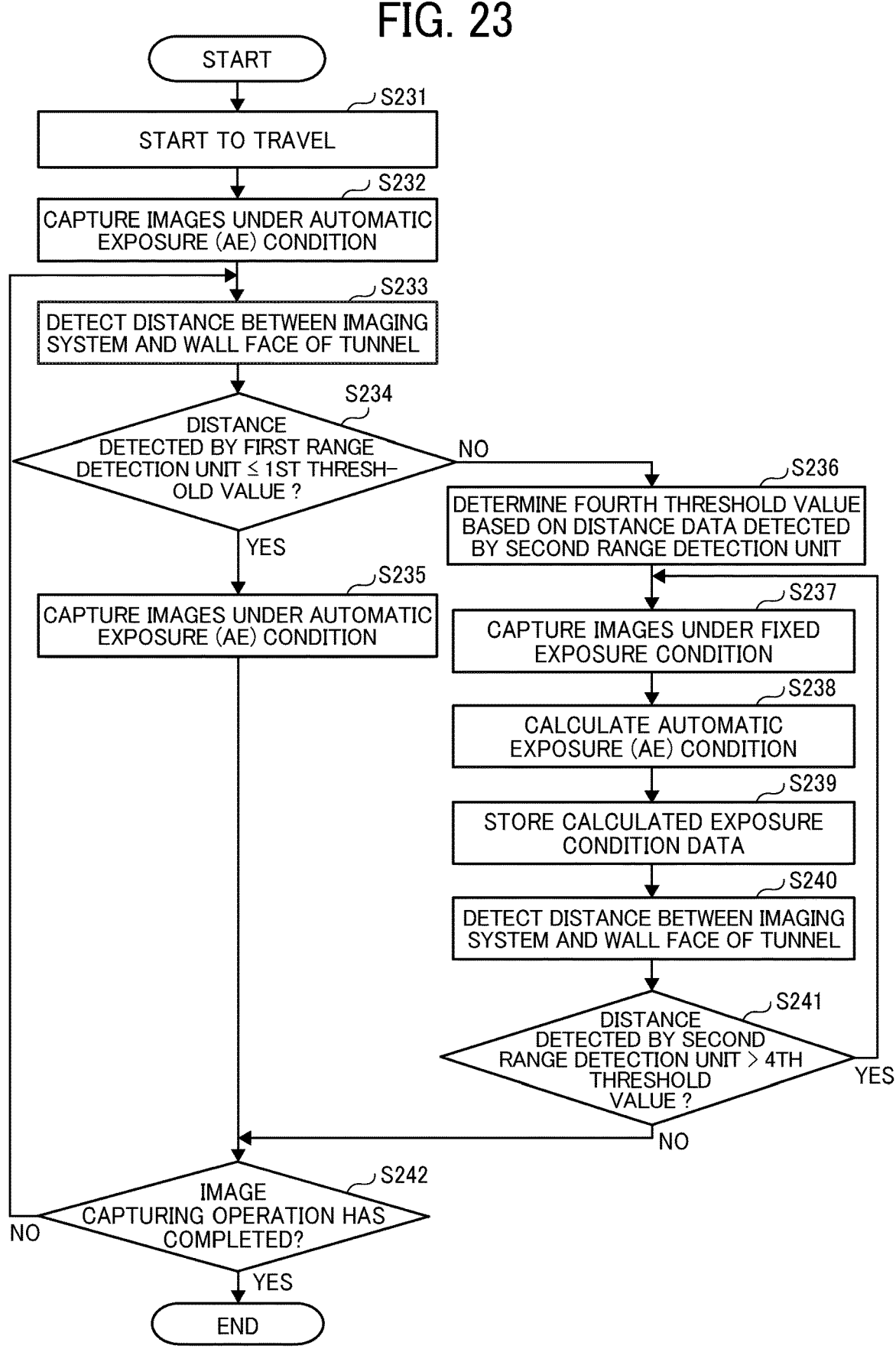
FIG. 23 is an example of flowchart of operation of an imaging system according to the second embodiment.

The section passing detection unit 1614 compares the distance data detected by the second range detection unit 122 and the fourth threshold value, and then detects that the vehicle 500 has passed through the section provided with an emergency parking zone when the distance data becomes equal to or less the fourth threshold value (see step S241 in FIG. 23).

Operation of Imaging System of Second Embodiment

Figure 22A:
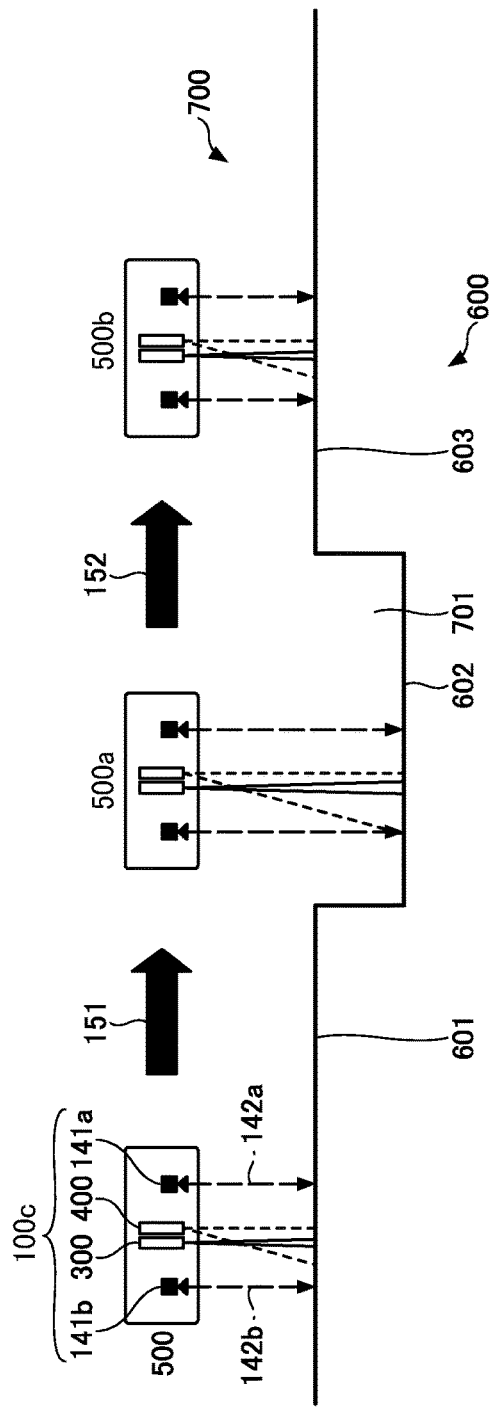
FIG. 22A illustrates a positional relationship between an imaging system and a wall face of tunnel according to the second embodiment.
Figure 22B:
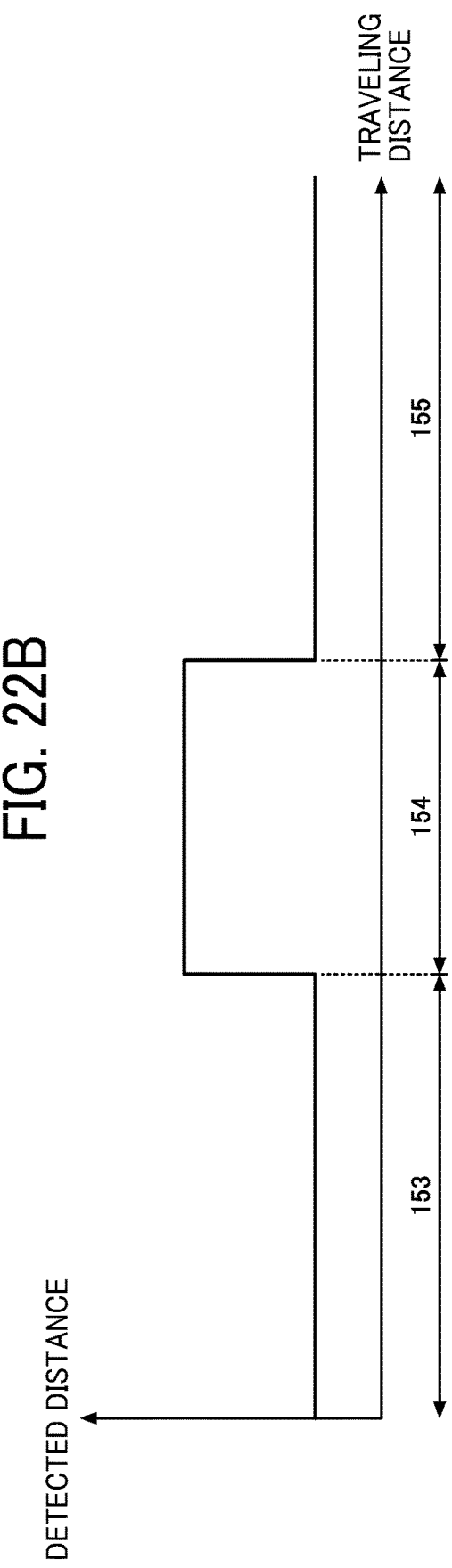
FIG. 22B illustrates a relationship between a distance detected between an imaging system and a wall face of tunnel and a traveling distance of a vehicle according to the second embodiment.

FIGS. 22A and 22B are diagrams illustrating an example of operation of the imaging system 100c. FIG. 22A illustrates a positional relationship between the imaging system 100c and the wall face of the tunnel 600. FIG. 22B illustrates a relationship between a detected distance between the imaging system 100c and the wall face of the tunnel 600, and the traveling distance of the vehicle 500. Since the diagrams of FIG. 22 is the same as the diagrams of FIG. 16, the description of overlapping portions is omitted, and the difference between FIGS. 16 and 22 is described mainly.

In FIG. 22A, the vehicle 500, mounted with the imaging system 100c including the camera unit 300, the lighting unit 400, a TOF sensor 141a, and a TOF sensor 141b, travels on the road 700 in the direction indicated by thick arrows 151 and 152 (from the left to right in FIG. 22A).

The TOF sensor 141a, provided on the front side of the vehicle 500 in the traveling direction of the vehicle 500, is an example of the first range detection unit 121. In FIG. 22A, a laser light 142a, indicated by a long-dot chain line, indicates a laser beam emitted from the TOF sensor 141a onto the wall face of the tunnel 600 and then reflected form the wall face of the tunnel 600 to the TOF sensor 141a.

The TOF sensor 141b, provided on the rear side of the vehicle 500 in the traveling direction of the vehicle 500, is an example of the second range detection unit 122. In FIG. 22A, a laser light 142b, indicated by a long-dot chain line, indicates a laser beam emitted from the TOF sensor 141b onto the wall face of the tunnel 600 and then reflected form the wall face of the tunnel 600 to the TOF sensor 141b.

The imaging system 100c starts the image capturing operation of the wall face 601 from the vehicle 500 existing at the left-side position in FIG. 22A. In the section 153, the exposure condition determination unit 161c determines the exposure condition of the camera unit 300 to be the automatic exposure (AE) condition. While being moved in the direction indicated by the thick arrow 151 when the vehicle 500 travels, the camera unit 300 captures images of the wall face 601 of the tunnel 600 under the automatic exposure (AE) condition.

When the vehicle 500 enters the section 154, the distance detected by the TOF sensor 141a changes suddenly. Further, the detected distance detected by the TOF sensor 141b suddenly changes with some delay to the detection of distance performed by the TOF sensor 141a.

Based on the sudden change of the distance detected by the TOF sensor 141a, the exposure condition determination unit 161c detects that the vehicle 500 has entered the section 154 having the emergency parking zone 701, and then switches the exposure condition from the automatic exposure (AE) condition to the fixed exposure condition. Then, the exposure condition determination unit 161c fixes or locks the exposure condition to a specific exposure condition that was used right before the vehicle 500 entering the section 154. Then, the camera unit 300 captures images of the wall face 602 under the fixed exposure condition.

Then, when the vehicle 500a has passed through the section 154 and then enters the section 155 (see the vehicle 500b in FIG. 22A), the distance detected by the TOF sensor 141a suddenly changes again, and then the distance detected by the TOF sensor 141a at the section 155 becomes same as the distance detected by the TOF sensor 141a at the section 153.

Further, the detected distance detected by the TOF sensor 141b also suddenly changes with some delay, and the detected distance detected by the TOF sensor 141b at the section 155 becomes same as the detected distance at the section 153.

Based on the sudden change of the distance detected by the TOF sensor 141b, the exposure condition determination unit 161c detects that the vehicle 500 has passed through the section 154 having the emergency parking zone 701, and then switches the exposure condition from the fixed exposure condition to the automatic exposure (AE) condition. Then, the camera unit 300 captures images of the wall face 603 under the automatic exposure (AE) condition.

Hereinafter, a description is given an example of flowchart of operation of the imaging system 100c with reference to FIG. 23.

Since steps S231 and S232 are the same as steps S171 and S172 of FIG. 17, the descriptions of steps S231 and S232 are omitted.

Then, in step S233, the first range detection unit 121 detects the distance between the imaging system 100c and the wall face of the tunnel 600 in the direction intersecting the traveling direction of the vehicle 500, and the second range detection unit 122 detects the distance between the imaging system 100c and the wall face of the tunnel 600 in the direction intersecting the traveling direction of the vehicle 500, then the first range detection unit 121 and the second range detection unit 122 respectively outputs the detected distance data to the exposure condition determination unit 161c.

The sequential order of processing steps S232 and S233 can be changed as appropriate, and steps S232 and S233 can be performed in parallel.

Then, in step S234, the exposure condition determination unit 161c determines whether the distance detected by the first range detection unit 121 is equal to or less than the first threshold value (detected distance≤1st threshold value).

If the exposure condition determination unit 161c determines in step S234 that the distance detected by the first range detection unit 121 is equal to or less than the first threshold (step S234: YES), the exposure condition determination unit 161c determines the exposure condition to be the automatic exposure (AE) condition, and outputs the determination result to the exposure control unit 162.

Then, in step S235, the imaging unit 140 captures images of the wall face of the tunnel 600 under the automatic exposure (AE) condition.

By contrast, if the exposure condition determination unit 161c determines in step S234 that the distance detected by the first range detection unit 121 is greater than the first threshold value (step S234: NO), the exposure condition determination unit 161c determines the exposure condition to be the fixed exposure condition, and outputs the determination result to the exposure control unit 162. Then, the sequence proceeds to step S236.

Then, in step S236, the fourth threshold determination unit 1613 determines the fourth threshold value that is used for detecting that the vehicle 500 has passed through the section provided with the emergency parking zone.

Since steps S237 to S239 are the same as steps S176 to S178 of FIG. 17, the descriptions of steps S237 to S239 are omitted.

Then, in step S240, the second range detection unit 122 detects the distance between the imaging system 100c and the wall face of the tunnel 600 in the direction intersecting the traveling direction of the vehicle 500, and outputs the detected distance data to the exposure condition determination unit 161c.

Then, in step S241, the section passing detection unit 1614 compares the distance data detected by the second range detection unit 122 and the fourth threshold value to determine whether the distance data detected by the second range detection unit 122 becomes greater than the fourth threshold value (detected distance>4th threshold value).

If the section passing detection unit 1614 determines in step S241 that the distance data detected by the second range detection unit 122 is equal to or less than the fourth threshold value (step S241: NO), the sequence proceeds to step S242.

By contrast, if the section passing detection unit 1614 determines in step S241 that the distance data detected by the second range detection unit 122 becomes greater than the fourth threshold value (step S241: YES), the sequence returns to step S237, and then step S237 and subsequent steps are performed again.

Since step S242 is the same as step S179 of FIG. 17, the descriptions of step S242 is omitted.

In this way, the imaging system 100c can capture images of the wall face of the tunnel 600.

As to the above described second embodiment, when the vehicle 500 enters the section 154 having the emergency parking zone 701, the exposure condition determination unit 161c can detect that the vehicle 500 has entered the section 154 having the emergency parking zone 701 based on the distance detected by the first range detection unit 121, and can detect that the vehicle 500 has passed through the section 154 having the emergency parking zone 701 based on the distance detected by the second range detection unit 122.

With this configuration, the imaging system 100c can detect that the vehicle 500 has entered the section 154 having the emergency parking zone 701 before the emergency parking zone 701 is seen within an angle of view designed for the camera unit 300, and the imaging system 100c can detect that the vehicle 500 has passed through the section 154 having the emergency parking zone 701 after the emergency parking zone 701 is not seen in the angle of view designed for the camera unit 300. With this configuration, the imaging system 100c can detect that the vehicle 500 has entered the section 154 having the emergency parking zone 701, and the vehicle 500 has passed through the section 154 having the emergency parking zone 701 by setting a given margin to the angle of view designed for the camera unit 300.

The other effects are the same as those described for the first embodiment.

Third Embodiment

Since the functional configurations of an imaging system 100d according to a third embodiment, an imaging system 100e according to a fourth embodiment, and an imaging system 100f according to a fifth embodiment to be described later are the same as those of the imaging system 100a, the duplicated description will be omitted from the following description.

Hereinafter, a description is given of the imaging system 100d according to the third embodiment. In the above described first embodiment, the imaging system 100a determines the exposure condition for the section having the emergency parking zone 701 to the fixed exposure condition.

By contrast, in the third embodiment, the image capturing operation is performed for the section having the emergency parking zone 701 still under the automatic exposure (AE) condition, and calculated data of the automatic exposure (AE) condition is stored using the storage unit 163. With this configuration, a suitable exposure condition, such as suitable lighting and suitable increase and decrease condition (see FIG. 18), can be obtained compared to a case performing the image capturing operation under the fixed exposure condition.

Figure 24:
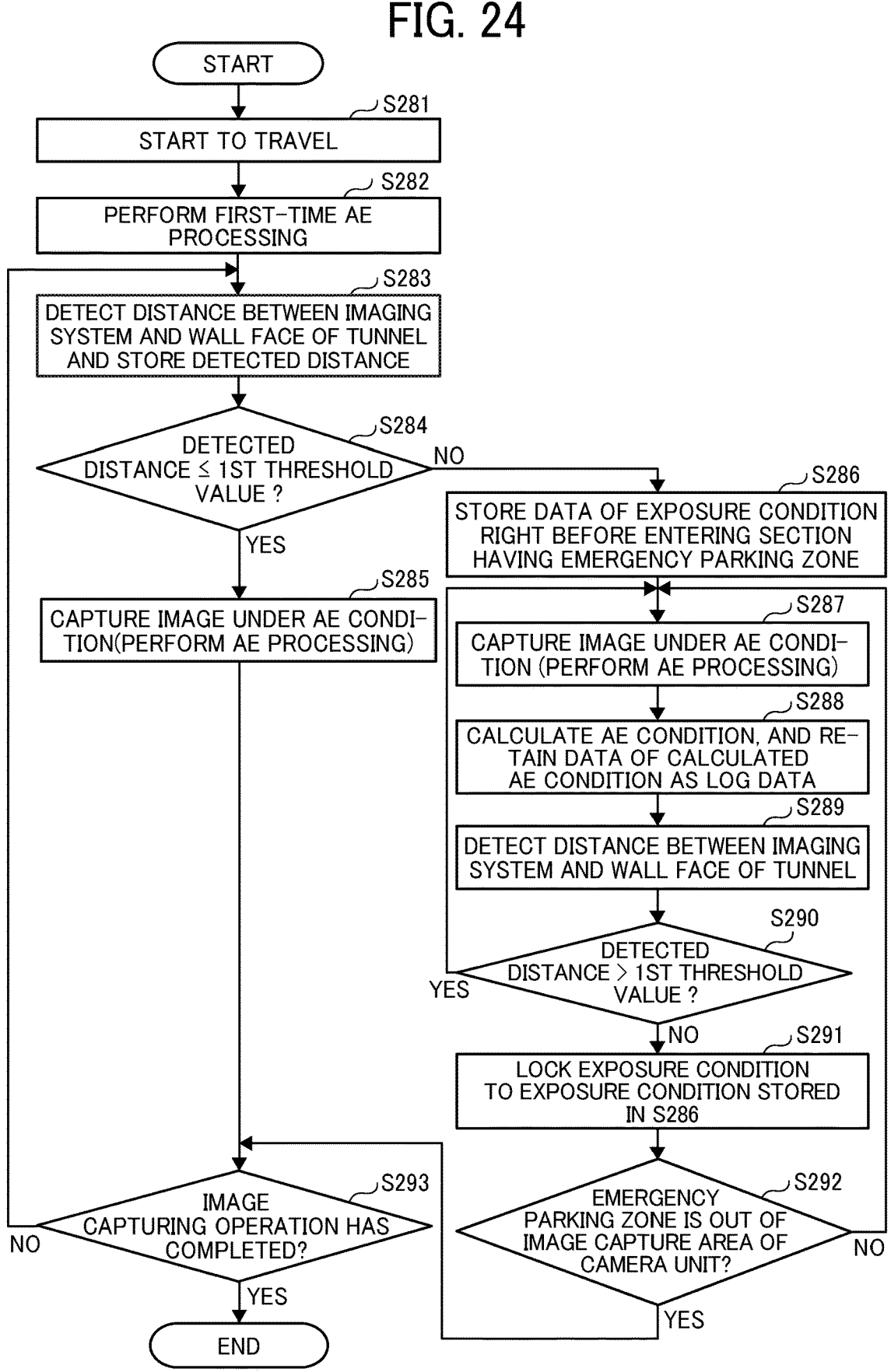
FIG. 24 is an example of flowchart of operation of an imaging system of according to a third embodiment.

FIG. 24 is an example of a flowchart of operation of the imaging system 100d.

In step S281, the vehicle 500 starts to travel to perform the image capturing operation.

Then, in step S282, the exposure condition determination unit 161 determines the exposure condition to be the automatic exposure (AE) condition, and then the imaging unit 140 captures images of the wall face of the tunnel 600 under the automatic exposure (AE) condition (first-time AE processing).

Then, in step S283, the range detection unit 120 detects the distance between the imaging system 100d and the wall face of the tunnel 600 in the direction intersecting the traveling direction of the vehicle 500, and outputs the detected distance data to the exposure condition determination unit 161. Further, the range detection unit 120 instructs the storage unit 163 to store the detected distance data.

The sequential order of processing steps S282 and S283 can be changed as appropriate, and steps S282 and S283 can be performed in parallel.

Then, in step S284, the exposure condition determination unit 161 determines whether the detected distance is equal to or less than the first threshold value (detected distance≤1st threshold value).

If the exposure condition determination unit 161 determines that the detected distance is equal to or less than the first threshold (step S284: YES), the exposure condition determination unit 161 determines the exposure condition to be the automatic exposure (AE processing), and outputs the determination result to the exposure control unit 162.

Then, in step S285, the imaging unit 140 captures images of the wall face of the tunnel 600 under the automatic exposure (AE) condition (AE processing).

By contrast, if the exposure condition determination unit 161 determines in step S284 that the detected distance becomes greater than the first threshold (step S284: NO), in step S286, the exposure condition determination unit 161 instructs the storage unit 163 to store data of a specific exposure condition that was used right before the vehicle 500 entering the section having the emergency parking zone 701.

Then, in step S287, the imaging unit 140 captures images of the wall face of the tunnel 600 under the automatic exposure (AE) condition (AE processing).

Then, in step S288, the exposure control unit 162 calculates data of the automatic exposure (AE) condition, and stores or retains data of the calculated automatic exposure (AE) condition as log data.

Then, in step S289, the range detection unit 120 detects the distance between the imaging system 100d and the wall face of the tunnel 600 in the direction intersecting the traveling direction of the vehicle 500, and outputs the detected distance data to the exposure condition determination unit 161.

Then, in step S290, the exposure condition determination unit 161 determines whether the detected distance becomes greater than the first threshold value (detected distance>1st threshold value).

If the exposure condition determination unit 161 determines in step S290 that the detected distance is greater than the first threshold value (step S290, YES), the sequence returns to step S287, and then step S287 and subsequent steps are performed again.

By contrast, if the exposure condition determination unit 161 determines in step S290 that the detected distance is equal to or less than the first threshold value (step S290, NO), in step S291, the exposure condition determination unit 161 fixes or locks the exposure condition to the data of the specific exposure condition that was stored in step S286.

Then, in step S292, the exposure condition determination unit 161 determines whether the section having the emergency parking zone 701 is out of the image capture area of the camera unit 300. In other words, the exposure condition determination unit 161 determines whether the emergency parking zone 701 is still seen or not in the image capture area of the camera unit 300.

If the exposure condition determination unit 161 determines in step S292 that the emergency parking zone 701 is not yet out of the image capture area of the camera unit 300 (step S292: NO), the sequence returns to step S287, and then step S287 and subsequent steps are performed again.

By contrast, if the exposure condition determination unit 161 determines in step S292 that the emergency parking zone 701 is out of the image capture area of the camera unit 300 (step S292: YES), the sequence proceeds to step S293.

Then, in step S293, the completion determination unit 165 determines whether the image capturing operation of the wall face of the tunnel 600 performed by the imaging system 100d has completed.

If the completion determination unit 165 determines in step S293 that the image capturing operation has completed (step S293: YES), the imaging system 100d terminates the image capturing operation. By contrast, if the completion determination unit 165 determines in step S293 that the image capturing operation has not yet completed (step S293: NO), the sequence returns to step S283, and then step S283 and subsequent steps are performed again.

In this way, the imaging system 100d can capture images of the wall face of the tunnel 600.

As to the above described third embodiment, by capturing the images of the section 154 having the emergency parking zone 701 by controlling the exposure condition (e.g., lighting condition, increase and decrease condition), under the automatic exposure (AE) condition, more suitable exposure condition, such as more suitable lighting condition and more suitable increase and decrease condition (see FIG. 18), can be obtained for performing the second-time image capturing operation compared to a case performing the image capturing operation under the fixed exposure condition.

Fourth Embodiment

Hereinafter, a description is given of the imaging system 100e according to a fourth embodiment.

Figure 25:
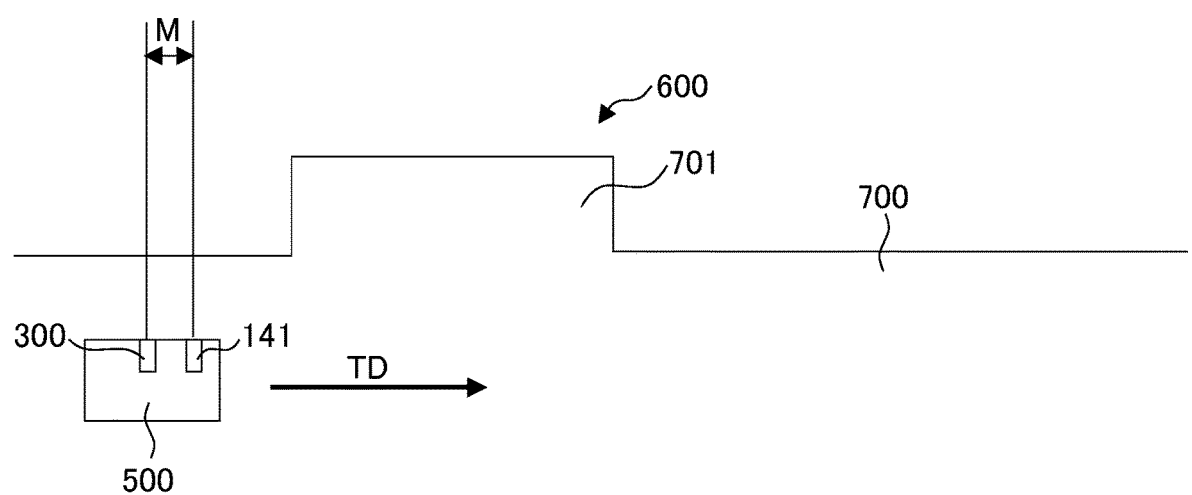
FIG. 25 is an example of diagram illustrating a relationship between a vehicle and an emergency parking zone.

FIG. 25 is an example of diagram illustrating a relationship between the vehicle 500 and the emergency parking zone 701. As illustrated in FIG. 25, the vehicle 500 travels or runs along a travel direction TD. The emergency parking zone 701 is a concaved portion provided on the wall face of the tunnel 600 that faces one side of the vehicle 500. Further, a distance between the TOF sensor 141 and the camera unit 300, mounted on the vehicle 500, in the direction along the travel direction TD, is referred to as "distance M" in the following description.

When the vehicle 500 enters the section having the emergency parking zone 701, the distance (the distance from the vehicle 500 to the wall face of the tunnel 600) detected by the TOF sensor 141 suddenly changes. Since the TOF sensor 141 is mounted at the front side of the vehicle 500 compared to the camera unit 300, when the vehicle 500 has just entered the section having the emergency parking zone 701, the camera unit 300 still captures images of the wall face not provided with the emergency parking zone 701, and the exposure condition (e.g., lighting condition, increase and decrease condition) is set to a given value suitable for the wall face not provided with the emergency parking zone 701. Therefore, if the exposure condition data is started to be stored from the timing when the vehicle 500 has just entered the section having the emergency parking zone 701, data of the exposure condition that is not suitable for capturing images of the emergency parking zone 701 when to perform the second-time image capturing operation later may be acquired.

Therefore, in the fourth embodiment, the data of the exposure condition is started to be stored after the vehicle speedometer/travel distance meter 171 detects that the vehicle 500 travels at least by the distance M after detecting the sudden distance change. With this configuration, the exposure condition suitable for capturing images of the section having the emergency parking zone 701 when performing the second-time image capturing operation can be obtained. In this case, it is preferable to maintain the exposure condition at the automatic exposure (AE) control. The vehicle speedometer/travel distance meter 171 is an example of "travel distance detection unit or movement distance detection unit," and the distance detected by the vehicle speedometer/travel distance meter 171 is an example "travel distance or movement distance of movable apparatus."

Thereafter, when the vehicle 500 has started to pass through the section having the emergency parking zone 701, the distance detected by the TOF sensor 141 suddenly changes again. If the vehicle 500 has passed through the section having the emergency parking zone 701 under the automatic exposure (AE) condition, the follow-up control or tracking control for changing the exposure condition (e.g., lighting condition, increase and decrease condition) from the exposure condition set for the wall face having the emergency parking zone 701 to the exposure condition set for the wall face not having the emergency parking zone 701 cannot be performed in time, and thereby the image of the wall face not having the emergency parking zone 701, which is captured right after the vehicle 500 passing through the section having the emergency parking zone 701, may have "white portion."

Therefore, in the fourth embodiment, the exposure condition is switched from the automatic exposure (AE) condition to the fixed exposure condition within a time period in which the wall face having the emergency parking zone 701 is still included in the image capture area of the camera unit 300. With this configuration, the image of the wall face not having the emergency parking zone 701, which is captured right after the vehicle 500 passing through the section having the emergency parking zone 701, can be obtained without "white portion." In this capturing of the image of the wall face not having the emergency parking zone 701, the exposure condition (e.g., lighting condition, increase and decrease condition) preferably use the value of the specific exposure condition that was used right before the vehicle 500 entering the section having the emergency parking zone 701.

Further, the timing of switching to the fixed exposure condition can be at the timing of sudden change of the detected distance. Further, the timing of terminating the storing of the data of the exposure condition suitable for capturing images of the section having the emergency parking zone 701 to be used for performing the second-time image capturing operation can be set at the timing of sudden change of detected distance.

Then, after the vehicle speedometer/travel distance meter 171 detects that the vehicle 500 has traveled at least by the distance M, the exposure condition is returned to the automatic exposure (AE) control again, with which the image of the wall face not having the emergency parking zone 701 can be also captured under the suitable exposure condition after the vehicle 500 has passed through the section having the emergency parking zone 701.

Figure 26:
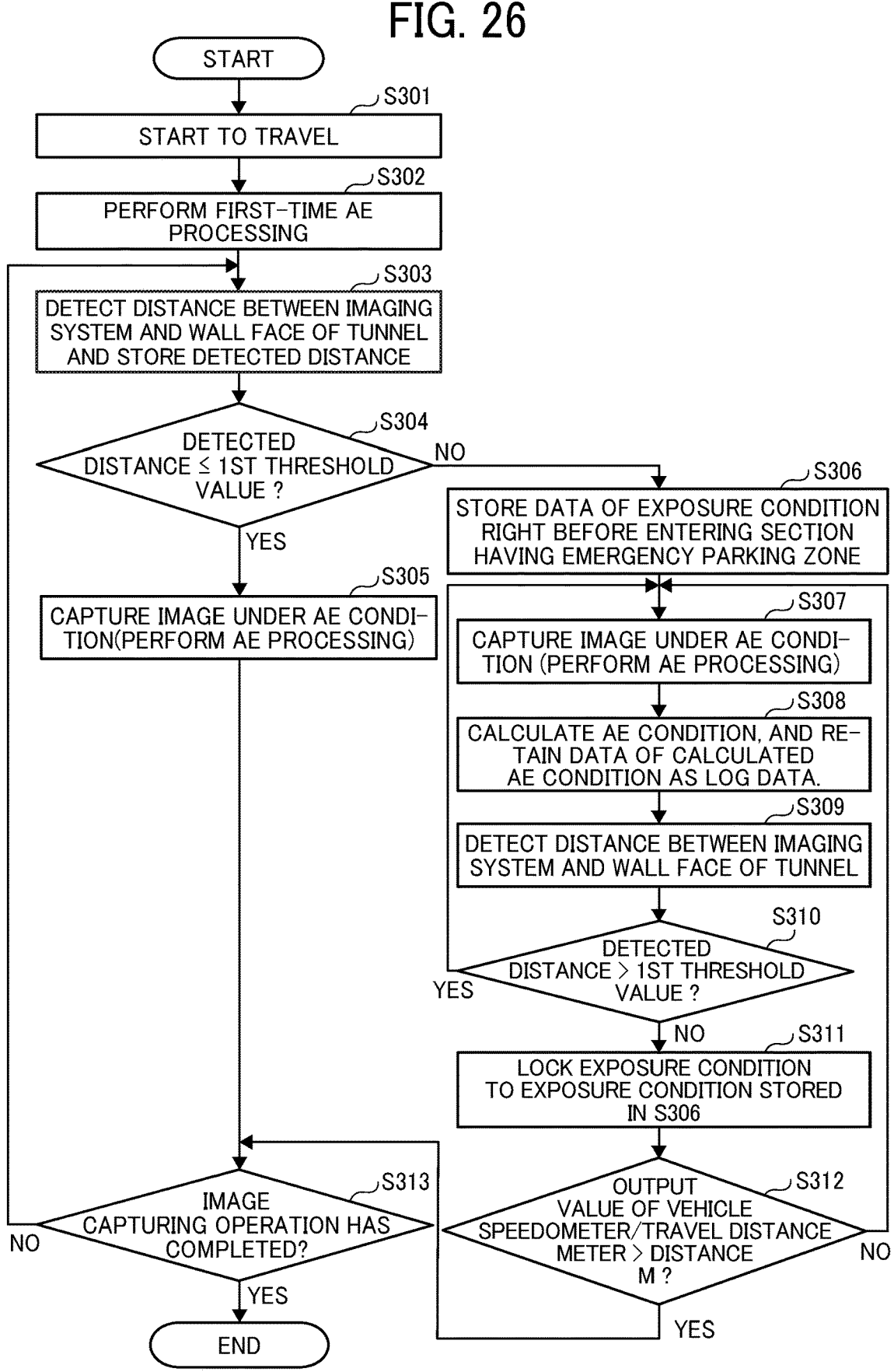
FIG. 26 is an example of flowchart of operation of an imaging system according to a fourth embodiment.

FIG. 26 is an example of a flowchart of operation of the imaging system 100e.

Since the sequence in FIG. 26 and the sequence in FIG. 24 are the same except step S312 in FIG. 26 and step S292 in FIG. 24, the duplicate description is omitted.

In step S312, the exposure condition determination unit 161 determines whether an output value of the vehicle speedometer/travel distance meter 171 becomes greater than the distance M.

If the exposure condition determination unit 161 determines in step S312 that the output value of the vehicle speedometer/travel distance meter 171 is equal to or less than the distance M (step S312: NO), the sequence returns to step S307, and then step S307 and subsequent steps are performed again.

By contrast, if the exposure condition determination unit 161 determines in step S312 that the output value of the vehicle speedometer/travel distance meter 171 becomes greater than the distance M (step S312: YES), the sequence proceeds to step S313.

In this way, the imaging system 100e can capture images of the wall face of the tunnel 600.

As to the above described fourth embodiment, when the vehicle 500 enters the section having the emergency parking zone 701, and then the vehicle speedometer/travel distance meter 171 detects that the vehicle 500 has traveled by the distance M, the data of the exposure condition is to be stored using the storage unit. With this configuration, the exposure condition suitable for capturing images of the section having the emergency parking zone 701 when performing the second-time image capturing operation can be obtained.

Further, when the vehicle 500 is to pass through the section having the emergency parking zone 701, the exposure condition is switched from the automatic exposure (AE) condition to the fixed exposure condition within a time period in which the section having the emergency parking zone 701 is still included in the image capture area of the camera unit 300. With this configuration, the failure of the follow-up control or tracking control for changing the exposure condition can be prevented, and thereby the image can be captured without causing "white portion."

Further, after the vehicle 500 has passed through the section having the emergency parking zone 701 and then the vehicle speedometer/travel distance meter 171 detects that the vehicle 500 has traveled at least by the distance M, the exposure condition is returned to the automatic exposure (AE) condition again, with which the image of the wall face not having the emergency parking zone 701 can be also captured under the suitable exposure condition after the vehicle 500 has passed through the section having the emergency parking zone 701.

In this way, the exposure control before and after the vehicle 500 enters the section having the emergency parking zone 701 can be suitably performed.

Figure 27:
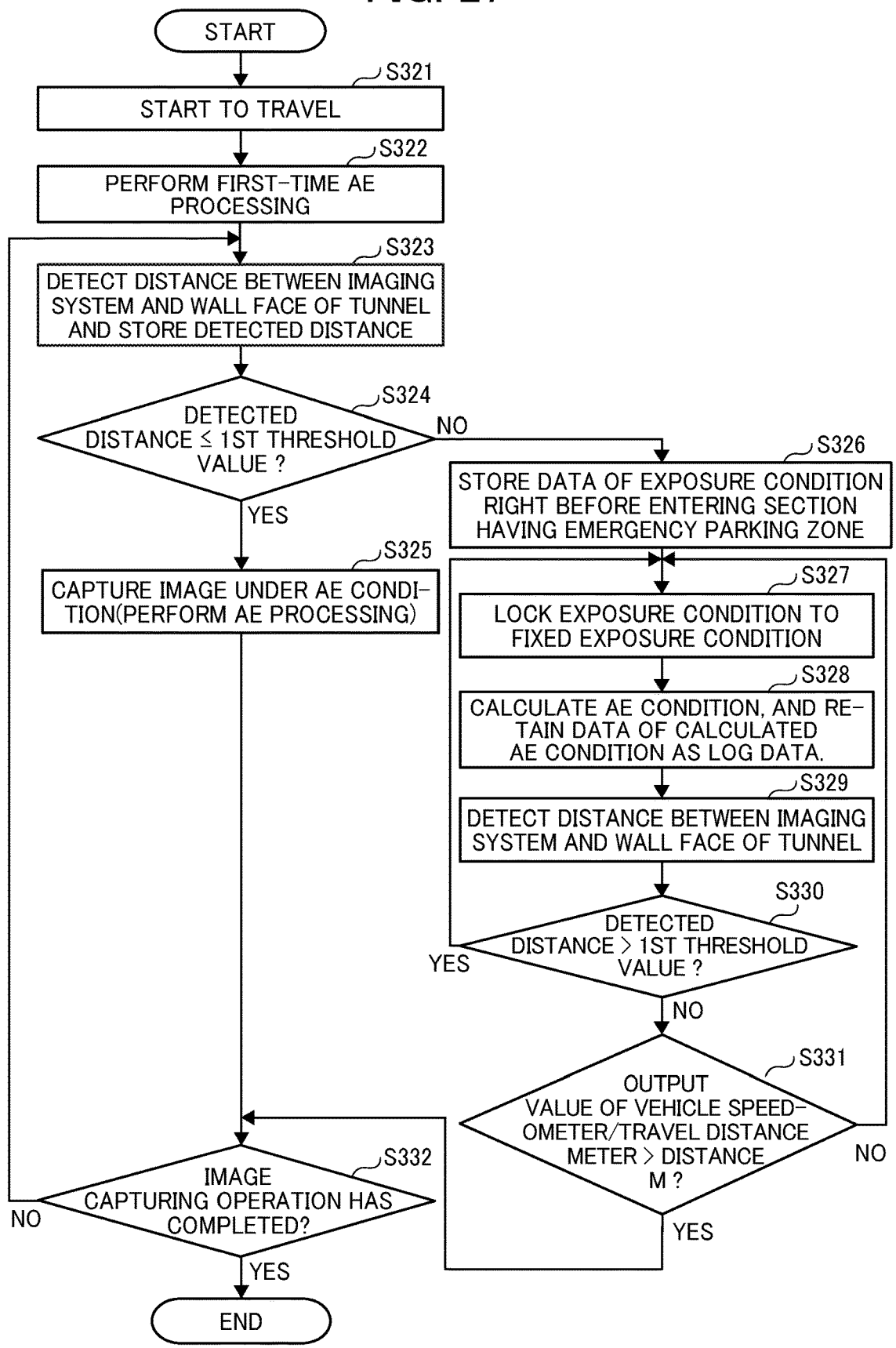
FIG. 27 is an example of flowchart of operation of an imaging system by setting a fixed exposure condition when capturing images of an emergency parking zone.

Further, the exposure condition when capturing the images of the section having the emergency parking zone 701 can be set to the fixed exposure condition. FIG. 27 is an example of a flowchart of operation of the imaging system 100e that sets the fixed exposure condition as the exposure condition when capturing images of the emergency parking zone 701.

As illustrated in FIG. 27, in step S327, the exposure condition determination unit 161 stops an image capturing operation using the AE processing (AE condition), and locks or fixes the exposure condition to perform the image capturing operation using the imaging unit 140 under the fixed exposure condition.

Further, in step S330, the exposure condition determination unit 161 determines whether the detected distance becomes greater than the first threshold value (detected distance>1st threshold value).

If the exposure condition determination unit 161 determines that the detected distance is equal to or less than the first threshold value (step S330, NO), in step S331, the exposure condition determination unit 161 determines whether the output value of the vehicle speedometer/travel distance meter 171 becomes greater than the distance M.

Since the other sequence in FIG. 27 are the same as the sequence in FIG. 26, the duplicate description is omitted.

Fifth Embodiment

Hereinafter, a description is given of the imaging system 100f according to a fifth embodiment.

In the above described fourth embodiment, the timing of storing the exposure condition data and the timing of switching to the automatic exposure (AE) are determined based on whether the output value of the vehicle speedometer/travel distance meter 171 becomes greater than the distance M.

In the fifth embodiment, the timing of storing the exposure condition data and the timing of switching to the automatic exposure (AE) are determined based on brightness of image captured by the camera unit 300.

Specifically, in the above described fourth embodiment, the timing of storing the exposure condition data and the timing of switching to the automatic exposure (AE) are determined based on a period starting from a time of sudden change of distance to the wall face detected by the TOF sensor to a time when the emergency parking zone 701 alone is included in the image capture area of the camera unit 300, or the timing of storing the exposure condition data and the timing of switching to the automatic exposure (AE) are determined by detecting a time when the vehicle 500 has passed through the section having the emergency parking zone 701 by detecting the distance M using the vehicle speedometer/travel distance meter 171.

In the fifth embodiment, by detecting that the change amount of brightness of image captured by the camera unit 300 becomes equal to or less than a given brightness threshold value, one state that the emergency parking zone 701 alone is included in the image capture area of the camera unit 300 can be detected, and by detecting that the change amount of brightness of image captured by the camera unit 300 becomes greater than the given brightness threshold value, another state that the vehicle 500 has passed through the section having the emergency parking zone 701 can be detected.

Figure 28:
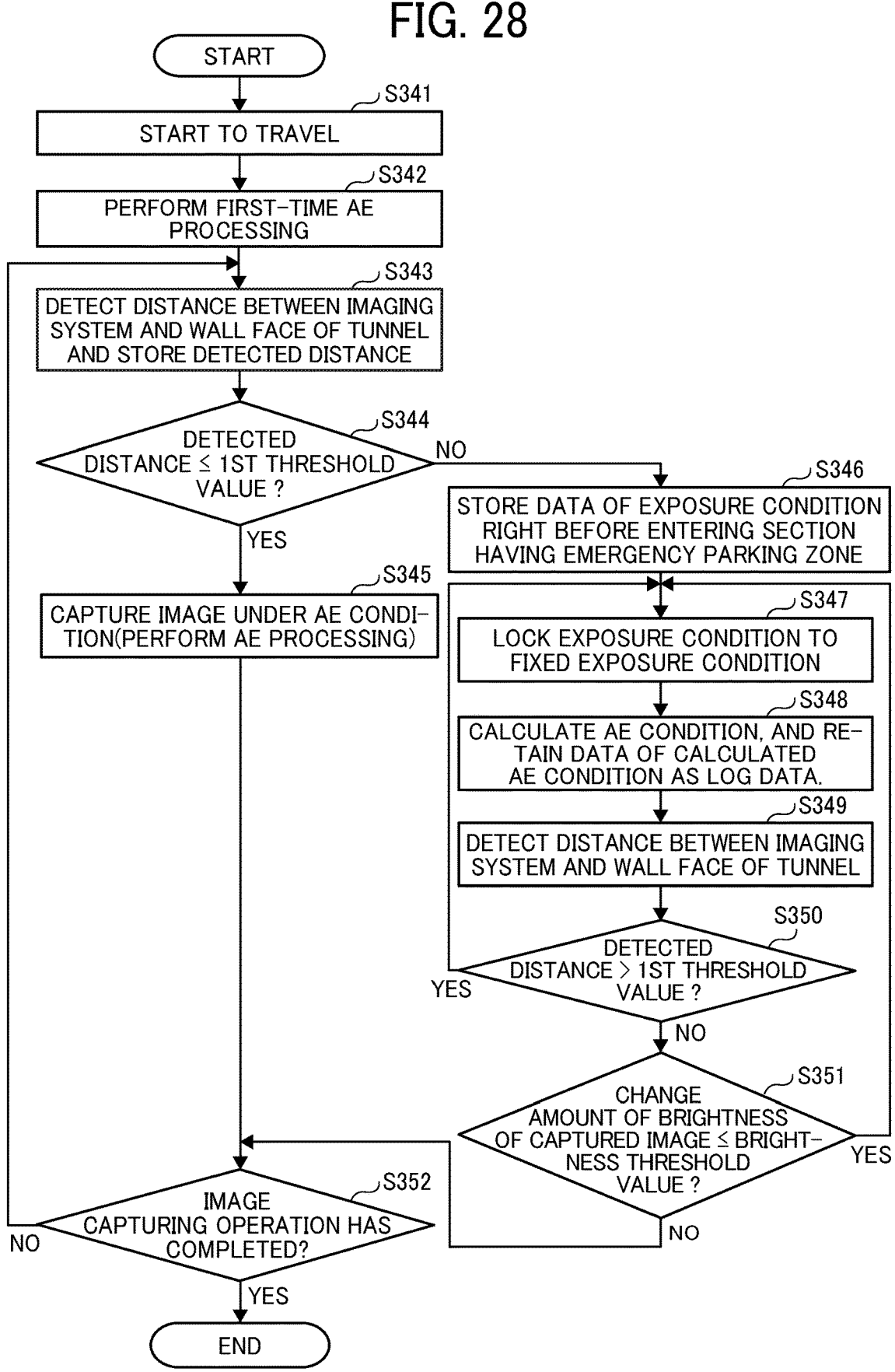
FIG. 28 is an example of flowchart of operation of an imaging system according to a fifth embodiment.

FIG. 28 is an example of a flowchart of operation of the imaging system 100f according to the fifth embodiment.

In step S350, the exposure condition determination unit 161 determines whether the detected distance becomes greater than the first threshold value (detected distance>1st threshold value).

If the exposure condition determination unit 161 determines that the detected distance is equal to or less than the first threshold value (step S350, NO), in step S351, the exposure condition determination unit 161 determines whether the change amount of brightness of the image captured by the camera unit 300 becomes equal to or less than the given brightness threshold value (change amount of brightness of image≤brightness threshold value). The change amount of brightness of the captured image can be detected by a change of average luminance value of all pixels consisting the captured image.

Since the other sequence in FIG. 28 are the same as the sequence in FIG. 27, the duplicate description is omitted.

By using the change amount of brightness of the image captured by the camera unit 300, the same effect as the imaging system 100e of the fourth embodiment can be attained.

In the above described one or more embodiments, the emergency parking zone 701 provided on the wall face of the tunnel 600 is used as an example of concave portion, but is not limited thereto. For example, other than the emergency parking zone 701, the above described one or more embodiments can be applied to any concave portion provided on the wall face of the tunnel 600.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Specifically, the vehicle mounted with the camera unit may be two-wheel vehicle, four-wheel vehicle, construction vehicle, agriculture vehicle, industrial vehicle, railway vehicle, special vehicle, or the like, and may be a flying vehicle such as drone. These are collectively referred to as the movable apparatus.

In the above described embodiments, the target object is described as the tunnel, but not limited thereto. For example, the target object includes a structure, such as piping (pipe) or tubes used for transporting materials, such as gas, liquid, powder, and granular substance. Further, the target object also includes, for example, a vertical hole-shaped reinforced concrete structure object, such as a hoistway used as an elevator shaft in which a lift or an elevator travels.

Further, the above described embodiments can be applied to an imaging method. For example, the imaging method includes capturing an image of a target object using the imaging unit 140 being mounted on the movable apparatus 500, and determining any one of a fixed exposure condition and an automatic exposure (AE) condition, as an exposure condition, based on a distance detected between the imaging unit 140 and the target object. By performing the imaging method, the same effect as the imaging system of the above described embodiments can be attained. The imaging method may be implemented by circuitry or one or more processors, such as central processing unit (CPU) and large scale integrated (LSI) circuit, integrated circuit (IC) card or one or more modules.

Further, the above described embodiments can be applied to storage medium or carrier means storing one or more programs. For example, the storage medium or carrier means stores one or more instructions that, when performed by one or more processors, cause the one or more processors to execute the method of capturing an image of a target object using the imaging unit 140 being mounted on the movable apparatus 500, and determining any one of a fixed exposure condition and an automatic exposure (AE) condition, as an exposure condition, based on a distance between the imaging unit 140 and the target object. By executing the program, the same effect as the imaging system of the above described embodiment can be attained.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

This patent application is based on and claims priority pursuant to Japanese Patent Application Nos. 2019-103119 filed on May 31, 2019, and 2020-012926, filed on Jan. 29, 2020 in the Japan Patent Office, the entire disclosure of which is hereby incorporated by reference herein.

REFERENCE SIGNS LIST

100 Imaging System
110 Imaging Control Unit
111 CPU
112 ROM
113 RAM
114 HDD
115 External I/F
116 Buzzer
117 System Bus
120 Range Detection Unit
121 First Range Detection Unit
122 Second Range Detection Unit
130 Light Quantity Detection Unit
140 Imaging Unit 141 TOF Sensor (Example of Range Detection Unit)
141a TOF Sensor (Example of First Range Detection Unit)
141b TOF Sensor (Example of Second Range Detection Unit)
150 Light Unit
153 to 155 Section
160 Control Unit
161 Exposure Condition Determination Unit
1611 Third Threshold Determination Unit
1612 Pass detection unit
1613 Fourth Threshold Determination Unit
1614 Section Passing Detection Unit
162 Exposure Control Unit
1621 Exposure Time Control Unit
1622 Amplification Rate Control Unit
1623 Aperture Control Unit
1624 Lighting Control Unit
163 Storage Unit
164 Input-Output Unit
165 Completion Determination Unit
170 IMU
171 Vehicle Speedometer/Travel Distance Meter
200 Slide Unit
210, 220 Rail
230 Base
231 Fitting Hole
240 Guide Shaft
251, 252 Guide Shaft Holding Member
261, 262 Frame
300 Camera Unit
310, 410 Base Plate
321, 322 Rail Connection
331 to 334 Camera
331-1, 334-1 Lens Unit
331-1a Aperture
331-2, 334-2 Line CCD
341, 342, 441, 442 Shaft Connection Member
341-1, 342-1 Through-Hole
350, 450 Index Plunger
361, 362, 364 Image Capture Area
363 Imaging Capture Direction
400 Lighting Unit
431 to 436 Lighting Source Unit
431-1 Lens Unit
431-1a Aperture
431-2 Light Source
451 Plunger
452 Plunger Holding Member
461, 462, 464 Lighting Area
463 Projection Direction
500 Vehicle
600 Tunnel
601 to 603 Wall Face
700 Road
701 Emergency Parking Zone
710, 720 Traffic Lane
730 Sidewalk
I Captured-Light Quantity Data
Ig Target Value
M Distance

The invention claimed is:

1. An imaging system, comprising:
a camera mounted on a moveable apparatus, the camera configured to capture an image of a target object; and
processing circuitry configured to
determine any one of a fixed exposure condition and an automatic exposure (AE) condition, as an exposure condition, based on a distance detected between the movable apparatus and the target object; and
set the exposure condition to the AE condition when the distance detected between the movable apparatus and the target object is equal to or less than a first threshold value.

2. The imaging system according to claim 1, wherein the processing circuitry is further configured to:
calculate data of the AE condition based on captured-light quantity when the camera is capturing the image of the target object under the fixed exposure conditions;
store the calculated data of the AE condition in a memory; and
control the exposure condition when capturing the image of the target object at a next time image capturing operation based on the calculated data of the AE condition stored in the memory.

3. The imaging system according to claim 1, wherein the processing circuitry is further configured to set the exposure condition to the AE condition when a change amount, of a distance detected between the movable apparatus and the target object at one time and a distance detected between the movable apparatus and the target object at another time after the one time, is equal to or less than a second threshold value.

4. The imaging system according to claim 1, further comprising:
a first range detector, provided on a front side of the movable apparatus in a moving direction of the movable apparatus, configured to detect the distance between the movable apparatus and the target object; and
a second range detector, provided on a rear side of the movable apparatus in the moving direction of the movable apparatus, configured to detect the distance between the movable apparatus and the target object, wherein
the processing circuitry determines any one of the fixed exposure condition and the AE condition, as the exposure condition, based on the distance between the movable apparatus and the target object detected by the first range detector and the distance between the movable apparatus and the target object detected by the second range detector.

5. The imaging system according to claim 1, further comprising:
a memory configured to store a range of data of the exposure condition determined based on the distance detected between the movable apparatus and the target object.

6. The imaging system according to claim 5, wherein the processing circuitry determines the exposure condition based on the distance detected between the movable apparatus and the target object.

7. The imaging system according to claim 1, further comprising:
a first range detector, provided on a front side of the movable apparatus in a moving direction of the movable apparatus, configured to detect the distance between the movable apparatus and the target object;
a travel distance detector configured to detect a travel distance of the movable apparatus; and
a memory configured to store a range of data of the exposure condition determined based on the distance detected between the movable apparatus and the target object, and the detected travel distance of the movable apparatus.

8. The imaging system according to claim 7, wherein the processing circuitry determines the exposure condition based on the distance detected between the movable apparatus and the target object.

9. The imaging system according to claim 1, further comprising:
a first range detector, provided on a front side of the movable apparatus in a moving direction of the movable apparatus, configured to detect the distance between the movable apparatus and the target object; and
a memory configured to store a range of data of the exposure condition determined based on the distance detected between the movable apparatus and the target object, and brightness of the image captured by the camera.

10. The imaging system according to claim 9, wherein the processing circuitry determines the exposure condition based on the distance detected between the movable apparatus and the target object, and the brightness of the image captured by the camera.

11. An imaging system, comprising:
a camera mounted on a moveable apparatus, the camera configured to capture an image of a target object;
a first range detector, provided on a front side of the movable apparatus in a moving direction of the movable apparatus, configured to detect a distance between the movable apparatus and the target object;
a second range detector, provided on a rear side of the movable apparatus in the moving direction of the movable apparatus, configured to detect the distance between the movable apparatus and the target object; and
processing circuitry configured to determine any one of a fixed exposure condition and an automatic exposure (AE) condition, as an exposure condition, based on the distance between the movable apparatus and the target object detected by the first range detector and the distance between the movable apparatus and the target object detected by the second range detector.

12. An imaging system, comprising:
a camera mounted on a moveable apparatus, the camera configured to capture an image of a target object;
processing circuitry configured to determine any one of a fixed exposure condition and an automatic exposure (AE) condition, as an exposure condition, based on a distance detected between the movable apparatus and the target object;
a first range detector, provided on a front side of the movable apparatus in a moving direction of the movable apparatus, configured to detect the distance between the movable apparatus and the target object;
a travel distance detector configured to detect a travel distance of the movable apparatus; and
a memory configured to store a range of data of the exposure condition determined based on the distance detected between the movable apparatus and the target object, and the detected travel distance of the movable apparatus.

* * * * *